(12) United States Patent
Berger et al.

(10) Patent No.: US 8,196,038 B2
(45) Date of Patent: Jun. 5, 2012

(54) SYSTEM, METHOD AND GRAPHICAL USER INTERFACE FOR MANAGING CONTACTS AND CALENDARS WITHIN AN ONLINE CARD SYSTEM

(75) Inventors: Kelly Berger, Los Altos, CA (US); Adnan Asar, Sunnyvale, CA (US); Kevin Chang, Sunnyvale, CA (US); Krys Taylor, Sunnyvale, CA (US); Tanya Cheng, Mountain View, CA (US); Alessandro Isaacs, San Mateo, CA (US)

(73) Assignee: Shutterfly, Inc., Redwood City, CA (US)

( * ) Notice: Subject to any disclaimer, the term of this patent is extended or adjusted under 35 U.S.C. 154(b) by 321 days.

(21) Appl. No.: 12/703,051

(22) Filed: Feb. 9, 2010

(65) Prior Publication Data
US 2011/0145101 A1  Jun. 16, 2011

Related U.S. Application Data

(63) Continuation-in-part of application No. 12/638,819, filed on Dec. 15, 2009, and a continuation-in-part of application No. 12/638,833, filed on Dec. 15, 2009, and a continuation-in-part of application No. 12/638,844, filed on Dec. 15, 2009.

(51) Int. Cl.
*G06F 17/00* (2006.01)
(52) U.S. Cl. ........................................................ 715/243
(58) Field of Classification Search .................. 715/243, 715/731, 769; 705/26.7
See application file for complete search history.

(56) References Cited

U.S. PATENT DOCUMENTS

| | | | | | |
|---|---|---|---|---|---|
| 4,907,826 | A | * | 3/1990 | Versage | 283/56 |
| 5,257,823 | A | * | 11/1993 | Colvin et al. | 283/117 |
| 5,615,123 | A | * | 3/1997 | Davidson et al. | 700/233 |
| 5,993,048 | A | * | 11/1999 | Banks et al. | 700/233 |
| 6,583,799 | B1 | * | 6/2003 | Manolis et al. | 715/838 |
| 6,873,971 | B1 | * | 3/2005 | Tackbary et al. | 705/26.8 |
| 7,093,857 | B2 | * | 8/2006 | Martin | 283/2 |
| 7,213,206 | B2 | * | 5/2007 | Fogg | 715/706 |
| 7,216,092 | B1 | * | 5/2007 | Weber et al. | 705/26.5 |
| 7,362,919 | B2 | * | 4/2008 | Das et al. | 382/284 |
| 7,370,076 | B2 | * | 5/2008 | Friedman et al. | 709/203 |
| 7,925,990 | B2 | * | 4/2011 | Bedingfield, Sr. | 715/808 |
| 2002/0059340 | A1 | * | 5/2002 | Centrone | 707/501.1 |
| 2002/0178078 | A1 | * | 11/2002 | OToole | 705/26 |
| 2004/0254859 | A1 | * | 12/2004 | Aslanian, Jr. | 705/27 |
| 2006/0069728 | A1 | * | 3/2006 | McEvilly et al. | 709/206 |
| 2007/0239506 | A1 | * | 10/2007 | Jania et al. | 705/8 |
| 2008/0091571 | A1 | * | 4/2008 | Sater et al. | 705/26 |
| 2008/0133555 | A1 | * | 6/2008 | Rhoads et al. | 707/100 |
| 2008/0319868 | A1 | * | 12/2008 | Briscoe et al. | 705/26 |
| 2010/0269049 | A1 | * | 10/2010 | Fearon | 715/744 |
| 2011/0314111 | A1 | * | 12/2011 | Wang et al. | 709/206 |

\* cited by examiner

*Primary Examiner* — Laurie Ries
(74) *Attorney, Agent, or Firm* — Xin Wen

(57) ABSTRACT

A system, method and graphical user interface (GUI) are described for managing a contacts and calendar database within an online stationery/card service. For example, a system implemented by an online stationery/card service allowing a user to personalize and send non-electronic stationery/cards is described, the system comprising: a graphical user interface for personalizing and sending non-electronic stationery/cards comprising: a reminder list comprised a plurality of reminder entries, each of the reminder entries identifying an upcoming event including events generated based on a specified relationship between the user and one or more contacts stored in a contacts database of the user; a recommendation region comprising a plurality of stationery/card design recommendations, the recommendation region populated with stationery/card designs associated with a specified one or the one or more entries in the reminder list, including the events generated based on the specified relationship between the user and each of the contacts; and a stationery/card personalization engine executed in response to the user selecting one of the stationery/card design recommendations from the recommendation region, the stationery personalization engine providing the end user with a set of personalization options related to the selected stationery/card design, and generating personalized stationery with the selected stationery/card design based on user input.

22 Claims, 54 Drawing Sheets

Import Contacts
Next, review and confirm field assignments

Please review the imported data, if necessary, adjust the fields assigned to each column.

| Prefix ▼ | First ▼ | Middle ▼ | Last ▼ | Nickname |
|---|---|---|---|---|
| | Albert | | Alpha | Al |
| | Bert | | Beta | |
| | Claire | | Charlie | |
| | Danby | | Delta | |
| | Elizabeth | | Echo | |
| | Frank | | Foxtrot | |

Field Type Selection 601

602

Next

Back

*Fig. 6*

Single email address

Request mailing address from "Albert Alpha (home@homeaddress.com)"?

View sample email

☐ Add a personal message

[ Cancel ] [ Send request ]

↖ 1501

Personal message editor DIV shown

☑ Add a personal message

```
Hi,
I'd like to get your mailing address for my
Tiny Prints address book.
Thanks!
```

↖ 1502

Multiple email addresses

Please select the email addresses to send this request to:

☑ Select all
☑ Albert Alpha (home@homeaddress.com)
☑ Albert Alpha (work@workaddress.com)
☑ Darby Delta (email1@homeaddress.com)
☑ Darby Delta (yahoo@yahoo.com)
☑ Darby Delta (gmail@gmail.com)
☐ Elizabeth Echo (no email address)
☐ Frank Foxtrot (no requests, please)

View sample email

☐ Add a personal message

[ Cancel ] [ Send request(s) ]

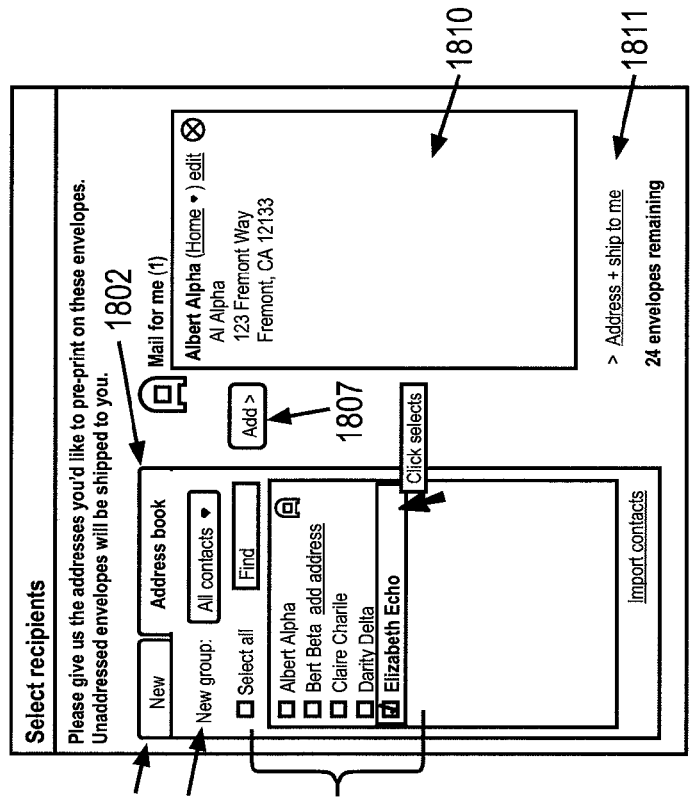
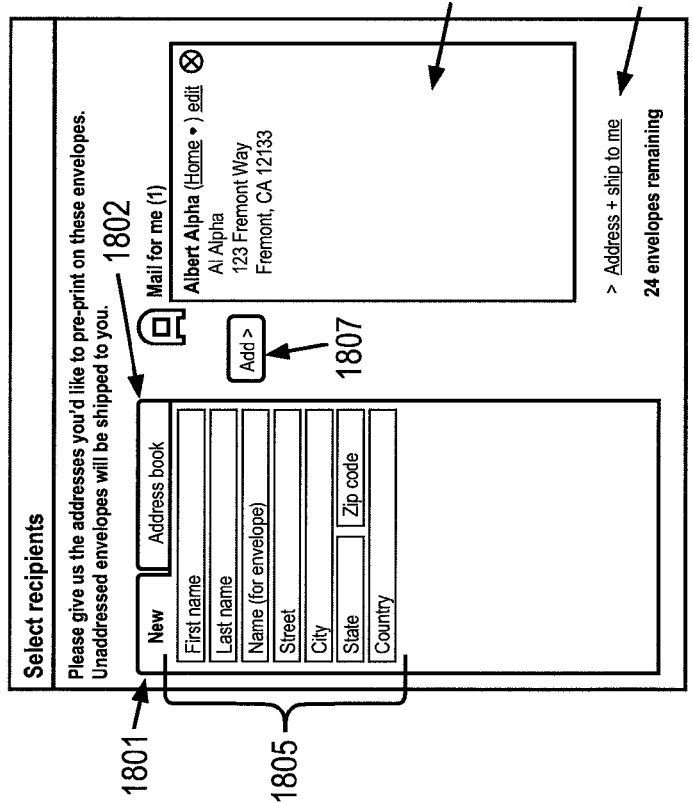
Fig. 18b
Fig. 18a

Choose a Message

Search or browse to find the perfect message. Once you choose one, you can edit it on your card – just click it!

Find [         ] ☒

Narrow Your Search

⊞ Occasion

⊟ Recipient
- ☐ Him
- ☐ Her

⊟ Theme
- ☐ Humorous
- ☐ Sentimental

⊟ Type
- ☐ Poem
- ☑ Famous Quote
- ☐ This Day In History

---

[ Use This Message ]  ← 3851

▼ *Kahlil Gibran on Love*
*When love beckons to you, follow him,*
*Though his ways are hard and steep,*
*And when his wings enfold you yield to him,*
*Though the sword hidden among his pinions may wound you,*
*And when he speaks to you believe in him,*
*Though his voice may shatter your dreams*
*as the north wind lays waste the garden.*

*For even as love crowns you so shall he crucify you. Even as he is for you your growth to is he for your pruning.*
*Even as he ascends to your height and caresses your tenderest branches that quiver in the sun,*
*So shall he descend to your roots and shake them in their clinging to the earth.*

*Like sheaves of corn he gathers you unto himself.*
*He threshes you to make you naked.*
*He sifts you to free you from your husks.*
*He grinds you to whiteness.*
*He kneads you until you are pliant.*

▶ *Kahlil Gibran on Marriage*
*You were born together, and together you shall be ...*

▶ *Shakespeare's Sonnet #36*
*When in disgrace with fortune and men's eye's...*

▶ *Shakespeare's Sonnet #116*
*Let me not to the marriage of true minds...*

▶ *e.e. cummings – somewhere I have never travelled*
*Somewhere I have never travelled, gladly beyond...*

3850 (top bracket)
3852 (bottom bracket)

SYSTEM, METHOD AND GRAPHICAL USER INTERFACE FOR MANAGING CONTACTS AND CALENDARS WITHIN AN ONLINE CARD SYSTEM

CLAIM TO PRIORITY

This application is a continuation-in-part of the following co-pending U.S. Patent Applications:

U.S. application Ser. No. 12/638,819, filed Dec. 15, 2009 entitled, "System And Method For Managing Contacts Within An Online Stationery System";

U.S. application Ser. No. 12/638,833, filed Dec. 15, 2009 entitled, "System And Method For Managing Contacts Within An Online Stationery System";

U.S. application Ser. No. 12/638,844, filed Dec. 15, 2009 entitled, "Graphical User Interface, System And Method For Managing Contacts Within An Online Stationery System".

BACKGROUND

1. Field of the Invention

This invention relates generally to the field of network data processing systems. More particularly, the invention relates to an improved architecture and method for managing contacts and calendars within an online stationery system.

2. Description of the Related Art

Web-based systems for designing stationery such as wedding invitations, birth announcements, thank you cards, birthday party invitations, etc, are currently available over the Internet. These services allow a user to enter a personalized message on a stationery template via a Web browser. The service then prints the stationery with the personalized message and mails the printed stationery and envelopes to the end user. The end user then mails the stationery to one or more recipients.

Some online stationery services will also mail stationery directly to recipients on behalf of the end user. In order to do so, the user must provide the stationery service with the names and addresses of the recipients. FIGS. 1a-c illustrate screenshots from one particular stationery Website (www.greetz.com) which provides options for manually entering a new name/address of a recipient 100 or importing a group of addresses from an Excel spreadsheet 101. As illustrated in FIG. 1b, upon selecting an Excel spreadsheet from the user's local hard drive, the user is prompted with a plurality of drop-down menus 102 to identify the data fields for the address lines. Once the import is complete, a list of recipients 103 is provided as shown in FIG. 1c. The end user is permitted to delete names from the list (by selecting a trash icon) but no other mechanism is provided for editing or otherwise managing the list of recipients on the online stationery service.

Consequently, what is needed is an improved system and method for importing and managing contacts within an online stationery service.

SUMMARY

A system, method and graphical user interface (GUI) are described for managing a contacts and calendar database within an online stationery/card service. For example, a system implemented by an online stationery/card service allowing a user to personalize and send non-electronic stationery/cards is described, the system comprising: a graphical user interface for personalizing and sending non-electronic stationery/cards comprising: a reminder list comprised a plurality of reminder entries, each of the reminder entries identifying an upcoming event including events generated based on a specified relationship between the user and one or more contacts stored in a contacts database of the user; a recommendation region comprising a plurality of stationery/card design recommendations, the recommendation region populated with stationery/card designs associated with a specified one or the one or more entries in the reminder list, including the events generated based on the specified relationship between the user and each of the contacts; and a stationery/card personalization engine executed in response to the user selecting one of the stationery/card design recommendations from the recommendation region, the stationery personalization engine providing the end user with a set of personalization options related to the selected stationery/card design, and generating personalized stationery with the selected stationery/card design based on user input.

BRIEF DESCRIPTION OF THE DRAWINGS

A better understanding of the present invention can be obtained from the following detailed description in conjunction with the following drawings, in which:

FIG. 6 illustrates a graphical user interface for associating imported contacts with data fields.

FIG. 15 illustrates GUI features employed in one embodiment of the invention for sending address request email messages.

FIGS. 18a-b illustrate GUI features employed in one embodiment of the invention for selecting new addresses and addresses from within a contacts list.

FIG. 28 illustrates a Web-based GUI comprising a greeting card calendar.

FIG. 29 illustrates a Web-based GUI comprising a plurality of selectable options for greeting card subscriptions.

FIG. 30 illustrates a Web-based GUI comprising filtering logic for filtering greeting card templates.

FIGS. 43-45 illustrates a Web-based GUI for selecting between sending a greeting card to the card sender or card recipient and for personalizing a greeting card envelope.

DETAILED DESCRIPTION OF PREFERRED EMBODIMENTS

Described below is a system and method for managing contacts and calendars within an online stationery/card system. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

It should be noted that the terms "stationery," "cards" and "greeting cards" are used interchangeably herein. For example, the term "stationery" may refer to greeting cards (e.g., holiday cards, birthday cards), invitations (e.g., wedding, birthday invitations, etc), and any other form of non-electronic communication and/or images printed on a medium (e.g., paper, fabric, etc) using any form of printing device.

Figure 1A:
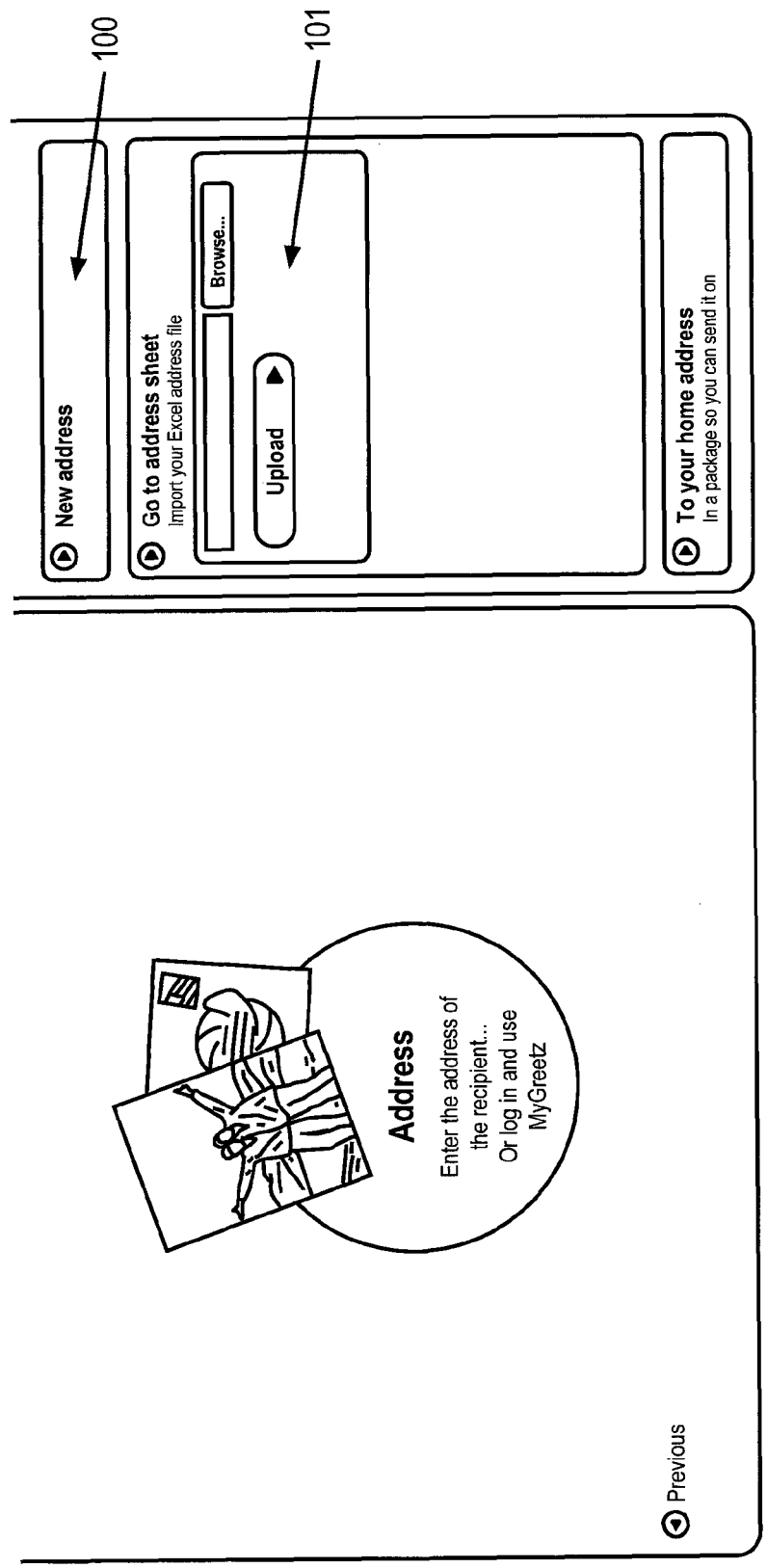
FIGS. 1a-c illustrates a prior art stationery service in which stationery recipients are identified.
Figure 1B:
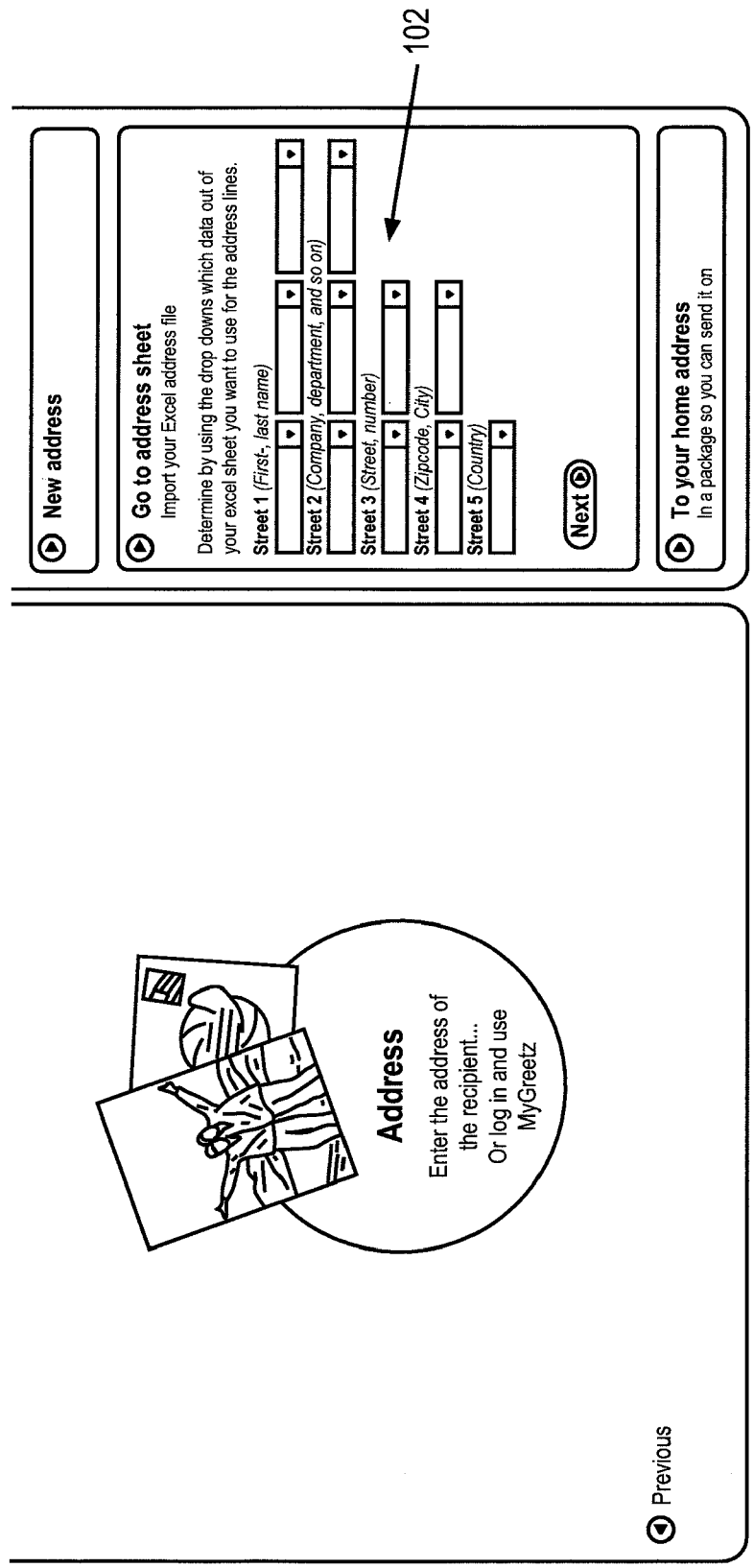
Figure 1C:
Figure 2:
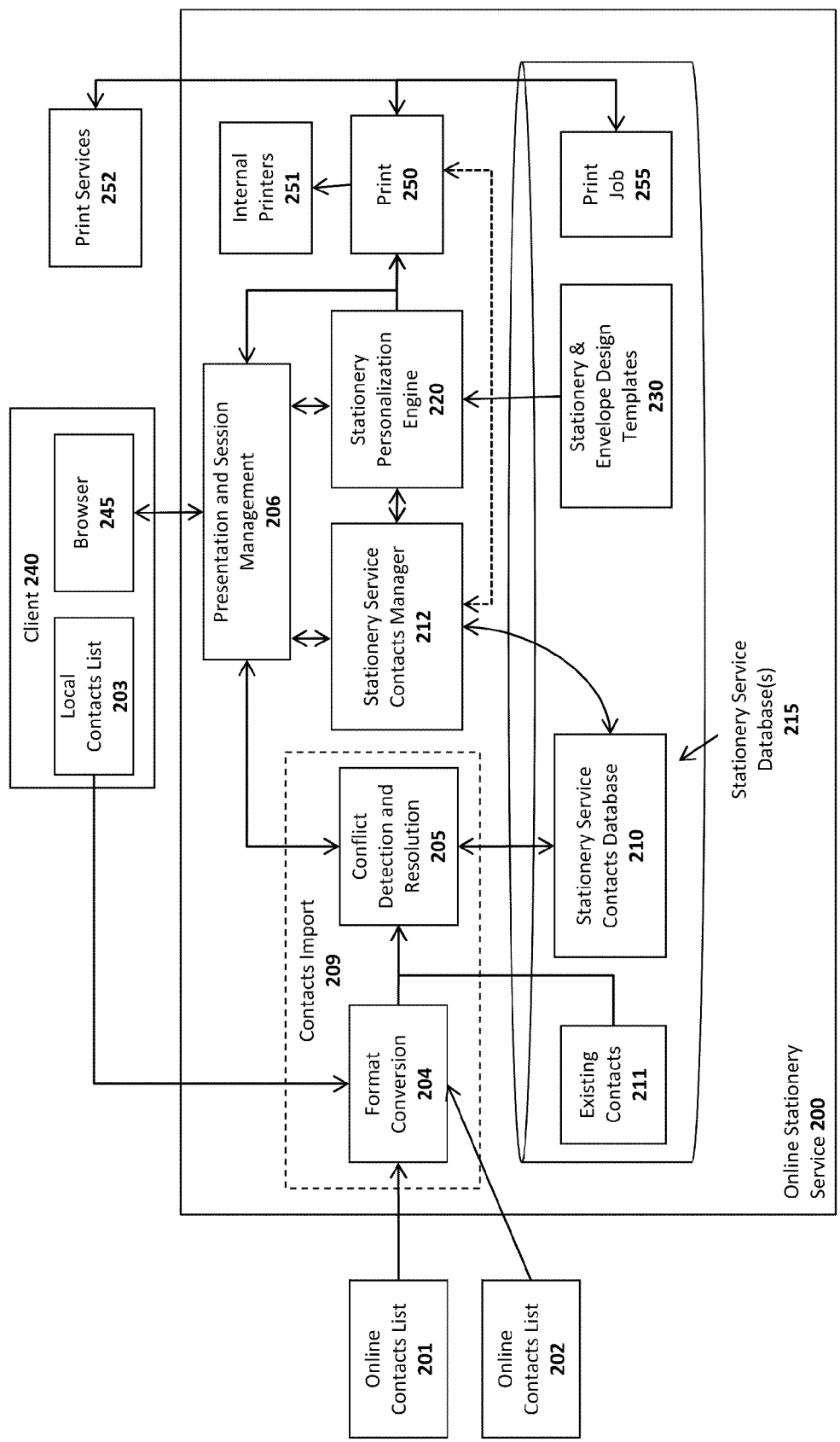
FIG. 2 illustrates a system architecture according to one embodiment of the invention.
Figure 3:
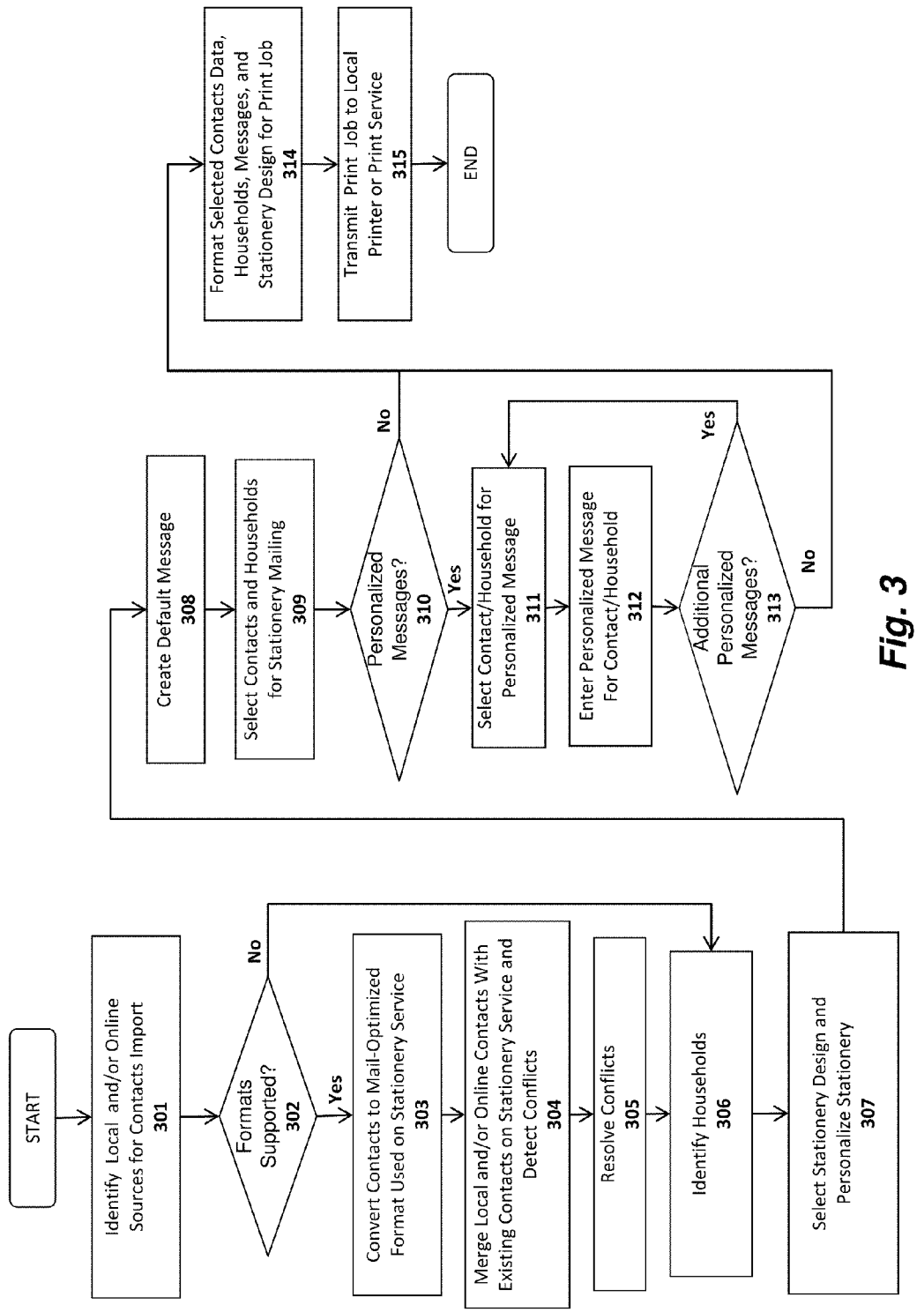
FIG. 3 illustrates a computer-implemented method according to one embodiment of the invention.

FIG. 2 illustrates one embodiment of a system architecture for importing and managing contacts within an online stationery service 200 and FIG. 3 illustrates a corresponding method. One embodiment of the online stationery service 200 merges contact data from multiple different sources and then converts the contact data into a format which is optimized for online stationery mailing functions. A brief overview of the method illustrated in FIG. 3 will now be provided within the context of the architecture shown in FIG. 2. It should be noted, however, that the underlying principles of the invention are not limited to the specific architecture shown in FIG. 2.

At 301, a contacts import module 209 manages the importation of contacts from various local and/or online contact databases identified by the end user. In the illustrated embodiment, the contacts import module 209 comprises a format conversion module 204 and a conflict detection and resolution module 205. As shown in FIG. 2, the format conversion module 204 reads contacts data from online contacts databases 201-202; local contacts databases 203 (i.e., "local" to the user's client computer 240); and/or existing contacts 211 already stored on the online stationery service 200 (e.g., the end user may have already established an account on the online stationery service 200 to send stationery and may have entered information for a set of contacts 211). If the online/local contact formats are supported, determined at 302, then at 303, the format conversion module converts the contacts to a format optimized for use on an online stationery service 200. To perform the format conversion, the format conversion module 204 parses the contact data in source data structure (e.g., the CSV file, vCard file, etc), extracts the data, and assigns the data to appropriate data fields in the new data structure. Various well known techniques for converting data from one format to another may be employed by the format conversion module 204. Once converted (and following conflict detection described below), the contacts data is stored in its new format within a contacts database 210 on the stationery service. Various features associated with this new data format are described in detail below (see, e.g., FIGS. 12-20c and associated text).

At 304, a conflict detection and resolution module 205 merges the local and/or online contacts with existing contacts 211 already stored on the online stationery service 200 and detects any conflicts which may result from the merge operation. A conflict may result if one or more contacts being imported are already stored within the existing contacts database 211. In such a case, the conflict detection and resolution module 205 resolves the conflicts at 305 using a set of conflict resolution rules (described below). Once all conflicts have been resolved, the data is persisted within the contacts database 210 and made accessible to end users via the stationery service contacts manager 212. In one embodiment, the contacts database 210 is implemented using mySQL. However, various different database formats may be employed while still complying with the underlying principles of the invention (e.g., Microsoft SQL, IBM SQL, etc).

At 307, the user identifies one or more "households" within the stationery service contacts database 210. As described below, households are specialized groups of contacts who live at the same address. The concept of a "household" is a particularly useful abstraction for an online stationery service 200 which mails stationery on behalf of a user.

As illustrated in FIG. 2, in one embodiment, all operations to the stationery service contacts database 210 occur through the stationery service contacts manager 212. That is, the stationery service contacts database 210 is used for persistent storage of contacts data containing the features described herein and the stationery service contacts manager 212 is the application-layer program code used to perform operations on the stationery service contacts database 210 as described below. The presentation and session management logic 206 comprises the program code for maintaining user sessions and for dynamically generating Web pages containing (among other things) the graphical user interface (GUI) features for manipulating contacts data as illustrated herein.

Returning to the method of FIG. 3, at 307, the user selects and personalizes a stationery design. In one embodiment, this is accomplished with a stationery personalization engine 220 such as that described in co-pending application entitled SYSTEM AND METHOD FOR DESIGNING AND GENERATING ONLINE STATIONERY, Ser. No. 12/188,721, filed Aug. 8, 2008, which is assigned to the assignee of the present application and which is incorporated herein by reference. In one embodiment, the stationery personalization engine 220 performs all of the functions described in the co-pending application as well as the additional functions described herein (e.g., selecting contacts/households for a stationery mailing via the stationery service contacts manager 212, selecting between a default message or a personal message for the contacts/households, etc).

At 308, the end user creates a default message to be used for a stationery mailing and, at 309, the contacts and/or households for the mailing are identified by the end user. If the user wishes to include a personalized message in lieu of the default message for one or more contacts/households, determined at 310, then the user selects a contact/household at 311 and enters the personalized message for the contact/household at 312. If any additional personalized messages are to be included, determined at 313, then steps 311 and 312 are repeated until all personalized messages have been entered.

At 314, all of the information related to the stationery order, including the selected stationery design, default messages, personalized messages and associated contacts and households are formatted for printing by a print module 250 which generates a print job 255. The formatting may include converting the stationery data mentioned above into a format usable by a particular printer. By way of example, a letter press printer may require different formatting than a digital press printer. In one embodiment, the specifications for the print job are encapsulated as metadata in an Extensible Markup Language ("XML") document and transmitted to an external print service 252. In one embodiment, the XML document includes a hyperlink (e.g., a URL) to the formatted print job 255 on the online stationery service 200. The print service 252 then accesses the print job by selecting the hyperlink. Regardless of how the print job is accessed, at 315, the formatted print job 255 is transmitted to either an internal printer 251 or an external print service 252 (e.g., over the Internet). Once printing is complete, the online stationery service 200 or the print service 252 mails the stationery to the contacts and/or households identified by the end user.

Having provided an overview of the method set forth in FIG. 3 and the architecture illustrated in FIG. 2, various specific details associated with managing contacts, generating print jobs and mailing stationery from an online stationery service 200 will now be provided. It should be noted, however, that the underlying principles of the invention are not limited to the particular architecture shown in FIG. 2 or the particular method set forth in FIG. 3.

In one embodiment, the different graphical user interface (GUI) features described herein are generated by presentation and session management logic 206 executed on the online stationery service. In one embodiment, various well known functional modules associated within the presentation and session management logic 206 are executed to receive input, process the input, interact with one or more other modules shown in FIG. 2, and dynamically generate Web pages containing the results. The Web pages are then transmitted to the user's client computer 240 and rendered on a browser 245. The Web pages may be formatted according to the well known HyperText Markup Language ("HTML") or Extensible HTML ("XHTML") formats, and may provide navigation to other Web pages via hypertext links. One embodiment utilizes Dynamic HTML ("DHTML"), a collection of technologies used together to create interactive Web sites by using a combination of a static markup language (e.g., HTML), a client-side scripting language (e.g., JavaScript), a presentation definition language (e.g., CSS), and the Document Object Model ("DOM").

Figure 4:
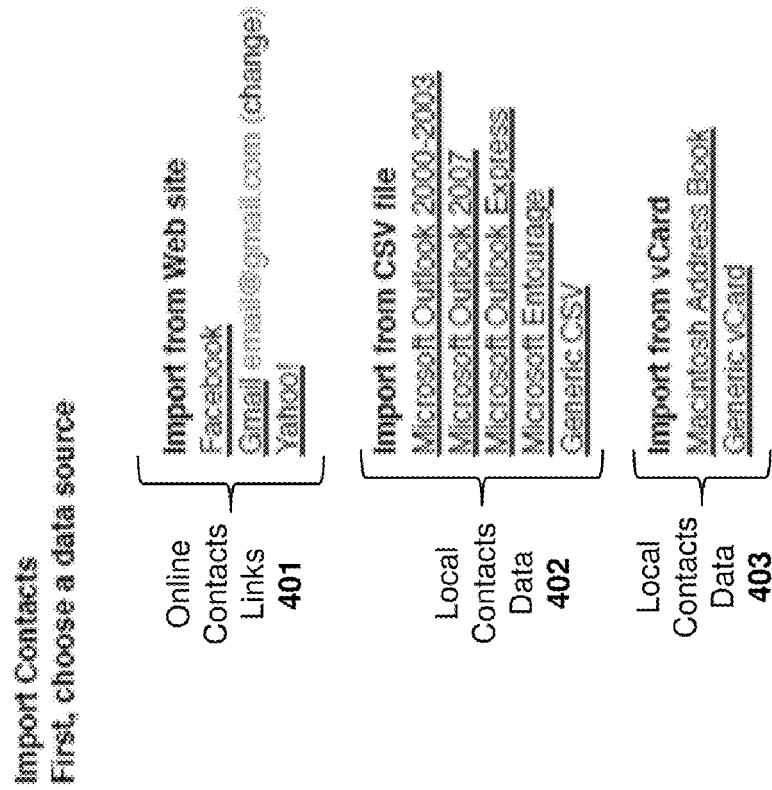
FIG. 4 illustrates a graphical user interface (GUI) for importing various different online and offline contact databases.

Turning now to FIG. 4, in one embodiment, the user is prompted to identify online and offline contacts databases via a series of hyperlinks 401-402 (see, e.g., step 302 in FIG. 3). In the example shown, the three online links 401 include Facebook, Gmail and Yahoo! contacts. A set of five links 402 are provided for importing contacts from different types of CSV files and a set of two links 403 are provided for importing contacts from different vCard files.

In one embodiment, when importing online address books such as those available from Facebook, Gmail and Yahoo!, the user is asked to provide authentication data such as a user name and a password. The online stationery service 200 then uses the authentication data to log in to the online service and retrieve the contacts list on behalf of the user.

Figure 5:
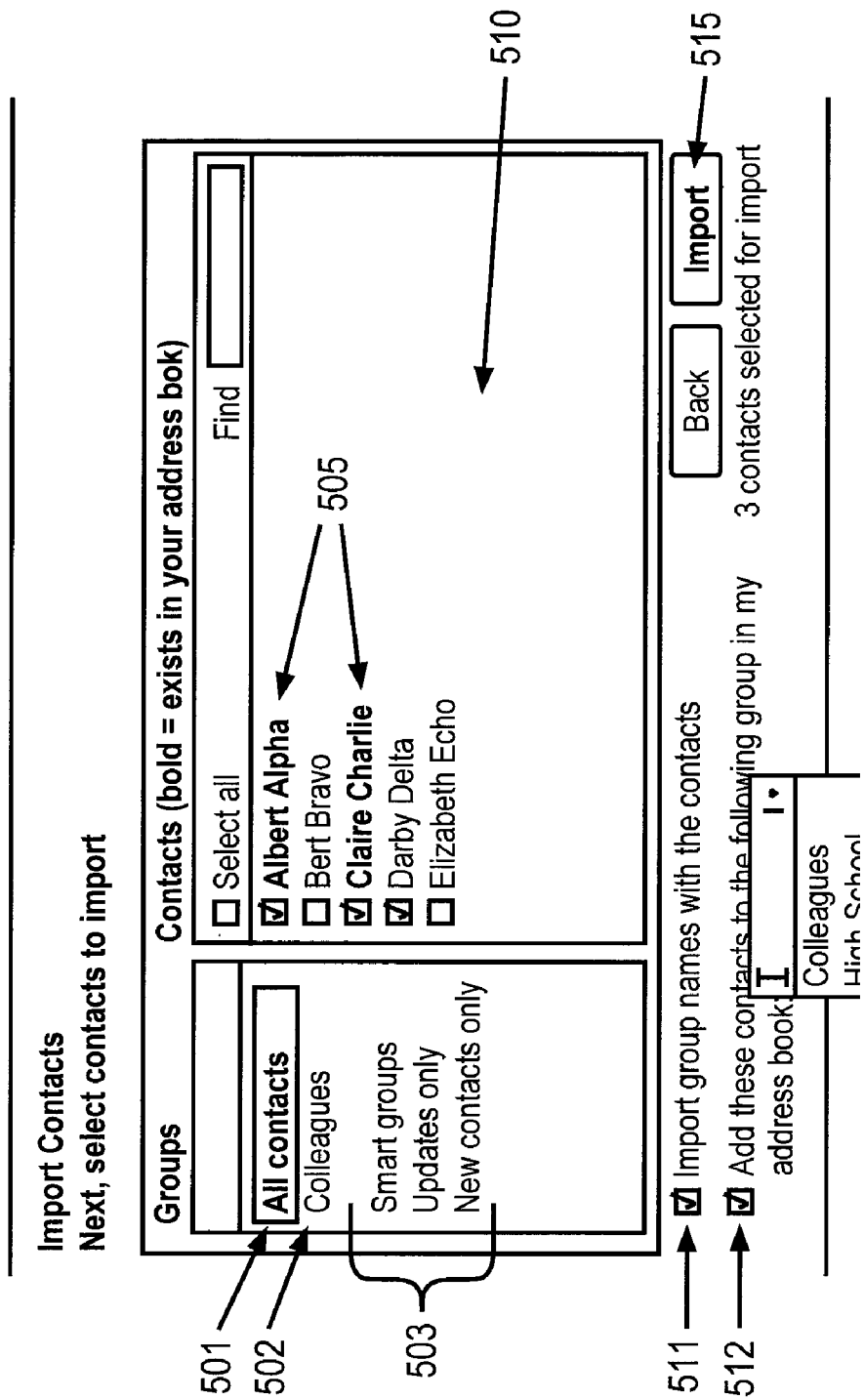
FIG. 5 illustrates one embodiment of a GUI window for importing contacts from different contact groups.

FIG. 5 illustrates a graphical user interface (GUI) window generated in one embodiment of the invention following the selection of a particular contact database 201-203. In one embodiment, the user may select contacts from different, predefined contact groups 501-503. In the example shown in FIG. 5, the groups include "all contacts" 501, "colleagues" 502, and several "smart groups" 503 (described in detail below). A set of available contacts 505 to be imported is displayed within region 510. Each contact has a check box associated with it to indicate whether the contact should be included in (or excluded from) the import. In one embodiment, the default state of the check boxes is "unchecked" and the user must manually select contacts by checking the corresponding check boxes. In addition, in one embodiment, the contacts which correspond to contacts already stored in the user's address book 211 on the online stationery service 200 are identified by the conflict detection and resolution module 205 and highlighted (e.g., bolded in FIG. 5). In one embodiment, "matches" to existing contacts are those contacts which have the same name AND one of the following: same email, phone, date, OR mailing address.

Check-boxes 511 and 512 are also provided to import group names with the contacts and to add the imported contacts to a specific group within the user's existing address book 211. The specific group is identified via a drop-down menu containing a list of available groups. Once the set of contacts are selected within region 510 the user imports the contacts by selecting an import button 515.

FIG. 6 illustrates a GUI window which allows the user to review and confirm field assignments to be used for the imported contacts data. A plurality of "field type" drop-down menus 601 are provided to allow the user to select the fields to be used. The corresponding values for each contact are displayed within a plurality of rows 602, as illustrated.

Figure 7:
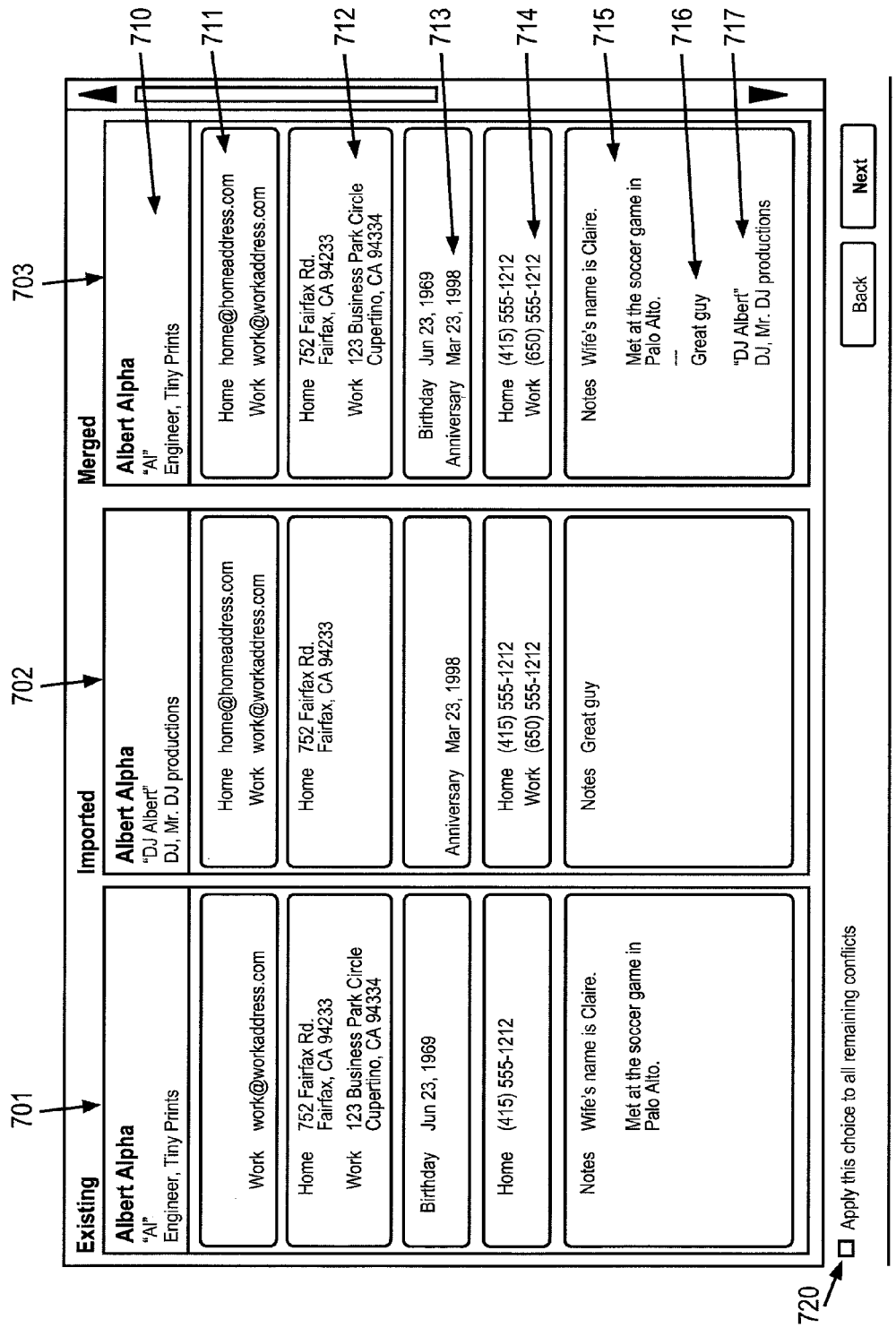
FIG. 7 illustrates one embodiment of the invention for merging existing and imported contacts.

As mentioned above, a conflict detection and resolution module 205 identifies existing contacts 211 which match contacts being imported from the various sources 201-203 and attempts to resolve any conflicts which may exist between the data. In one embodiment, each conflict is identified to the end user and the user is prompted to specify how to resolve the conflict. For example, FIG. 7 illustrates a Web-based graphical user interface presented to the user which shows the contact data contained in the existing contacts database 701, the contact data to be imported 702, and the merged contact data which would result from the import 703. In one embodiment, the differences between the existing and imported data is highlighted. For example, in FIG. 7, data found in the existing database but not the database to be imported is highlighted with a first color (e.g., orange); and data found in the contacts database to be imported but not the existing contacts database is highlighted with a second color (e.g., green). Thus, the merged contact data 703 is shown with some entries 712, 715 highlighted in the first color and some entries 711, 713, 714 highlighted in the second color.

As shown in FIG. 7, some of the conflicting data is combined into corresponding fields within the merged contact 703. For example, in FIG. 7, the "notes" field is appended to include notes 715, 716 from both the existing and the imported contacts. However, certain data fields cannot be merged in this manner. For example, if the existing contact 701 has a different home address than the imported contact 702, then the conflict detection and resolution module 205 must select one of the two addresses as the primary home address. In one embodiment, when a conflict of this nature occurs, the default operation of the conflict detection and resolution module 205 is to keep the data from the existing contact 701 and to append the data from the imported contact into the notes field of the merged contact 703. For example, in FIG. 7, the nickname ("Al"), title ("Engineer") and company ("Tiny Prints") are selected from the existing contact 701 and the nickname ("DJ Albert"), title ("DJ") and company ("Mr. DJ Productions") from the imported contact 702 are appended within the notes field 717 of the merged contact 703.

In one embodiment, the user is given the option to select the existing version 701, the imported version 702 or the merged version 703 using a mouse, keyboard, and/or other cursor control device. A checkbox option 720 is also provided to allow the user to apply the choice to all remaining contacts to be reviewed. If the checkbox 720 is not selected, the user will review and select each conflict individually.

Figure 8:
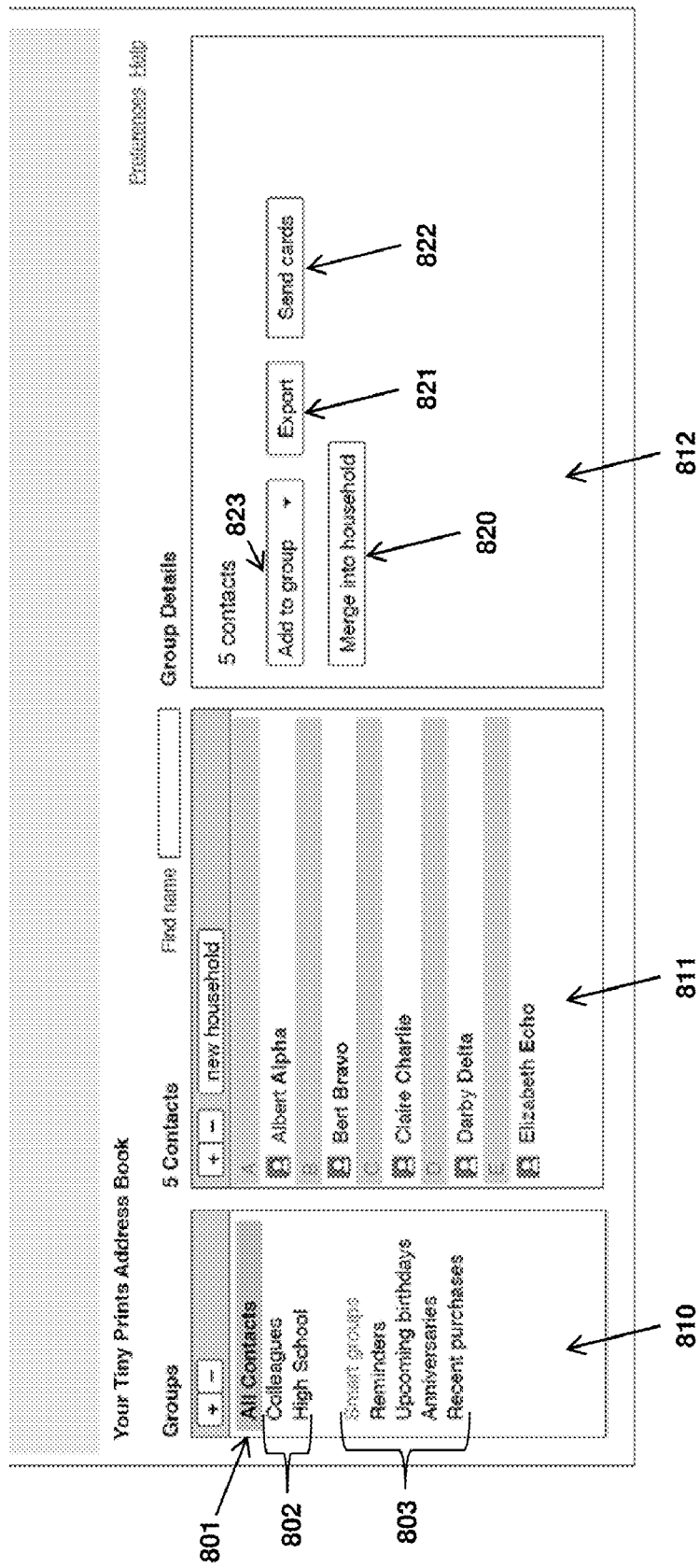
FIG. 8 illustrates one embodiment of an address book for viewing and managing a contacts database.

FIG. 8 illustrates a graphical user interface (GUI) for viewing and managing contacts stored within the stationery service contacts database 210 according to one embodiment of the invention. The GUI includes a first region 810 for listing various contact groups; a second region 811 for listing contacts and/or households associated with the currently selected group; and a third region 812 for performing operations related to selected contacts and/or households. As mentioned above, the groups listed within the GUI include an "all contacts" group 801, user-specified groups 802 and one or more "smart groups" 803 which are automatically generated by the stationery service contacts manager 212. The smart groups 803 are groups of contacts and/or households arranged according to upcoming chronological events. For example, in FIG. 8, the smart groups include a "reminders" group which includes reminders for contacts and/or households arranged in chronological order; an "upcoming birthdays" group comprised of contacts arranged in order of upcoming birthdays; an "anniversaries" group comprised of contacts arranged in order of upcoming anniversaries; and a "recent purchases" group comprised of contacts arranged in an order of stationery purchases made by the end user. By way of example, when the "upcoming birthdays" group is selected in region 810, a listing of contacts is provided in region 811 in a chronological order of upcoming birthdays (e.g., with the contact with the first upcoming birthday at the top of the list). In one embodiment, the end user is provided with the ability to add smart groups based on any date-based variable associated with the contacts database. Other types of smart groups may include "requested addresses" containing a listing of those contacts for whom mailing addresses have been requested (as described below); a "recently confirmed" smart group containing a listing of those contacts who have responded and confirmed their addresses; and a "last import" smart group comprised of those contacts included in the last contacts import.

Figure 9:
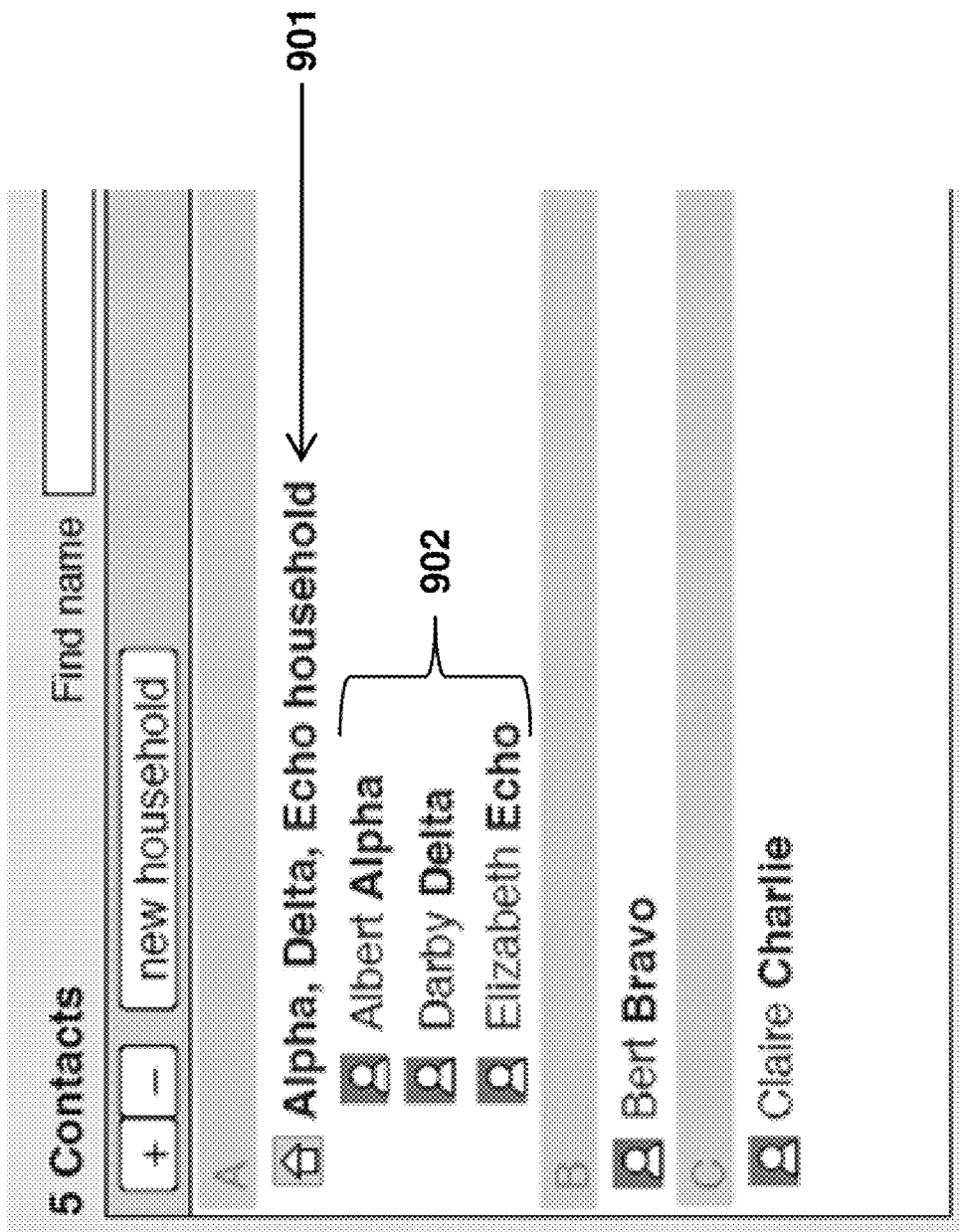
FIG. 9 illustrates households comprised of multiple contacts according to one embodiment of the invention.

Multiple contacts and/or households may be highlighted in region 811 (e.g., by holding CTRL and selecting with a mouse) and processed by selecting options in region 812. For example, a drop-down menu of available groups 823 allows the user to associate the highlighted contacts with a group. An export button 821 allows the user to export the contacts to a file (e.g., a CSV or vCard file). A "merge into household" button 820, when selected, allows the end user to create a new household comprised of the selected contacts. Upon selection of this button, the end user is presented with a field for entering a new household name. As illustrated in FIG. 9, once a new household is created, the household 901 is displayed within the second region 811 of the GUI along with other contacts and/or households. As illustrated, the contacts 902 associated with the household are displayed beneath the household entry 901 and indented.

Figure 10:
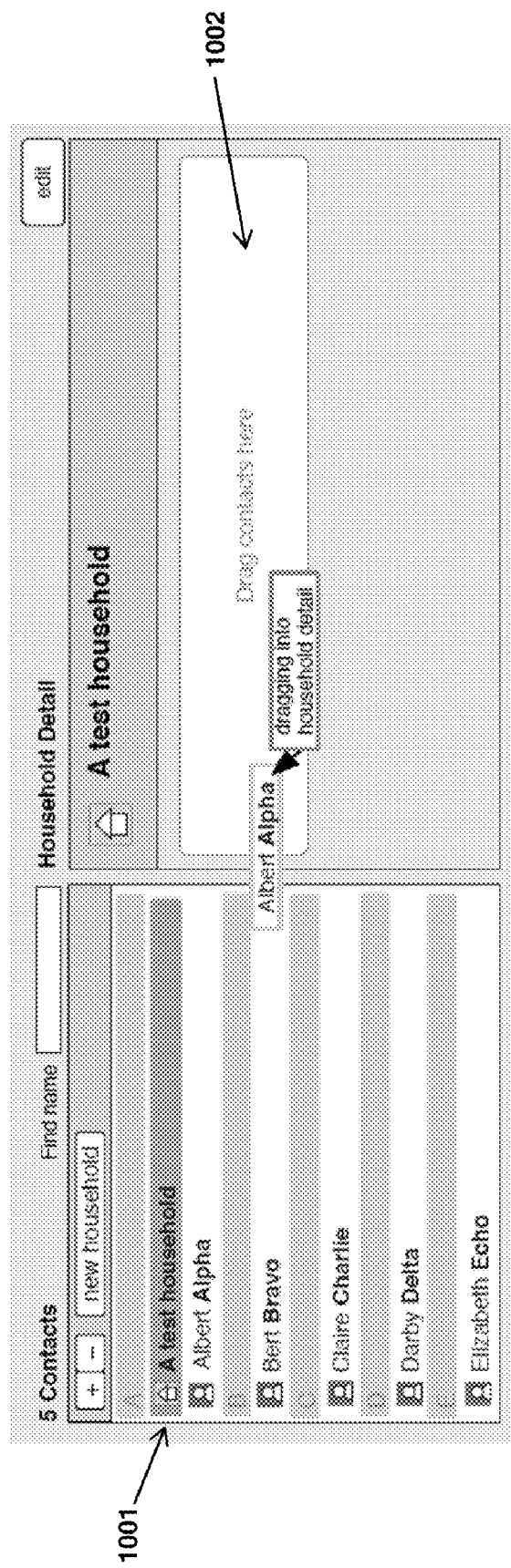
FIG. 10 illustrates one embodiment of a GUI for incorporating contacts into households.

As illustrated in FIG. 10, in one embodiment of the GUI, when a household entry 1001 is selected from within the second region 811 of the GUI, contacts listed in the second region may be clicked on and dragged into a household detail region 1002 to add the contacts to the household. Multiple contacts may be selected by selecting the CTRL key and highlighting the contacts with a mouse or other cursor control device.

Figure 11:
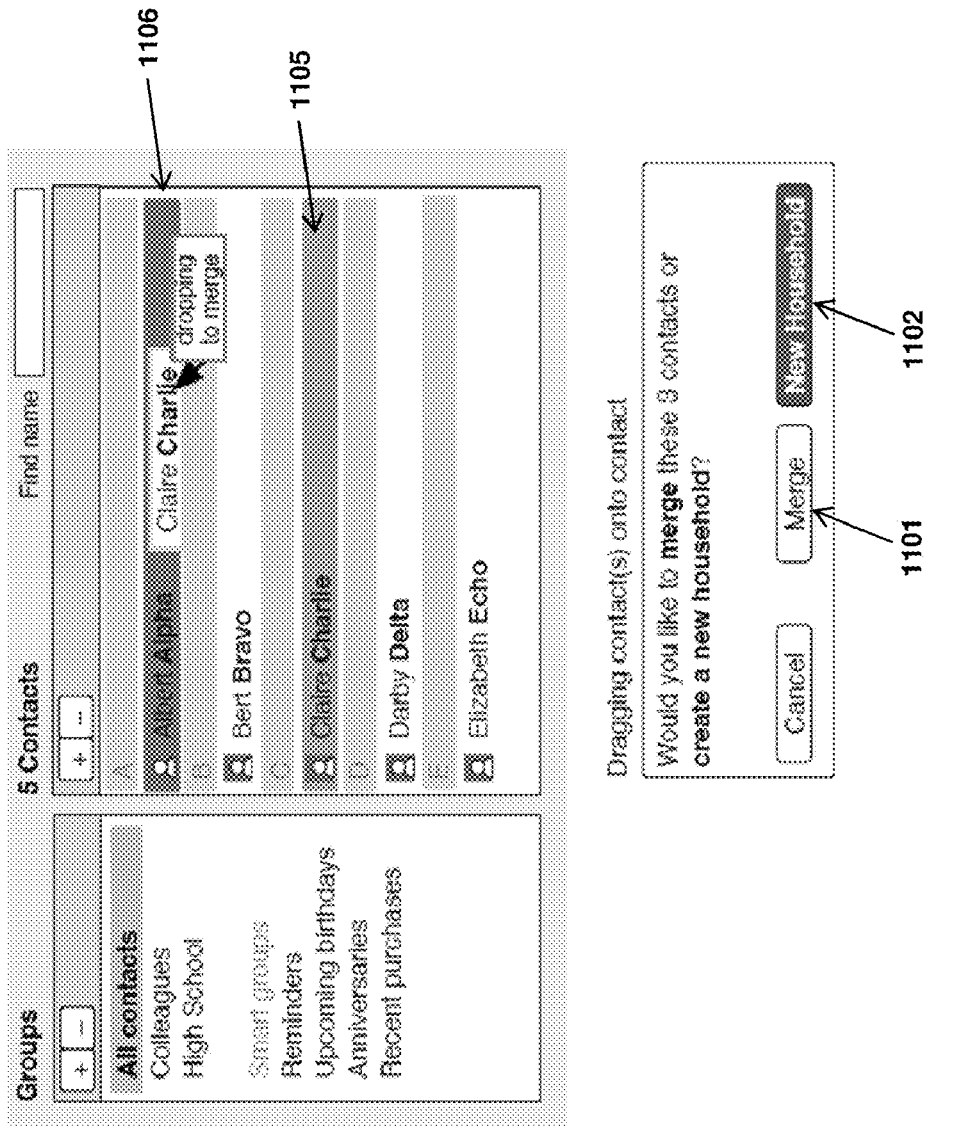
FIG. 11 illustrates another embodiment of a GUI for incorporating contacts into households and/or merging contacts.

As illustrated in FIG. 11, in one embodiment, a user may select one or more contacts 1105 (e.g., by holding down the CTRL key) and drag the contacts over another contact 1106 in the contact list. Doing so will provide the user the option to either merge the contacts (by selecting a merge button 1101) or to create a new household with the contacts (by selecting a "new household" button 1102).

Returning to FIG. 8, region 812 also includes a selectable option to "send cards" to the contacts selected in region 811. Selecting this option causes the stationery personalization engine 220 to begin the stationery design process using contacts identified by the stationery service contacts manager 212 (e.g., starting at step 309 in FIG. 3). For example, the user will be provided the option to select a stationery template and enter a default message and/or a personalized message for certain contacts. After the mail order is completed, the print module 250 will transmit the stationery order to one of the internal printers 251 or the external print service 252 and, after printing, the stationery order will be mailed to the selected contacts.

Figure 12:
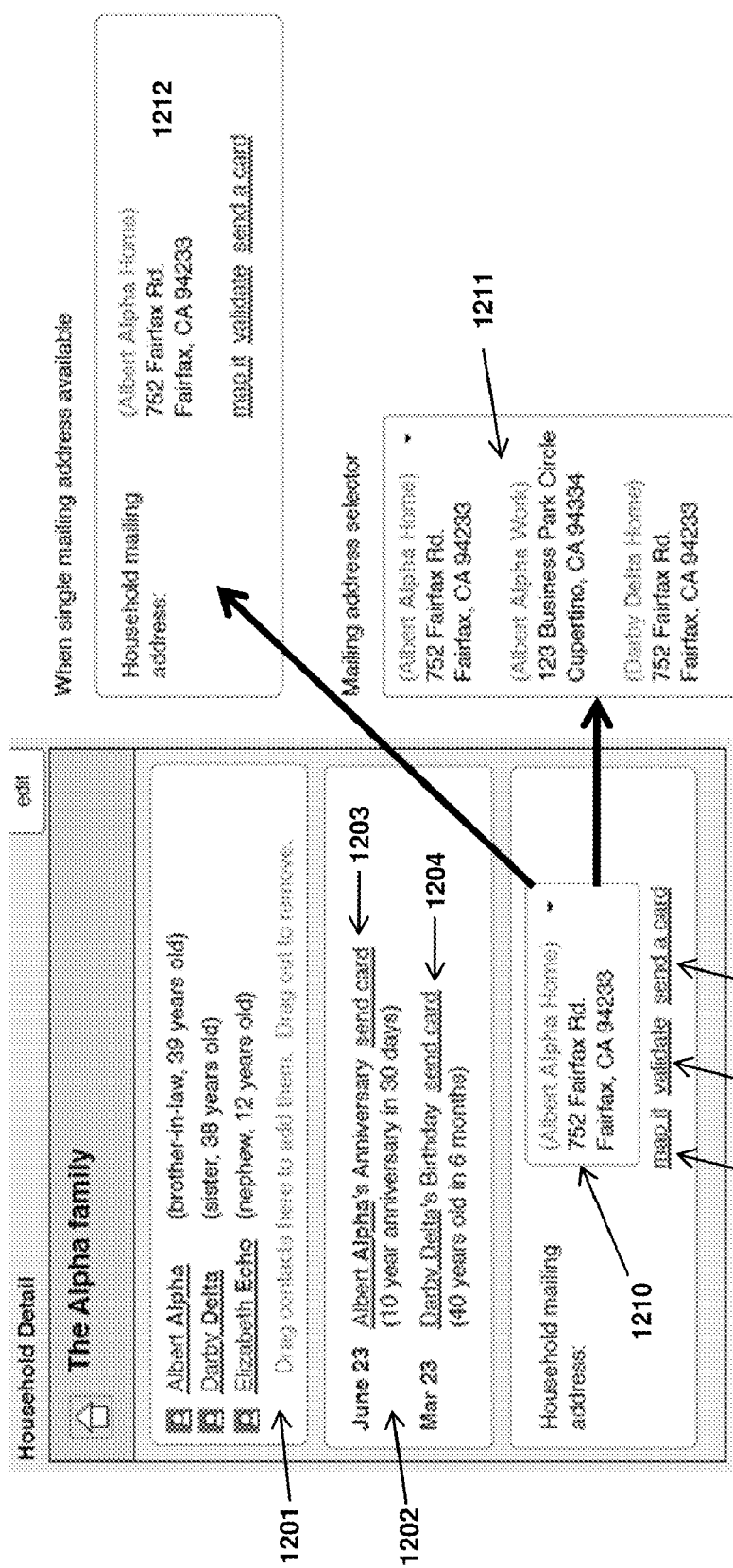
FIG. 12 illustrates a window displaying household details according to one embodiment of the invention.

FIG. 12 illustrates one embodiment of a household details window which is generated by, for example, double-clicking on the household within the contacts/households region 811. The window includes a first region 1201 for listing the contacts within the household, with hyperlinks linking to each of the contacts, a second region 1202 for displaying upcoming dates associated with the members of the household (as well as links 1203, 1204 for sending a card to each of the household members). In addition, a drop-down menu 1210 is provided which is automatically populated with all of the different addresses associated with each of the household members. As shown at 1211, each entry in the drop-down menu includes an address, an indication of the contact associated with the address and a classification of the address type (e.g., work, home, etc). Links 1205-1207 are provided and dynamically updated for each address to map the address 1205 (e.g., by linking to Google Maps); to validate the address 1206 (as described herein); and to send a card 1207 (as described herein). In circumstances where a single address is associated with all of the household members, the drop-down is not provided as indicated at 1212.

Figure 13:
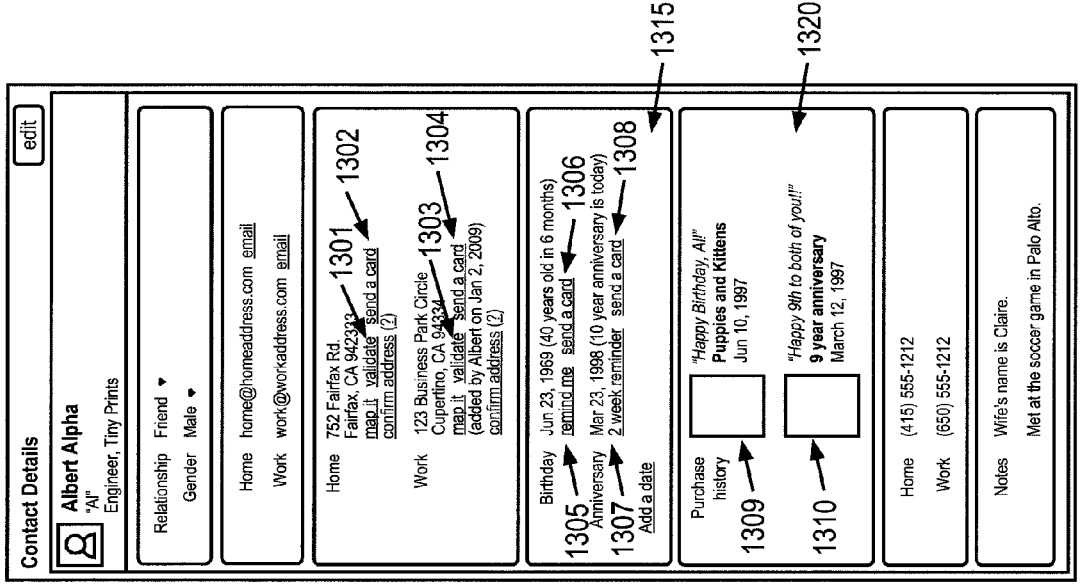
FIG. 13 illustrates a window displaying contact details according to one embodiment of the invention.
Figure 14:
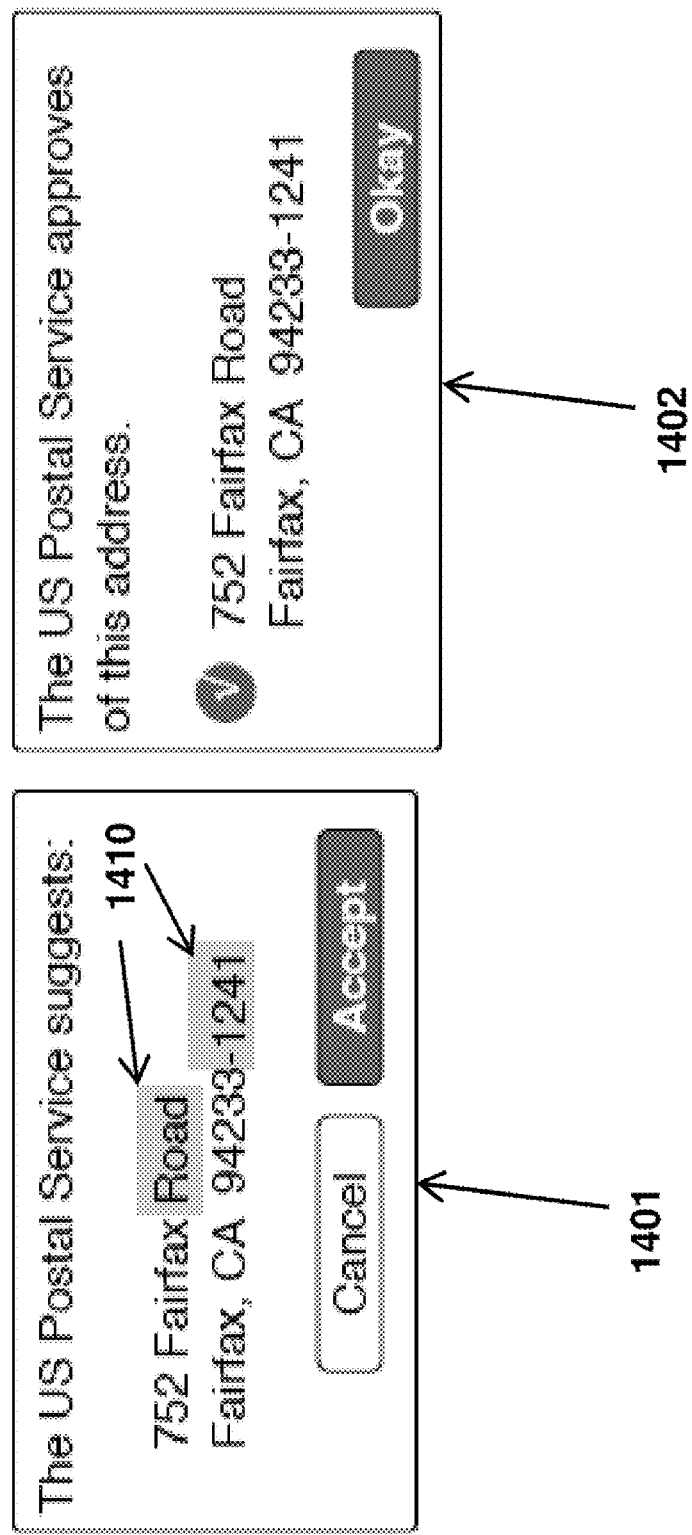
FIG. 14 illustrates windows for confirming mailing addresses according to one embodiment of the invention.

FIG. 13 illustrates a window for displaying and manipulating contact details according to one embodiment of the invention. In one embodiment, the contact details window is generated in response to a user double-clicking on a contact in region 811. Multiple addresses are provided for the contact and, for each address, a link is provided to "validate" the address 1301 and 1303. In one embodiment, to validate the address, the stationery service contacts manager 212 transmits a query containing the current address to an address validation service such as those available from the US postal service (USPS). As illustrated in FIG. 14, in one embodiment, in response to selection of the "validate" link, the USPS either suggests corrections, as indicated by highlighted regions 1410 of selection box 1401 or validates the address, as indicated in selection box 1402.

In addition, a "send card" link 1302, 1304 is provided for each address in the contact details window which initiates the process of selecting, designing and mailing stationery for the contacts associated with the address (e.g., as described above with respect to the "send card" button in region 812 of FIG. 8).

In addition, a "reminder" region 1315 is provided within the contact details window to provide reminders of upcoming dates such as birthdays and anniversaries for contacts within the user's contacts list. The layout within the region comprises an indicator of the type of reminder (e.g., birthday), followed by the date of the reminder, followed by a brief description (e.g., 40 years old in 6 months). In one embodiment, certain contact data such as birthdays and anniversaries are identified by the stationery service contacts manager 212 as reminders. In addition, links are provided 1305,1307 to configure automated reminders for the end user. For example, in one embodiment, upon setting a reminder for a particular event, the stationery service contacts manager 212 will transmit an email, instant message, or SMS message to remind the end user of the event and/or will update the user's calendar with the event. Various other types of reminders may be employed while still complying with the underlying principles of the invention. In addition, for each reminder, a "send card" link 1302, 1304 is provided to initiate the process described above to design and mail stationery to the contact associated with the reminder.

In addition, a purchase history region 1320 is provided within the contact details window to display the recent purchase history of the end user. As illustrated, entries within the purchase history include images of the stationery designs 1309 and 1310 recently purchased by the end user, along with an indication of the stationery type and message, and the date that the stationery was purchased.

In addition to using the address validation techniques described above, one embodiment of the invention confirms current mailing addresses by transmitting email messages to contacts. As illustrated in FIG. 15, in response to the selection of a particular contact, a window 1501 is presented asking the end user if an email request should be sent. A default request message is used unless the user selects the checkbox for adding a personal message. If this checkbox is selected a window such as 1502 appears to allow the user to enter a personal message. In one embodiment, upon selection of "add a personal message" check box, the message field is pre-populated with the default message, which may then be edited by the user.

A GUI for selecting multiple contacts is illustrated at 1503. In this embodiment, contacts to receive the email request are selected via check-boxes. In one embodiment, certain contacts who have specifically asked not to receive requests and/or for whom the user does not have an email address are grayed out (thereby preventing selection via a checkbox). User selection of a "send request(s)" button from 1503 or a "send request" button within window 1501 will cause the confirmation request email to be sent to the selected contacts.

Both window 1501 (for a single request) and 1503 (for multiple requests) include a "view sample email" link to display a sample request email. The sample request email may be displayed in a new window, a new DHTML layer, or as an in-line DIV (HTML <div> element).

Figures 16A, 16B:
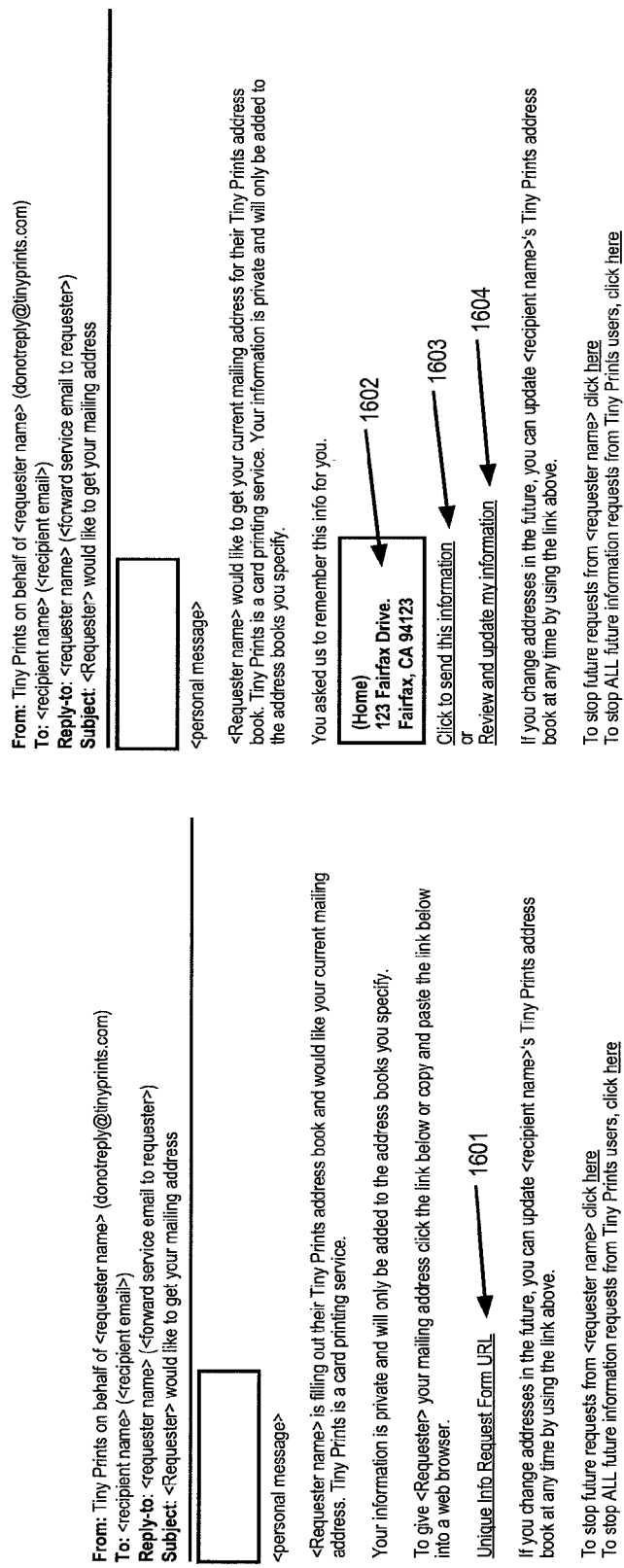
FIGS. 16a-b illustrate exemplary address confirmation requests transmitted to contacts in one embodiment of the invention.

FIG. 16*a* illustrates one embodiment of a confirmation request email to be sent to contacts for whom no address currently exists in the user's address book. A hyperlink 1601 may be selected from within the email message to open a Web page on the online stationery service 200 and enter the contact's address information. In one embodiment, the URL 1601 is unique for each individual contact (e.g., containing a sequence of characters uniquely identifying the contact to whom the email was sent).

FIG. 16*b* illustrates one embodiment of a confirmation request email to be sent to contacts for whom an address currently exists on the online stationery service 200. In this embodiment, the address which is stored on the online stationery service 200 is provided within the body of the email 1602. A first hyperlink 1603 is provided to allow the contact to confirm that the address information is correct and a second hyperlink 1604 is provided to allow the contact to review and update the address information and/or other personal information related to the contact. Selection of the first hyperlink 1603 generates a thank you message indicating that the current address information has been confirmed and selection of the second hyperlink 1604 generates a series of data entry fields within a Web page for the user to update the address information. In one embodiment, the data fields are pre-populated with the existing address information.

Figure 17:
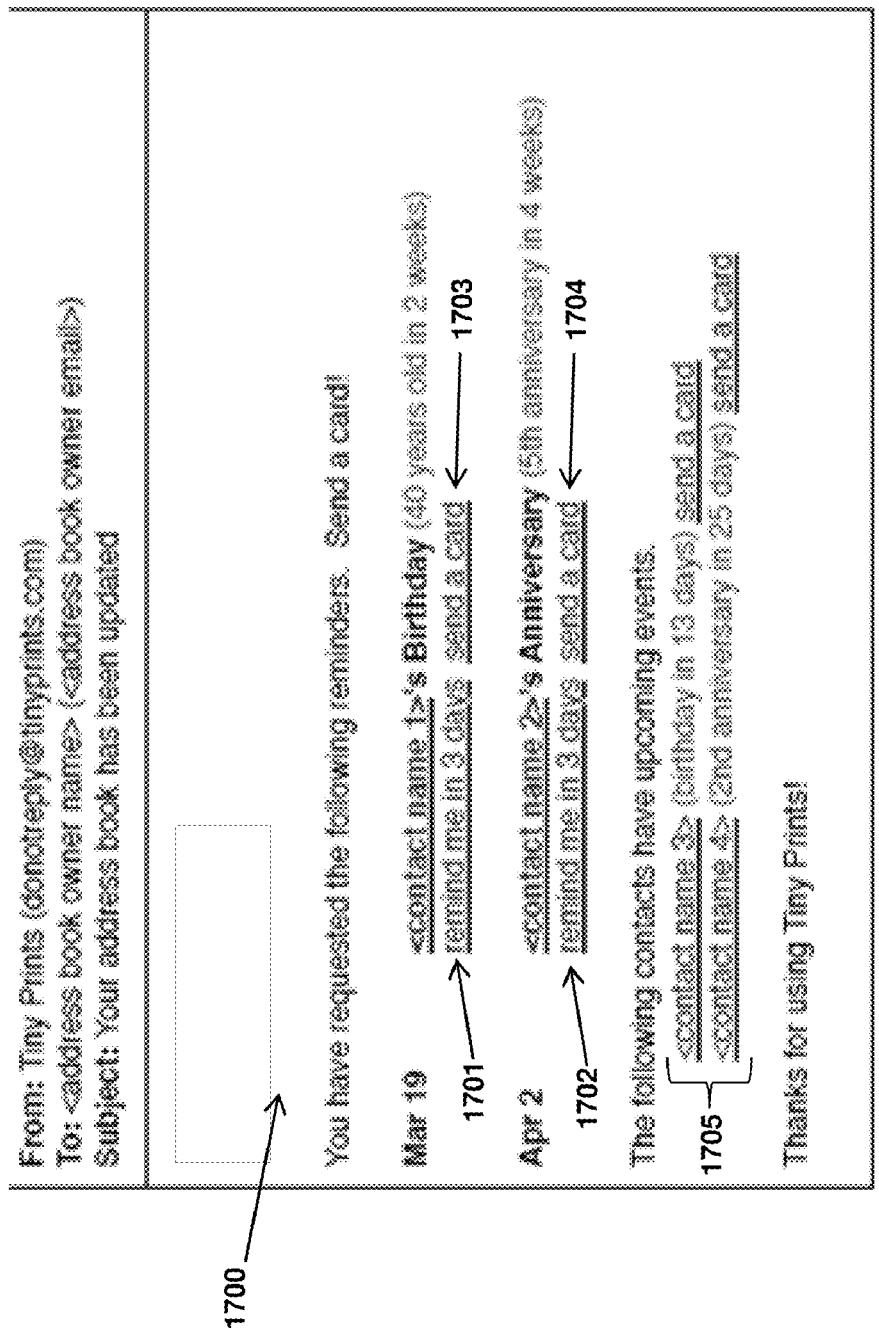
FIG. 17 illustrates reminder emails transmitted to an end user according to one embodiment of the invention.

In addition to providing reminders within the address book window shown in FIG. 8 and the contact details window shown in FIG. 13, one embodiment of the stationery service contacts manager 212 will automatically generate reminder emails for the end user. FIG. 17 illustrates one such reminder email in which upcoming dates are listed in chronological order and, for each reminder, links are provided to generate a subsequent reminder 1701-1702 (e.g., "remind me again in 3 days"). In addition, for each reminder, a "send a card" link 1703-1704 is provided which, when selected, initiates the stationery design process on the online stationery service 200 for the associated contact(s) (as described above). In addition, a secondary listing 1705 is provided for those contacts for which the user has not specifically requested a reminder.

Figure 19:
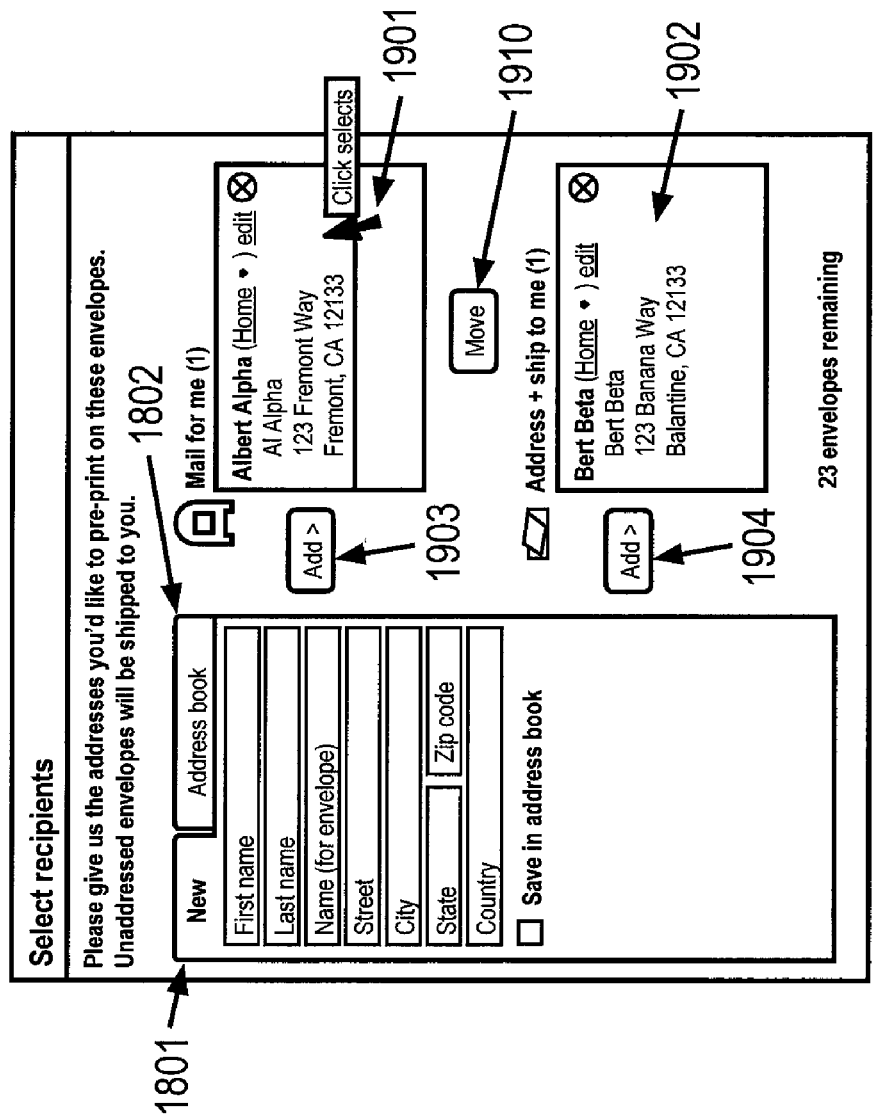
FIG. 19 illustrates GUI features employed in one embodiment of the invention for selecting options for directly mailing stationery to contacts and for mailing stationery to the end user of the stationery service.

As mentioned above, in one embodiment of the invention, the online stationery service 200 will mail stationery to selected contacts on behalf of the end user. FIGS. 18*a-b* illustrate one embodiment of the invention for selecting contacts for a stationery mailing. Two tabs 1801-1802 are provided for specifying contacts. The first tab 1801 generates a series of data entry fields 1805 for specifying a new contact name and address (for someone not found in the user's address book). The second tab 1802 provides a list of selectable contacts 1804 from the user's address book 210. A drop-down menu 1803 is provided to select specific groups of contacts to be displayed within the list 1804. Individual contacts within the list 1804 are selected via check boxes, as illustrated. Regardless of whether the contacts are entered manually or selected from the address book, the user selects an "add" button 1807 to add the contact information to the set of contacts for the stationery order. Contacts may be added to one of two different groups: a "mail for me" group 1810 which includes contacts to whom the online stationery service 200 will mail stationery directly; and a "address+ship to me" group 1811 which includes contacts for whom the online stationery service will print stationery/envelops and then mail the order to the end user. In FIGS. 18*a-b*, the "mail for me group" is opened, thereby displaying those contacts selected for a direct-mail option. The "address+ship to me" group may be displayed in a similar manner upon selection of a hyperlink 1811, as illustrated in FIG. 19. Specifically, in FIG. 19, two separate lists are compiled: a "mail for me" list 1901 and a "address+ship to me" list 1902. Contacts may be added to each of the lists via two corresponding add buttons 1903 and 1904. In addition, contacts may be moved between the lists by highlighting a contact from one of the lists and selecting a "move" button 1910.

Thus, within the GUI shown in FIGS. 18*a-b* and 19, two different options 1801-1802 are provided for selecting contacts and two different delivery options ("mail for me" or "address+mail to me") are provided for delivering the stationery order.

Figure 20A:
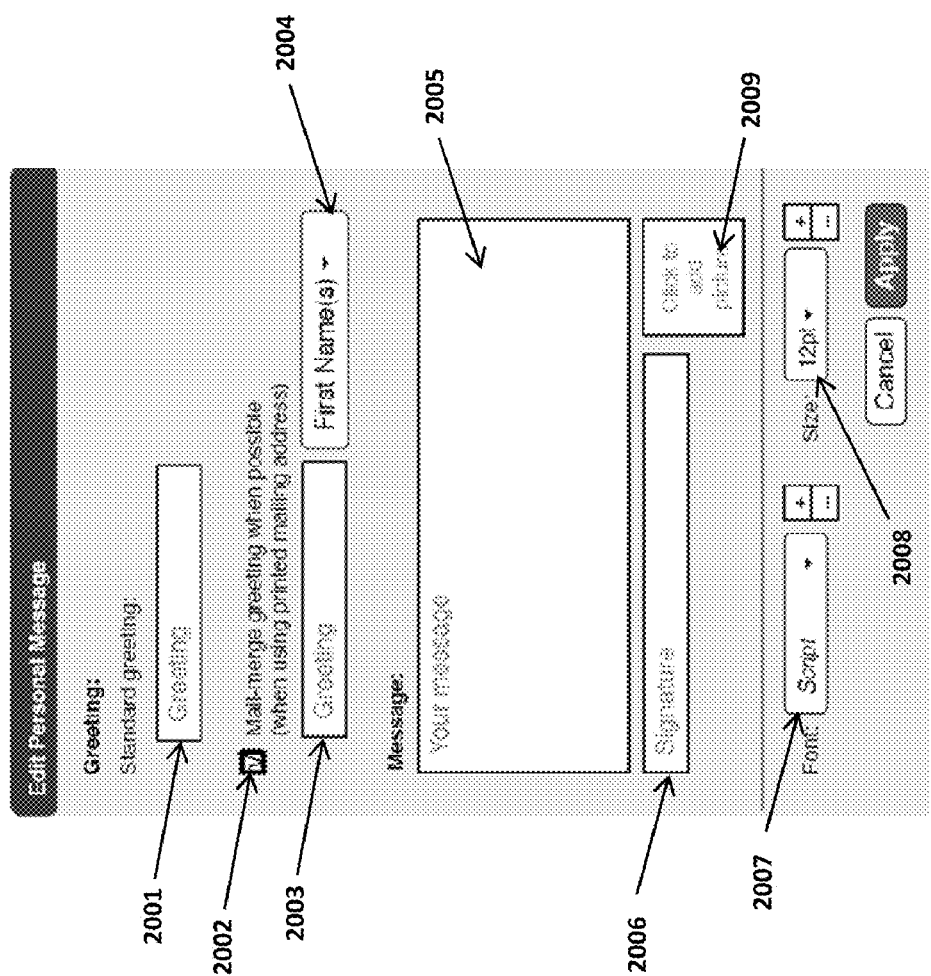
FIG. 20a-c illustrate GUI features for selecting default and custom messages to be printed on stationery and mailed contacts within an address book.

As mentioned above, one embodiment of the invention allows the end user to specify a default message and/or to enter personalized messages for each contact. FIG. 20*a* illustrates one embodiment of a Web-based GUI for specifying a default message. A greeting field 2001 is provided for entering a default greeting (e.g., "Hi," "Hey," "Dear," etc.) and a selectable option 2002 is provided to mail merge the greeting when possible (e.g., using contact information from the user's address book 210). For mail merge, a drop down menu 2004 is provided to indicate whether the first or last name of the contact should be used. "First name" is selected in FIG. 20*a*, indicating that the greeting will be placed in front of the first name of the stationery recipient (e.g., "Hey Albert"). A message field 2005 is provided for entering a default message and a signature field 2006 is provided for entering a default signature (e.g., "Best Regards, Tom"). In addition, options are provided for entering a picture 2009; selecting a default font 2007; and selecting a default font size 2008.

Figure 20B:
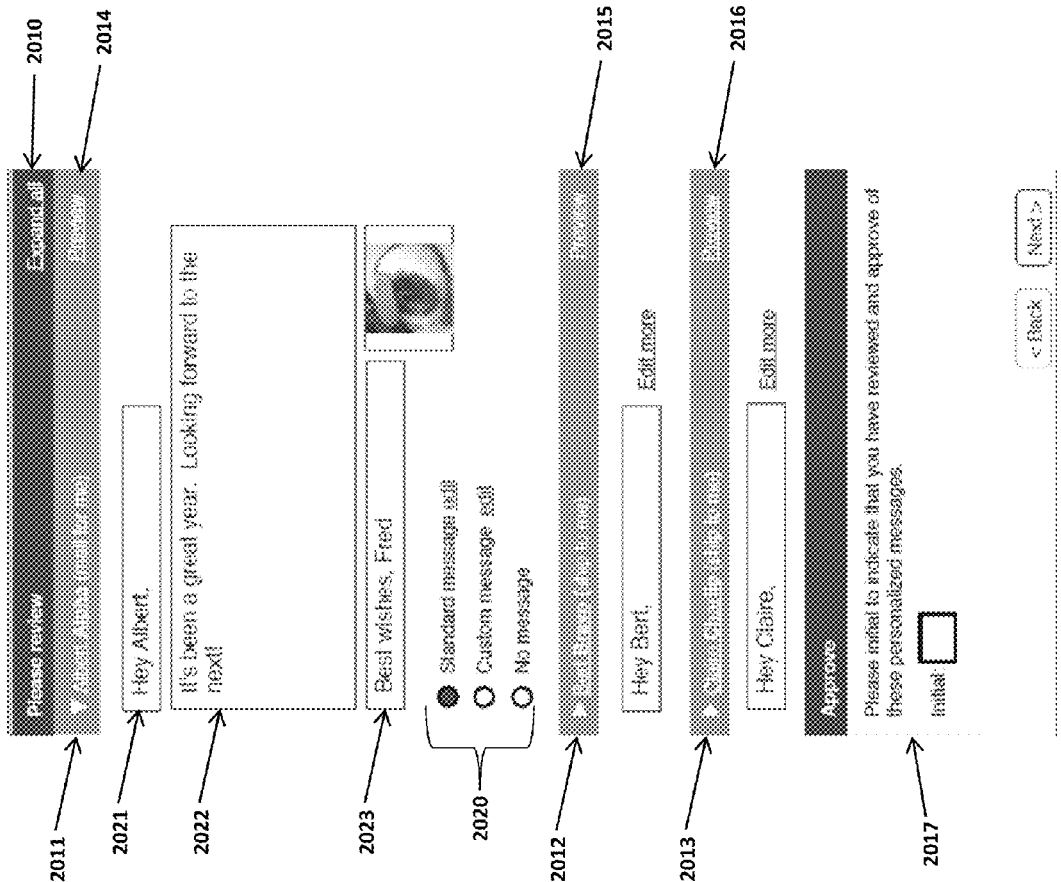
Figure 20C:
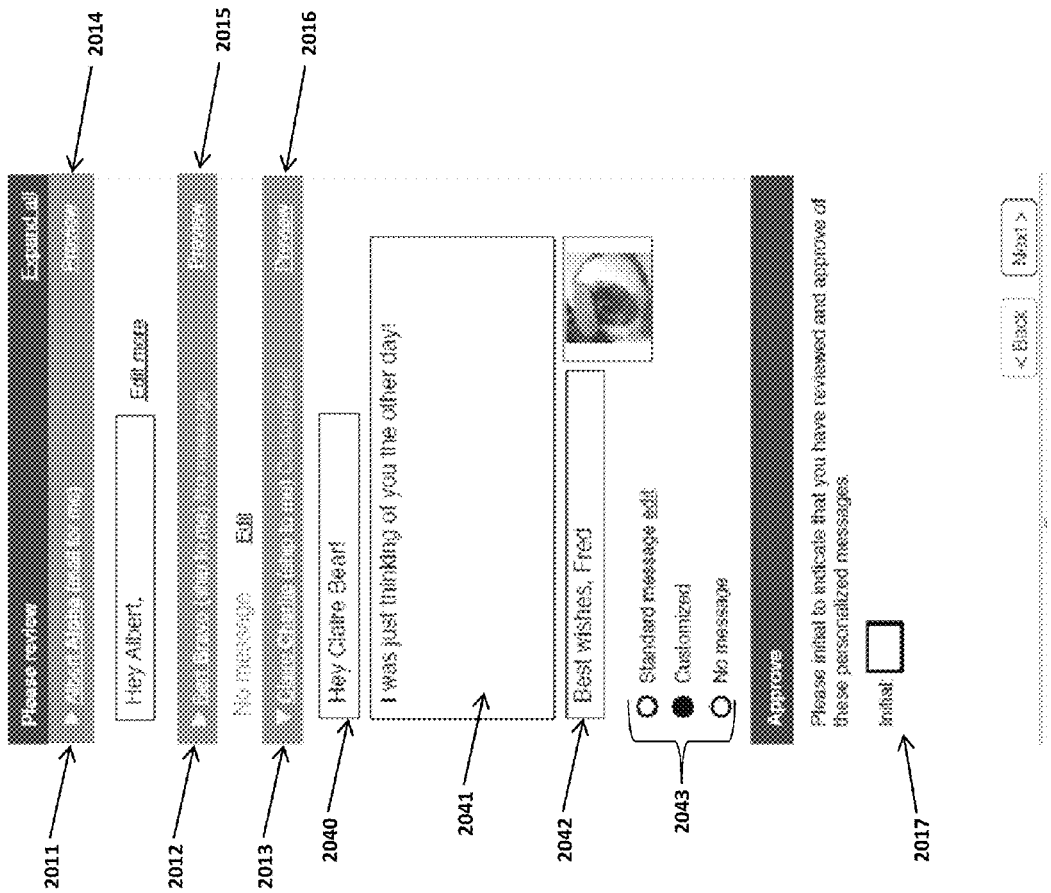

FIGS. 20*b-c* illustrate a GUI for reviewing the messages associated with each of the contacts prior to printing and mailing. A separate contact entry 2011-2013 is provided for each contact. A "preview" link associated with each contact entry allows the end user to preview the current greeting 2021, message 2022 and signature 2023 for each contact. The preview for contact 2011 is illustrated in FIG. 20*b* and the preview for contact 2013 is illustrated in FIG. 20*c*. For each contact entry, radio selection options 2020 are provided to allow the user to select the "standard message," a "custom message," or "no message." In the illustrated example, a standard greeting, message, and signature is selected for contact 2011 and a custom greeting, message, and signature is provided for contact 2013. From the preview GUI, the user may edit each of the messages directly (e.g., by placing a cursor within data entry fields 2040, 2041 or 2042). All of the contact entries may be opened and displayed via an "expand all" link 2010. Following the review of all greetings, messages and signatures, an approval region is provided in which the user enters his/her initials 2017 to approve the final results.

Figure 21:
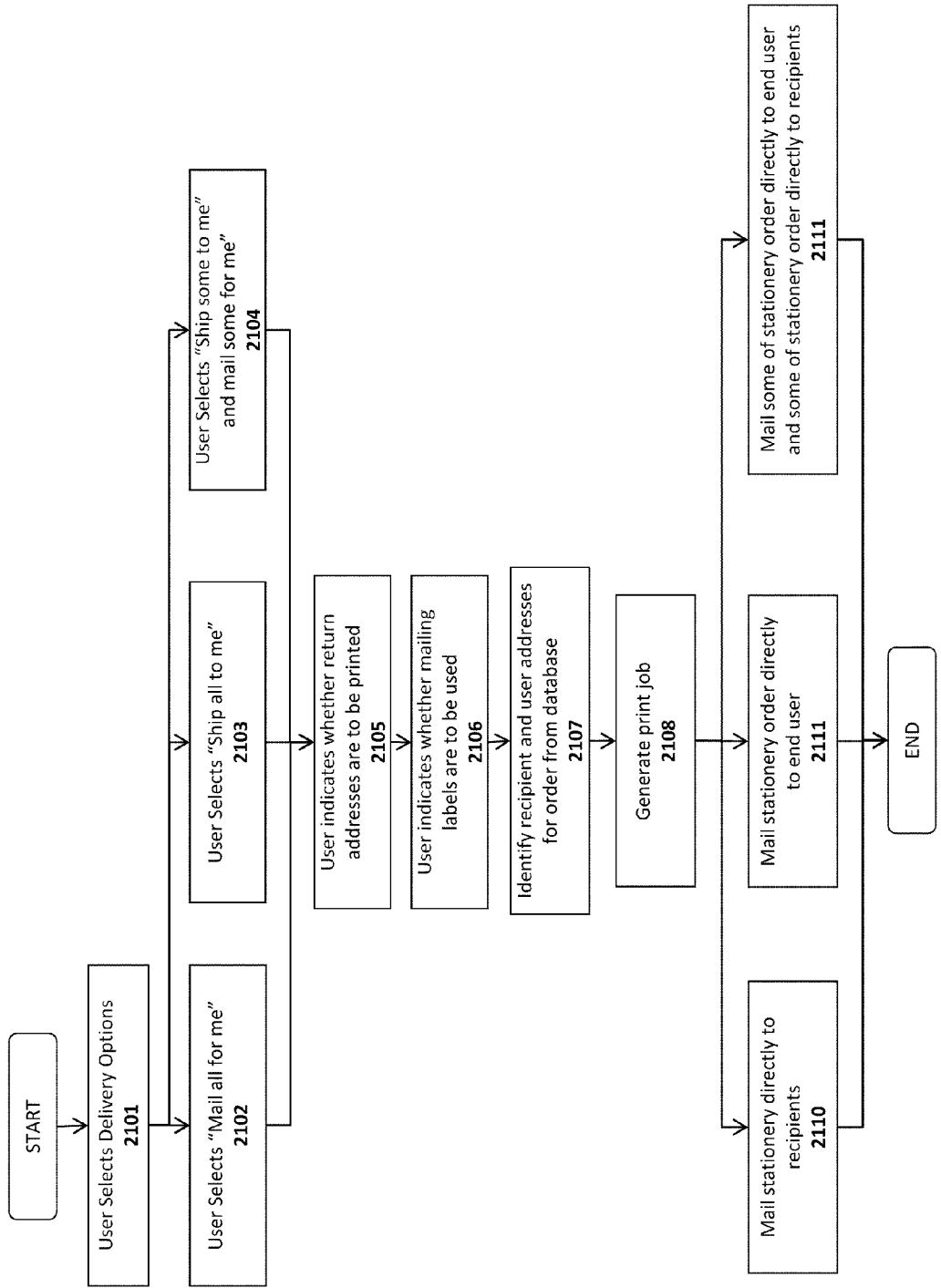
FIG. 21 illustrates a method according to one embodiment of the invention for processing a stationery order.

A method for selecting stationery purchase options according to one embodiment of the invention is illustrated in FIG. 21. In one embodiment, the method is implemented within the context of the GUI and system described above.

At 2101, after selecting a set of recipients from the user's address book and selecting a personalized and/or default message for each recipient, a user selects stationery delivery options. In one embodiment, the options include "mail all for me" 2102 indicating that the stationery service will be responsible for printing and mailing the stationery order directly to recipients; "ship all to me" 2103 indicating that the stationery service will print and ship the order directly to the end user; and "ship some for me and mail some for me" 2104 indicating that the stationery service will be responsible for printing and mailing a portion of the stationery order directly to recipients and will ship the remainder of the order to the end user.

At 2105, the user indicates to the stationery service whether return addresses are to be printed on envelopes. At 2106, the user indicates whether mailing labels are to be used. At 2107, the stationery service identifies the recipient and user addresses from its database and, at 2108, generates a print job to print the stationery and envelopes containing the addresses according to the user's specified preferences (e.g., using mailing labels, return addresses, etc). The stationery order (stationery and envelopes) is then printed.

At 2110, if the user selected "mail all to me" 2102, then the stationery service mails the stationery directly to the recipients. At 2111, if the user selected "ship all to me" then the stationery service ships the stationery order directly to the end user. At 2112, if the user selected "ship some to me and mail some for me" then the stationery service mails some of the stationery order to recipients on behalf of the user and ships the remainder of the stationery order to the end user.

In one embodiment, the stationery order is generated and sent to a printing service as described in the co-pending US patent application entitled SYSTEM AND METHOD FOR PROCESSING PERSONALIZED STATIONERY DESIGNS AND SELECTING FULFILLMENT ORDER SITES, Ser. No. 12/638,851, filed Dec. 15, 2009, which is assigned to the assignee of the present patent application and which incorporated herein by reference.

Figure 22:
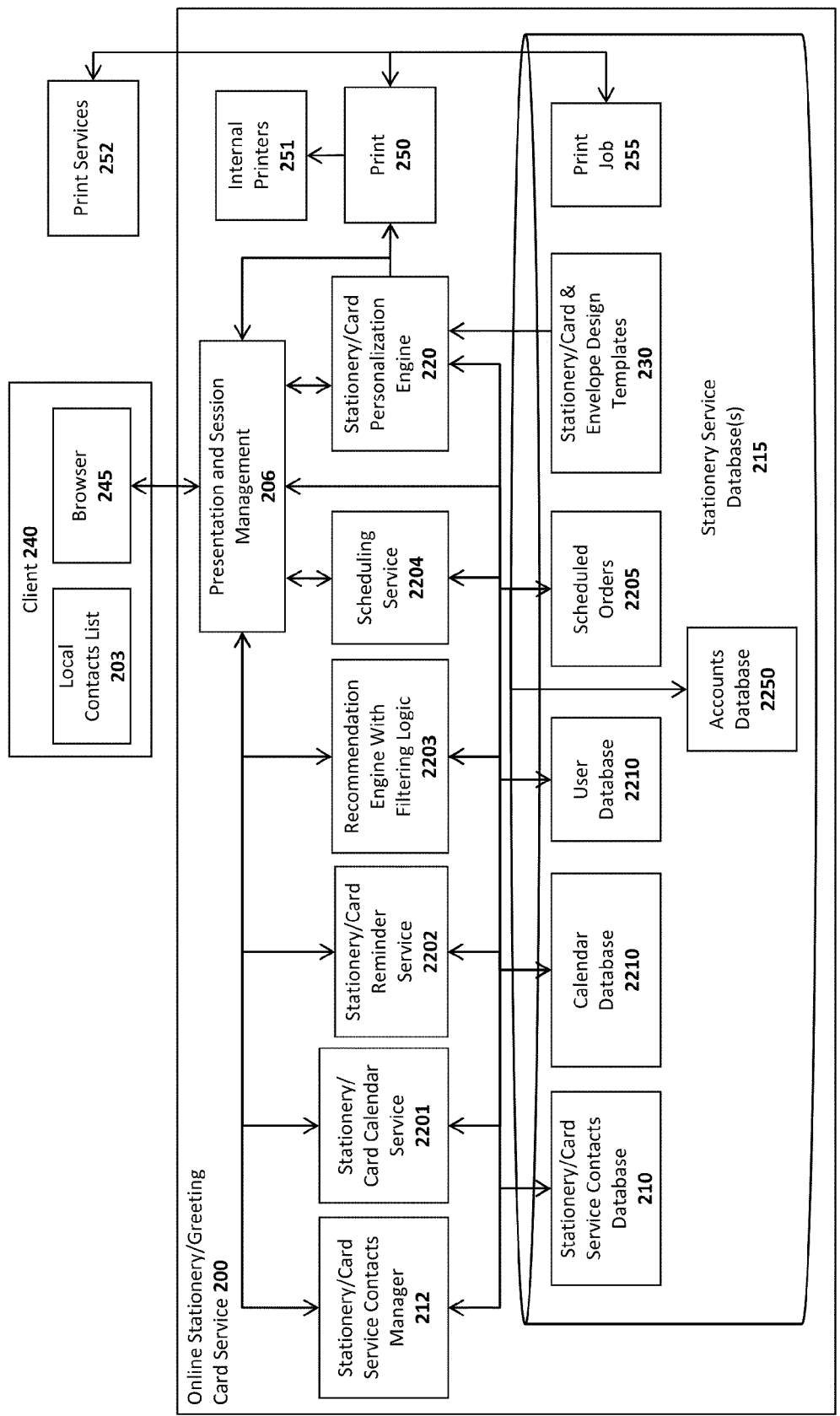
FIG. 22 illustrates one embodiment of a system architecture which integrates contacts and calendar data and includes a reminder service and a recommendation engine.

FIG. 22 illustrates one embodiment of a system architecture which integrates contacts and calendar data and includes additional modules for generating reminders, filtered recommendations, and for scheduling delivery of greeting cards/stationery. Specifically, in addition to the system components illustrated in FIG. 2, this embodiment includes a calendar service 2201, a reminder service 2202, a recommendation engine with filtering logic 2203 and a scheduling service 2204. The stationery/card service illustrated in FIG. 22 also includes a stationery service calendar database 2210 for storing calendar data, a scheduled orders database 2205 for storing order schedule data, a user database 2210 for storing user data (e.g., user stationery/card preferences, configuration options, etc.), and an accounts database 2250 for storing user account data. In one embodiment, the various databases shown in FIG. 22 are not actually separate databases but, rather, separate data structures (e.g., tables) within a relational database.

In one embodiment, the calendar database 2210 stores calendar data for each user of the online stationery/greeting card service 200 and the calendar service 2201 comprises executable program code for managing the calendar data (e.g., reading, adding, deleting, and modifying calendar entries). In one embodiment, the calendar service 2201 also acts as an interface to the calendar data to other system modules 212, 2202, 2203, and 2204 (e.g., by exposing a calendar data API).

The reminder service 2202 generates graphical or audible reminders of upcoming calendar events and may prioritize the events based on a set of prioritization rules. In one embodiment, the calendar events are prioritized chronologically but some events are given relatively higher priority than other events based on the relationship between the user and the card/stationery recipients (e.g., the user's parents may be given a higher priority than the user's friends, notwithstanding the event dates). For example, an entry corresponding to Mother's Day may be prioritized at the top of the list even though other events (e.g., Labor Day) are nearer in time. In one embodiment, the highest prioritized event is either the next event created by the user (birthday, anniversary, other, etc) OR the next significant Holiday where "significant" holidays are identified in the online stationery/card system and may change over time. In one embodiment, the "significant" holidays are Mother's Day, Father's Day, and Christmas.

The recommendation engine with filtering logic 2203 generates stationery/card recommendations to the end user based on the user's preferences and allows the user to filter the results according to user-specified filtering criteria. In one embodiment, the recommendations are categorized based on certain stationery/card characteristics and visually displayed to the end user in different categories (e.g., "new designs," "with pictures," etc). Moreover, in one embodiment, the recommendation engine 2203 recommends stationery designs based on the preferences of the user and/or the preferences of the recipient (if known).

In one embodiment, the scheduling service 2204 implements a scheduling algorithm to ensure that stationery/card orders are delivered within a specified delivery window and/or on a specific date. For example, the user may specify that a stationery/card order is to arrive 3-4 days prior to a recipient's birthday. In such a case, the user does not want the card to arrive to soon (e.g., 2 weeks prior to the birthday) or too late (after the birthday). To precisely schedule stationery/card orders, one embodiment of the scheduling service 2204 evaluates the time required by the print services required to fulfill the order (e.g., thermography, digital press, etc.), the delivery type (e.g., regular mail, FedEx, etc), and the end user preferences.

In one embodiment, three data points are used to determine the delivery date: processing time, fulfillment time, and shipping transit time. The processing time may be based on the type of order. For example, processing time can be 0 days for greeting cards and several days for some stationery cards (e.g., those which require additional review by the online card/stationery service prior to fulfillment). The processing time is based on business days so it must factor in non-business days such as Holidays and Weekends to determine the number of calendar days required for processing. Fulfillment time is the number of days required to print, finish and ship/mail the order and is typically between 1-3 days (e.g., depending on the printing requirements). This time is based on business days for the fulfillment site which, in one embodiment, may be different than business days for the processing site. Shipping transit time is estimated based on the fulfillment site physical location and the shipping address of the recipient. The shipping transit time is based on business days for the shipping carrier and may be different than business days for the processing site and fulfillment site. In one embodiment, after computing the sum of the three data points, the system has the number of calendar days required for the order and determines the date that the order must be sent to the processing site in order to be delivered on the specified delivery date.

Presentation and session management logic 206 generates the Web-based graphical user interface (GUI) features described below, allowing the end user to view and edit the calendar data, contacts data, filtered card recommendations, and scheduling data. As illustrated in FIG. 22, the presentation and session management logic 206 communicates with each of the other functional modules and/or communicates directly with the stationery service databases 215 to retrieve the data needed for display within the GUI. Embodiments of the Web-based GUI features generated by the presentation and session management logic 206 are set forth below.

In one embodiment, each of the functional modules illustrated in FIG. 22 exposes an application programming interface (API) to provide access to data managed by that module. For example, the contacts manager 212 exposes an API allowing the calendar service 2201 (and other modules) to access contacts data and vice versa. Alternatively, each of the functional modules may access the database(s) 215 directly.

In one embodiment, the calendar service 2201 automatically generates calendar events based on the contacts data stored within the contacts database 210. By way of example, the calendar events may include birthdays, anniversaries, and other significant milestones associated with each of the contacts in the contacts database 210. In addition, the contacts manager 212 stores relationship data identifying the relationship between the user and each of the contacts in the user's contacts database 210 (e.g., identifying the user's spouse, siblings, parents, children, etc.). The calendar service 2201 uses the relationship data to generate calendar events. For example, if the relationship data identifies the user's mother and father, then the calendar data may associate Mother's Day and Father's Day, respectively, with those contacts. Similarly, if the user is married with children the calendar service may associate his/her spouse with Mother's Day or Father's Day and/or the user's wedding anniversary.

Once calendar events are scheduled, in one embodiment, the reminder service 2202 automatically generates reminders for upcoming events. For example, if a friend's birthday is approaching, then the reminder service 2202 will notify the user a specified number of days/weeks ahead of time, so that the user has time to send a card. The specific timing of the reminder notifications may be specified by the end user and stored along with other user preferences within the user database 2211.

In one embodiment, the reminders are generated and displayed within a Web-based GUI when the user logs in to the online stationery/card service 200 (see, e.g., FIG. 23) and/or may be sent to the user in the form of an email message or mobile text message. If sent in an email, links to the online stationery/card service website may be embedded within the message to encourage the user to design a new card (see, e.g., FIG. 17 and associated text).

In one embodiment, the recommendation engine 2203 generates greeting card/stationery recommendations based on the occasion, the identity of the contact associated with the occasion, and the end user's preferences. For example, if a particular contact's birthday is approaching, the recommendation engine 2203 may recommend certain greeting card styles (e.g., modern, classical, etc.) based on the contact's preferences and/or the user's preferences. The filtering logic allows the recommendations to be filtered based on specified variables (e.g., theme, color, card format, card size, number of photos, etc.).

Figure 23:
FIG. 23 illustrates a Web-based graphical user interface ("GUI") for managing stationery/greeting card contacts, calendars, reminders, recommendations and for selecting and personalizing stationery/greeting cards.

FIG. 23 illustrates one embodiment of a Web-based graphical user interface ("GUI") for managing a user's contacts, calendars, and greeting card orders. In one embodiment, the GUI is dynamically generated for each user by the presentation and session management logic 206 illustrated in FIG. 22. The GUI includes a region 2301 for browsing greeting cards, a region 2305 for managing calendar entries and reminders, a region 2310 for reviewing and managing scheduled orders and previously-sent orders, and a region 2315 for reviewing card recommendations.

The browse region 2301 includes a first plurality of selectable hyperlinks 2302 to allow the end user to browse greeting cards based on a specified occasion (e.g., Birthday, Congratulations, Anniversary, Thank You, St. Patrick's Day, etc.) and a second plurality of selectable hyperlinks 2303 to allow the end user to browse greeting cards based on a specified recipient (e.g., For Her, For Him, For Kids). The occasion hyperlinks 2302 are dynamically generated based on the current date and, in one embodiment, the nearest upcoming holiday is placed at the top of the list. As illustrated, the region for recipients 2303 is subdivided into categories identified by an expandable and contractible icon ("For Him," "For Her," "For Kids"). Selecting the icon causes a listing of selectable recipients to appear beneath the expandable and contractible icon. For example, selecting the "for Kids" icon causes a listing of children in the user's contacts database to appear with the user's own children at the top of the list (if the user has children).

In one embodiment, selecting a particular occasion or recipient from the browse region 2301 causes recommendations associated with the selection to appear within the recommendations region 2315. Similarly, in response to selecting a particular event from the reminder/calendar region 2305 causes recommendations associated with the event to appear within the recommendations region 2315. In one embodiment, when the user initially logs in to the online stationery/ card service 200 and arrives at the GUI, recommendations are automatically provided for the entry at the top of the user's reminder list 2305.

Figure 24:
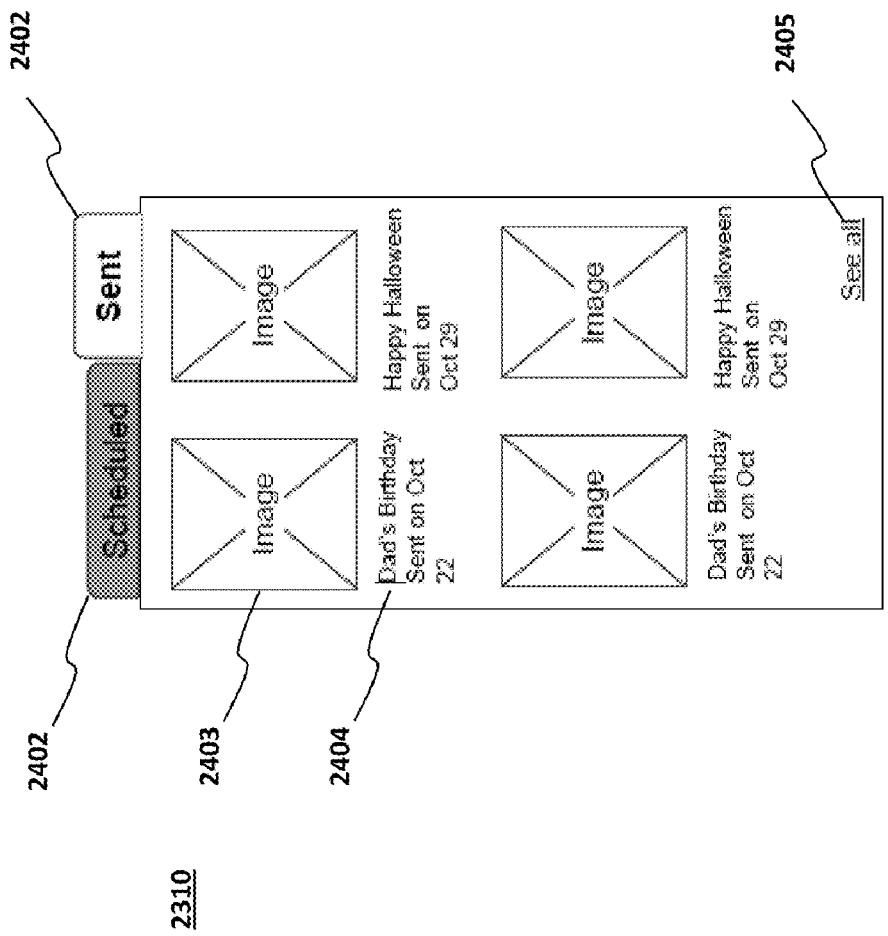
FIG. 24 illustrates a Web-based GUI having two different tabs for reviewing scheduled and previously sent greeting cards.

Additional details associated with the region 2310 for reviewing and managing scheduled orders and previously-sent orders, are provided in FIG. 24. As illustrated, a first tab 2402 is provided to allow the user to view scheduled card orders and a second tab 2402 is provided to allow the end user to view previously-sent orders. Upon selecting one of the tabs, scheduled or sent cards are displayed below the tab. For example, in FIG. 24, the sent tab 2402 has been selected thereby displaying a set of thumbnail images 2403 and associated descriptions 2404 of previously-sent greeting cards. A "see all" link is provided to allow the end user to view all scheduled or previously-sent cards.

Figure 25:
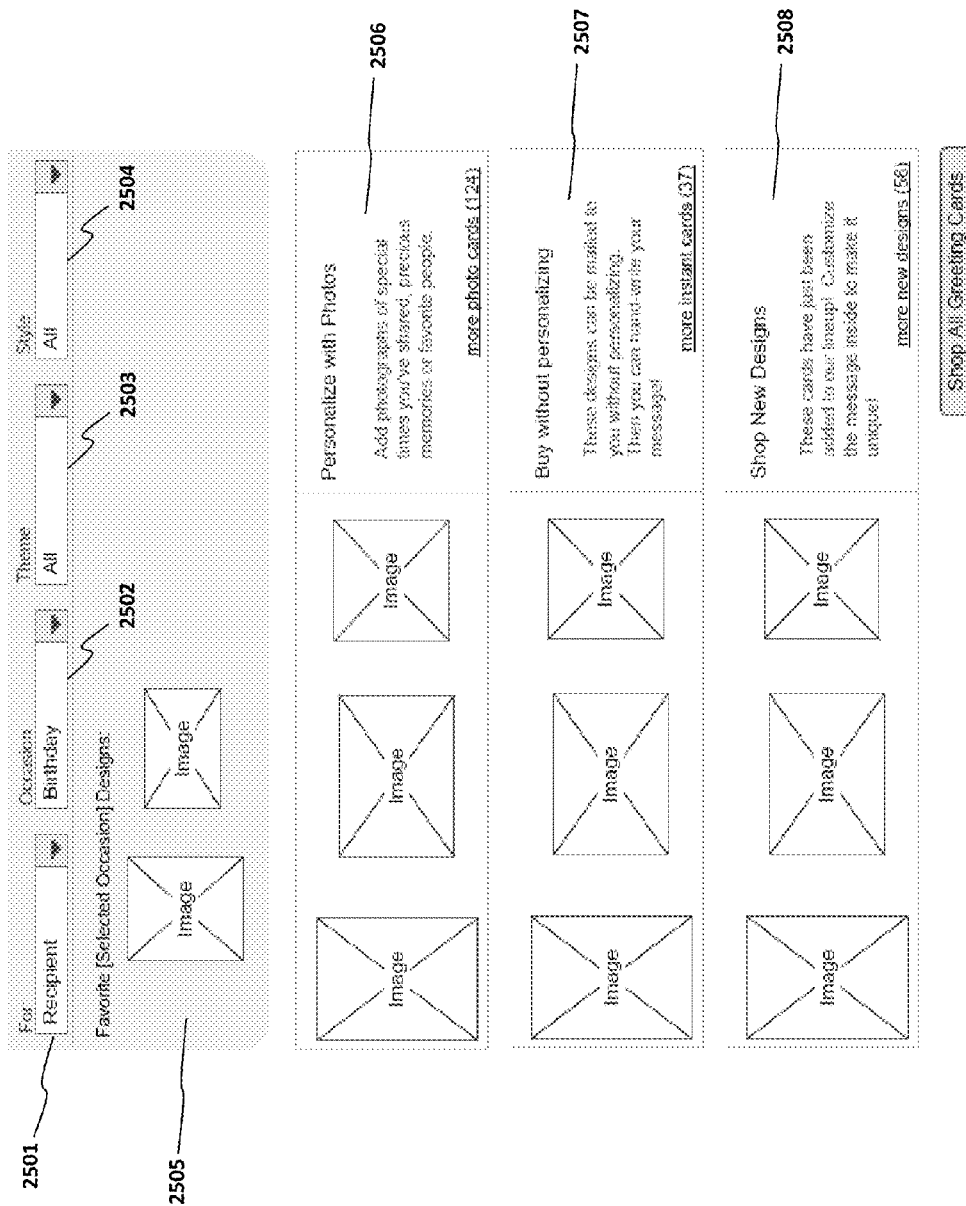
FIG. 25 illustrates a Web-based GUI for adding a new greeting card event.

Additional details associated with the recommendations region 2315 are provided in FIG. 25. As illustrated, the recommendations region 2315 includes a plurality of selectable drop-down menus 2501-2504 for filtering the recommendations including a recipient menu 2501 (for identifying a particular recipient), an occasion menu 2502 (for identifying a particular occasion), a theme menu 2503 (for selecting a particular theme), and a style menu 2504 (for selecting a particular stationery/card style). In response to selections from the drop-down menus, the recommendation engine with filtering logic 2203 shown in FIG. 22 responsively filters the set of recommendations displayed for the user. In one embodiment, the recipient menu 2501 is populated with entries from the user's contacts database.

A set of the users "favorite" stationery/card designs for a particular selected occasion are provided in a region 2505 directly beneath the drop-down menus 2501-2504. For example, if the occasion selected in the occasion menu 2402 is "birthday" then a set of the user's favorite birthday cards is displayed within region 2505.

In one embodiment, the recommendations provided to the end user are categorized into groups 2506-2508. In the specific example shown in FIG. 25, the groups include a photo card group 2506 (displaying photo cards only), a group of designs which do not require personalization 2507 (i.e., which can simply be selected and mailed to the end user), and new designs 2508 provided by the online stationery service. Various other/additional groups may be provided while still complying with the underlying principles of the invention. In one embodiment, thumbnail images representing a set of exemplary designs from each group are provided with a hyperlink to view additional designs within the group.

Figure 26B:
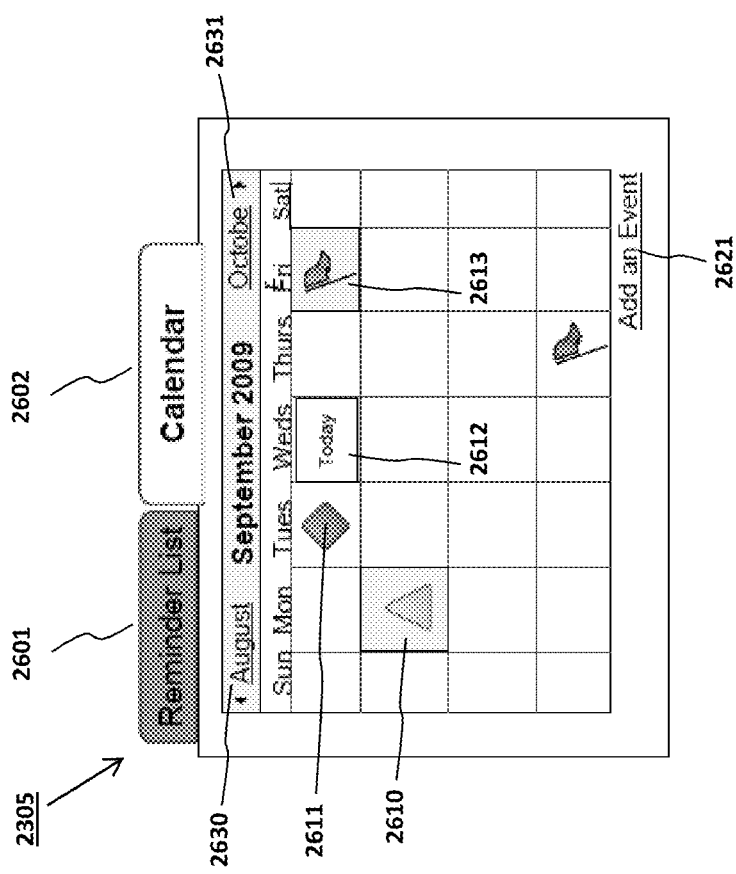
FIG. 26 illustrates a Web-based GUI for filtering and selecting greeting cards among a plurality of templates.
Figure 26A:
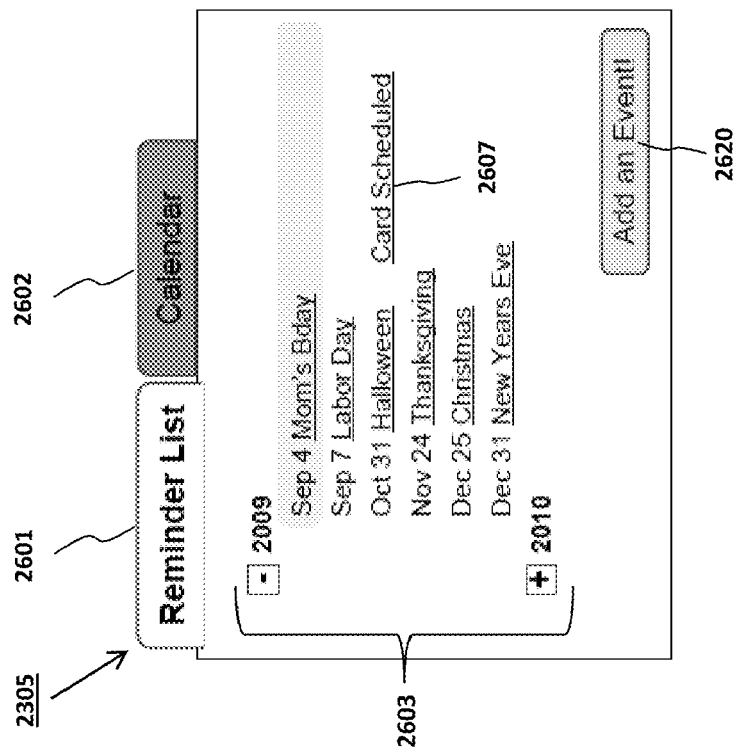

FIGS. 26a-b illustrate one embodiment of the region for managing a reminder list and calendar. As illustrated, a reminder list tab 2601 and a calendar tab 2602 are provided for selecting between the reminder list and calendar, respectively. As shown in FIG. 26a, the reminder list 2603 includes a plurality of entries populated by the reminder service 2202 using data from the calendar database 2210 and contacts database 210. In one embodiment, the reminder list 2603 is ordered chronologically, with the nearest approaching dates at the top of the list. Alternatively, in one embodiment, the reminder service 2202 may order a portion of the reminder list 2603 chronologically but may also prioritize certain entries and place them at the top of the list (notwithstanding the chronology). For example, in one embodiment, all birthdays or birthdays for a specified individual may be placed at the top of the reminder list 2603 (within a specified window of time). Similarly, the user may designate certain recipients as "high priority" (e.g., a spouse, parent, etc.). The reminder service 2202 will then place any entries related to this recipient at the top of the list (when the date associated with the entry is within a certain window of time). In one embodiment, any of the variables associated with the contacts in the contacts database may be used to prioritize the reminder list 2601.

In one embodiment, the reminder list is broken down by year, with each year having its own expandable and contractible icon. The current year is provided at the top and is initially expanded (2009 in the example). Later and previous years are not initially expanded but will expand when selected by the user. In one embodiment, only events on the current day or future dates will be shown in the reminder list. The event that is currently selected (next, or user selected) will have a highlight behind it. When a user initially signs up for the stationery/card service 200, the reminder list is initially pre-populated with holiday reminders so it will never be empty. The user may delete holiday reminders if they want. In one embodiment, when an event already has a card (or cards) scheduled, a "card scheduled" icon or link 2607 is provided. Clicking this link will take the user to a Web page showing the details associated with the card/stationery order. An "add an event" button 2620 is also provided to enable the user to add a new stationery/card event to the reminder list.

Figure 28:
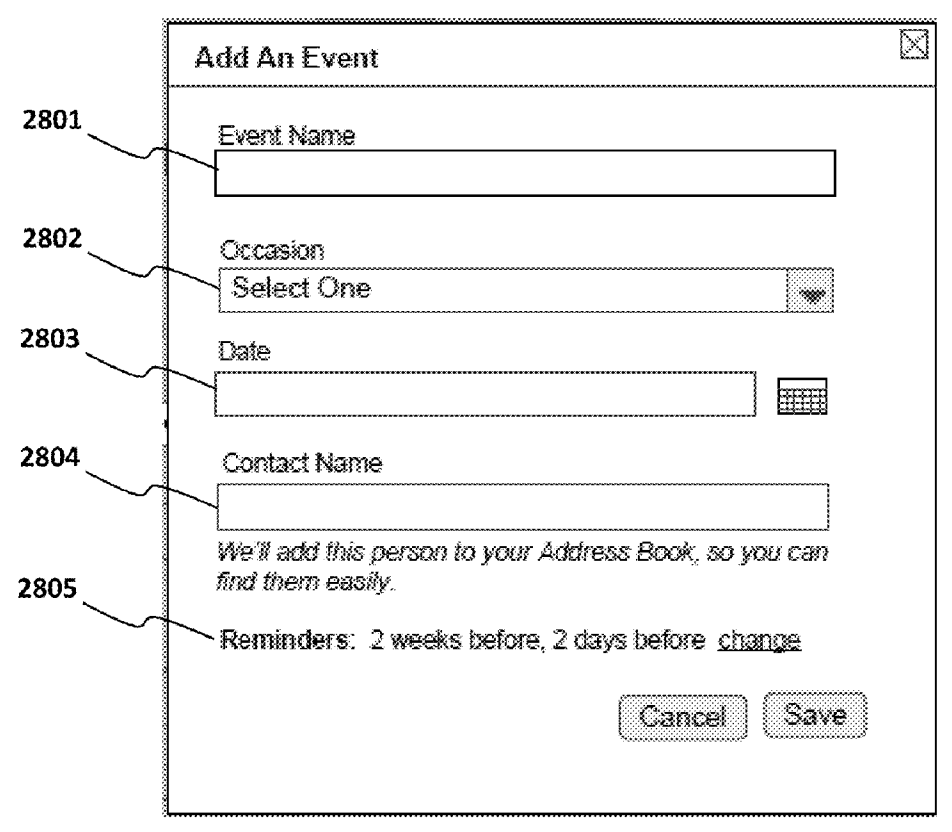

As illustrated in FIG. 28, one embodiment of the "add an event" window includes a plurality of data entry fields including an event name field 2801, an occasion field 2802, a date field 2803, a contact name field 2804, and a link 2805 to change the current reminder scheduling. In the example shown in FIG. 28, reminders are scheduled for 2 weeks prior and 2 days prior to the event. Clicking on the "change" link allows the user to modify this reminder schedule. The occasion data field 2802 includes a drop-down menu containing a set of predefined occasions (birthdays, anniversaries, etc.) and the date field 2803 comprises a selectable calendar graphic for selecting a particular date. In one embodiment, the selectable calendar graphic is the same or similar to the graphic shown in FIG. 26*b*. As indicated in FIG. 28, in one embodiment, when a new recipient is entered in the contact name field 2804, that recipient is automatically added to the user's contacts database 210.

Regardless of how the reminder list is prioritized, in one embodiment, the recommendation engine 2203 selects card recommendations for the recommendations region 2315 based on the entry at the top of the list. For example, if the entry at the top of the list is a birthday for a particular recipient, then the recommendations region 2315 will contain recommendations for a birthday for that particular recipient (e.g., with entries from drop down menus 2501-2502 shown in FIG. 25 automatically selected).

FIG. 26*b* illustrates a calendar GUI generated in response to selection of the calendar tab 2602. In one embodiment, when selected by the user, the calendar opens to the current month with the current day 2612 highlighted. Links 2630 and 2631 are used to jump to previous month or subsequent month, respectively. Graphics with different colors and shapes are used to identify different greeting card events and the status of those events. For example, in FIG. 26*b*, a red diamond 2611 is used to identify events in the past, a green flag 2613 is used to identify events for which a card has been scheduled, and a yellow triangle 2610 is used to identify events for which a card has not been scheduled. In one embodiment, dates with a user-entered event will have a slightly darkened background and the event currently selected is highlighted. If there are two events on the same date, two icons are shown. If there are three or more events on a date, a number representing the number of events is displayed followed by an exclamation point. In one embodiment, if the user clicks on an empty date on the calendar or selects an "add an event" link 2621, the add event window is displayed (FIG. 28).

Figure 27B:
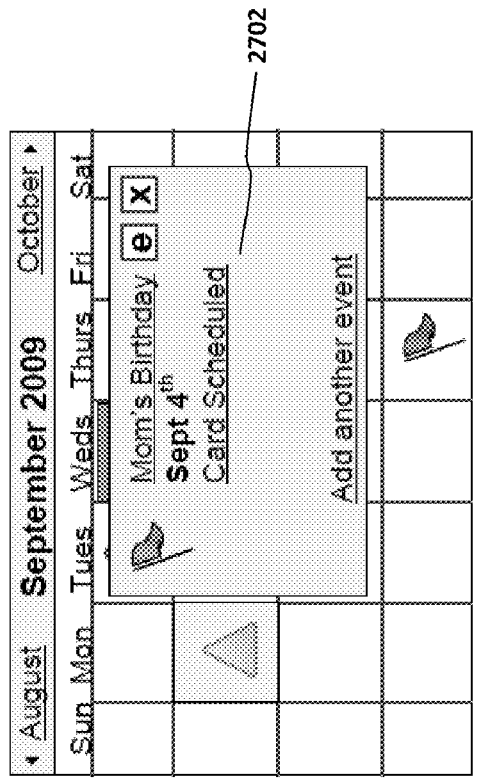
FIG. 27 illustrates a Web-based GUI comprising a reminder list and a greeting card calendar.
Figure 27A:
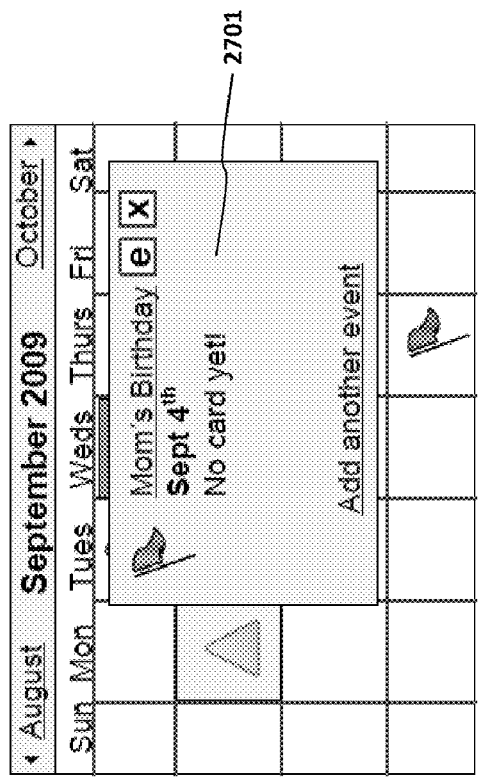

As illustrated in FIG. 27*a*, When the user mouses over a square in the calendar (i.e., moves the cursor over a square with the mouse or other cursor control device) that has an event in it, a small non-modal hover window 2701 is displayed that shows more details of the event. The event title is on top and the date is beneath. If no card is scheduled, "No card yet!" is displayed as shown in FIG. 27*a* but if a card has been scheduled, then a "Card Scheduled" link is provided as shown in FIG. 27*b*. Once again, the "Card Scheduled" link directs the user to an order details Web page containing the details associated with the card order. An edit button ("e") is provided to link the user to the add/edit event window shown in FIG. 28 which opens with data fields pre-populated with existing data. A "Delete Reminder" button ("x") is also provided which allows the end user to delete the calendar reminder.

Figure 27C:
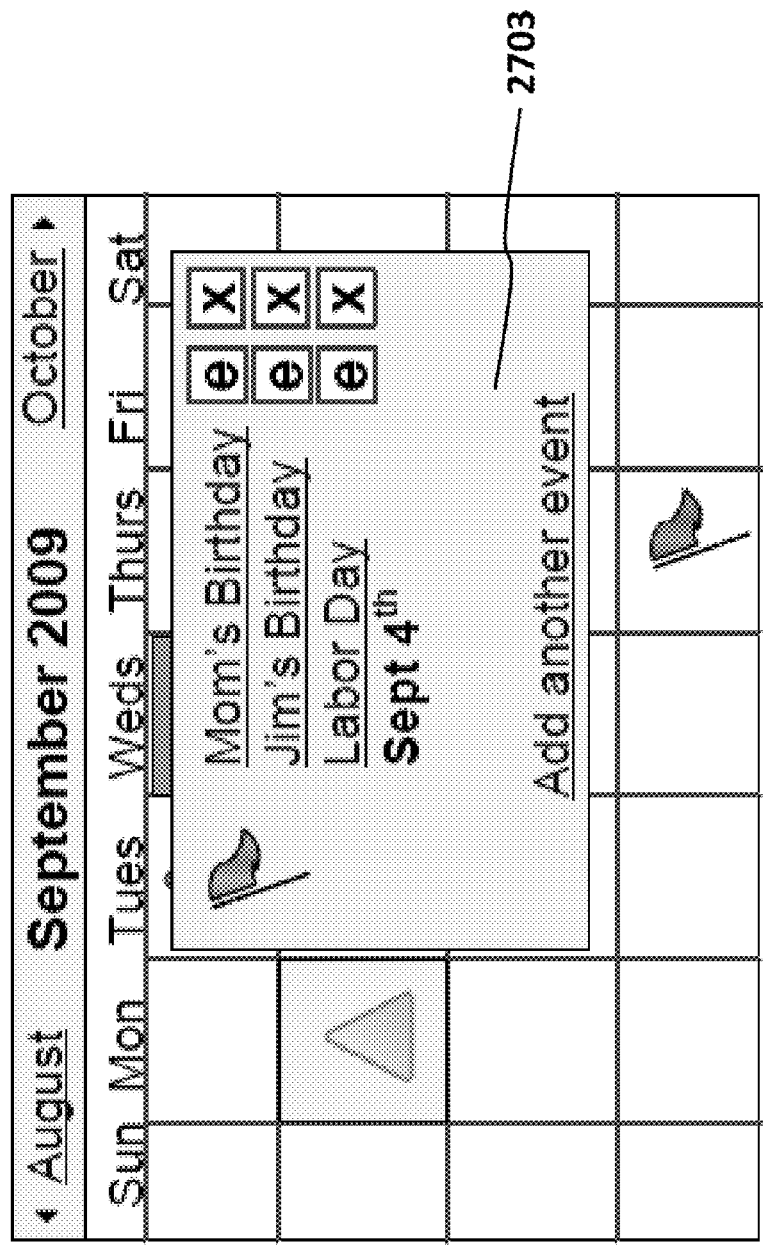

As illustrated in FIG. 27*c*, if there are multiple events on the same day, the mouseover window 2703 shows each event on its own line, with the date beneath them all. Each event comprises a hyperlink to the Add/Edit Event screen for that event (FIG. 28). The "add another link" will open the Add event window (FIG. 28).

One embodiment of the online stationery/card service 200 allows the user to purchase an online stationery/card subscription plan which allows the user to send a specified number of stationery/cards for a fixed fee. The plan selected by a given user and the current status of the user's account (e.g., number of cards ordered, current payment due date, etc.) is maintained within an accounts database 2250 on the online stationery service 200.

Figure 29:
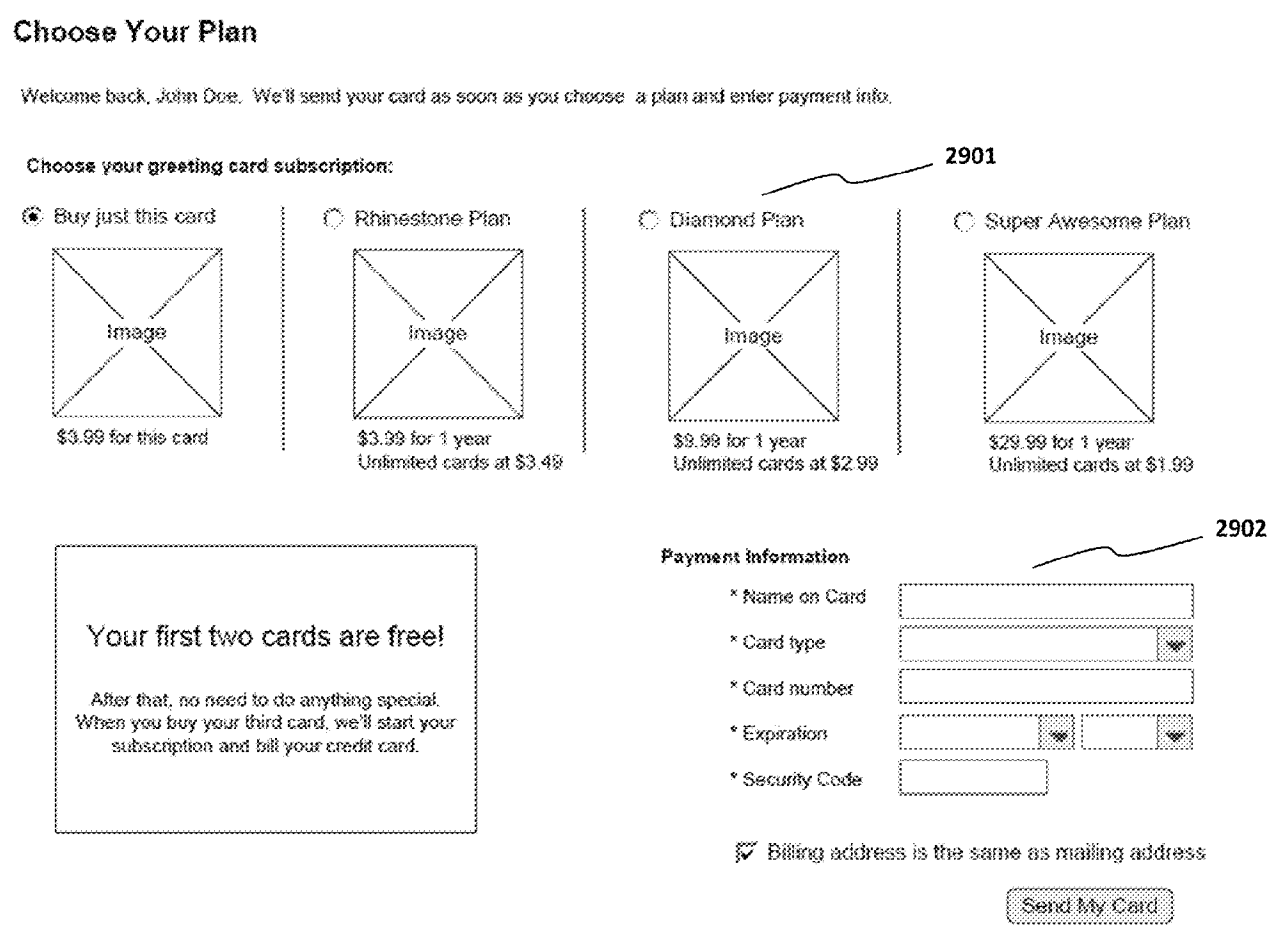

A graphical user interface for selecting among a plurality of different plans is illustrated in FIG. 29. This embodiment provides a plurality of selectable options 2901 representing different plans. One option, of course, is to purchase on a one-time basis. Other plans illustrated in FIG. 29 includes an option of $3.99/year to purchase unlimited cards at $3.49; an option of $9.99/year to purchase unlimited cards at $2.99; and an option of $29.99/year to purchase unlimited cards at $1.99. Various other/additional options may be provided while still complying with the underlying principles of the invention. For example, one option (not shown) allows the user to pay a flat fee for a specified number of cards during the year at no additional charge. A series of data entry fields 2902 are provided in which the user may enter credit card or other payment or billing information. If the user does not already have an account with the online stationery/card service 200, additional data entry fields are provided to allow the user to an establish an account with a new User ID (e.g., the user's email address) and a password.

FIGS. 30-35 illustrate additional embodiments of a Web-based GUI for stepping the user through the process of selecting an appropriate stationery/card design. This embodiment includes a region 3001 for filtering stationery results by selecting filtering check boxes; a region 3000 for selecting options from drop-down menus; and a region 3003 for displaying the filtered recommended stationery designs.

Figure 30:
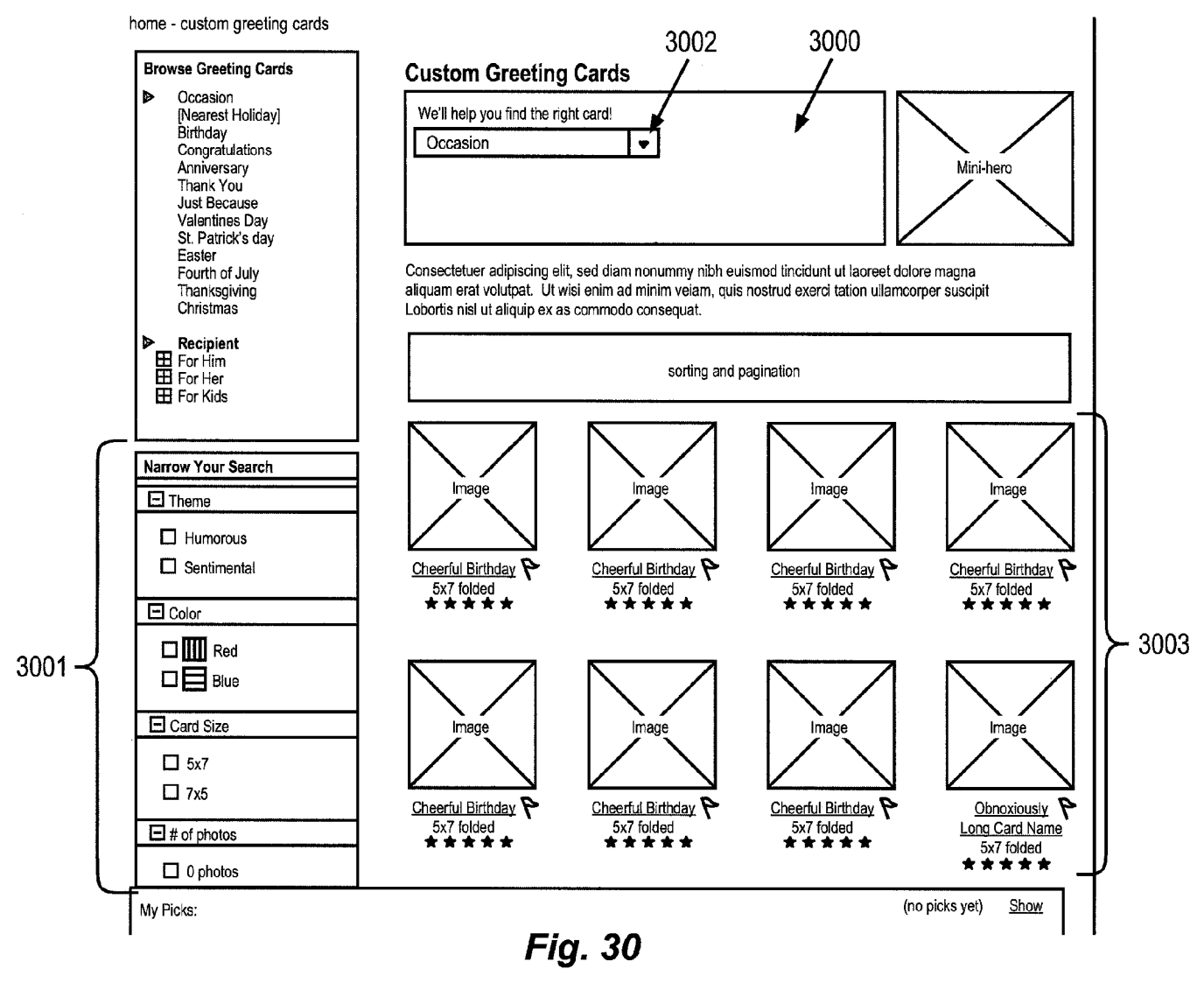
Figure 31A:
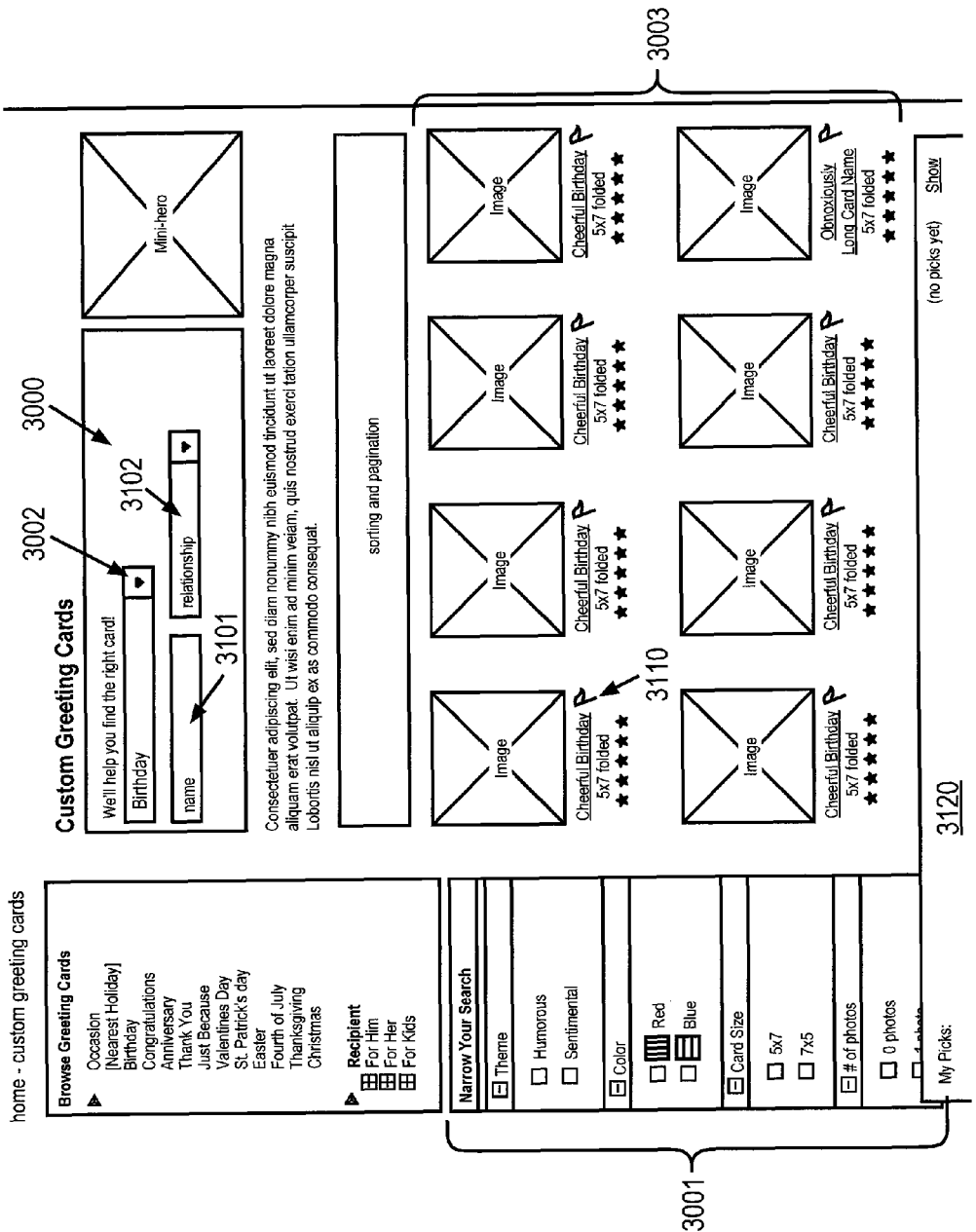
FIG. 31 illustrates a Web-based GUI for managing user selections of greeting card templates.

FIG. 30 starts with a single drop down menu 3002 within region 3000 for selecting a particular occasion (e.g., birthday, anniversary). Once a particular occasion has been selected, one or more additional drop-down menus are generated to further refine the results 3003. In one embodiment, if the user enters the category page in FIG. 30 from the dashboard page, the menu fields are pre-filled with the recipient, occasion and relationship information. FIG. 31*a* illustrates one example in which, after the user has selected "Birthday" as the occasion, a data entry field 3101 is provided asking for a name and a drop-down menu is provided asking for the relationship between the recipient and the user (e.g., mother, wife, sibling, etc.). In one embodiment, as the user enters text in the data entry field 3101, a drop down menu is displayed below the entry field with matches from the user's contacts database 210 allowing the user to select a recipient with just a few entered characters. In one embodiment, a drop-down menu may be provided in lieu of, or in addition to, data entry field 3101 to allow the user to select individuals from the user's contacts database 210. Once the name and relationship of the recipient have been selected, the thumbnails of cards within the recommendation region 3003 are filtered accordingly. For example, if "Birthday" is selected for occasion and "Mother" is selected for relationship, then birthday cards for mothers are displayed within the recommendation region 3003. More specifically, if the user is a male, then birthday cards from son to mother are displayed; if the user is a female, then birthday cards from daughter to mother are displayed.

An additional filtering region 3001 is provided to allow the user to filter the cards in the recommendation region further. Details of one embodiment of the filtering region 3001 are provided in FIG. 33. In this embodiment, the user may select among a plurality of selection boxes grouped into categories including "Theme" (e.g., humorous, sentimental, religious); "Color" (providing a plurality of color options); "Card Format" (e.g., flat, folded); "Card Size" (e.g., 5×7, 5.25×5.25, 3.5×5, etc); "Number of Photos" (e.g., none, or 1, or more);

and "Other" (e.g., new, available as-is (without personalization), best-selling, recently purchased, etc). Selecting among any one or more options in the filtering region 3001 causes the filtering logic of the recommendation engine 2203 filter the cards provided in the recommendation region 3003 based on the selection. For example, selecting the 5"×7" card size option will cause only cards of this size to be displayed.

In one embodiment, clicking on one of the designs within the recommendations region 3003 takes the end user to the product Web page for that design and allows the user to personalize and send the design. Mousing over one of the designs within the recommendations region 3003 generates a quick view window with additional information related to the design. In addition, in one embodiment, a pick icon is provided 3110 to allow the user to add the design to a "my picks" region 3120.

Figure 31B:
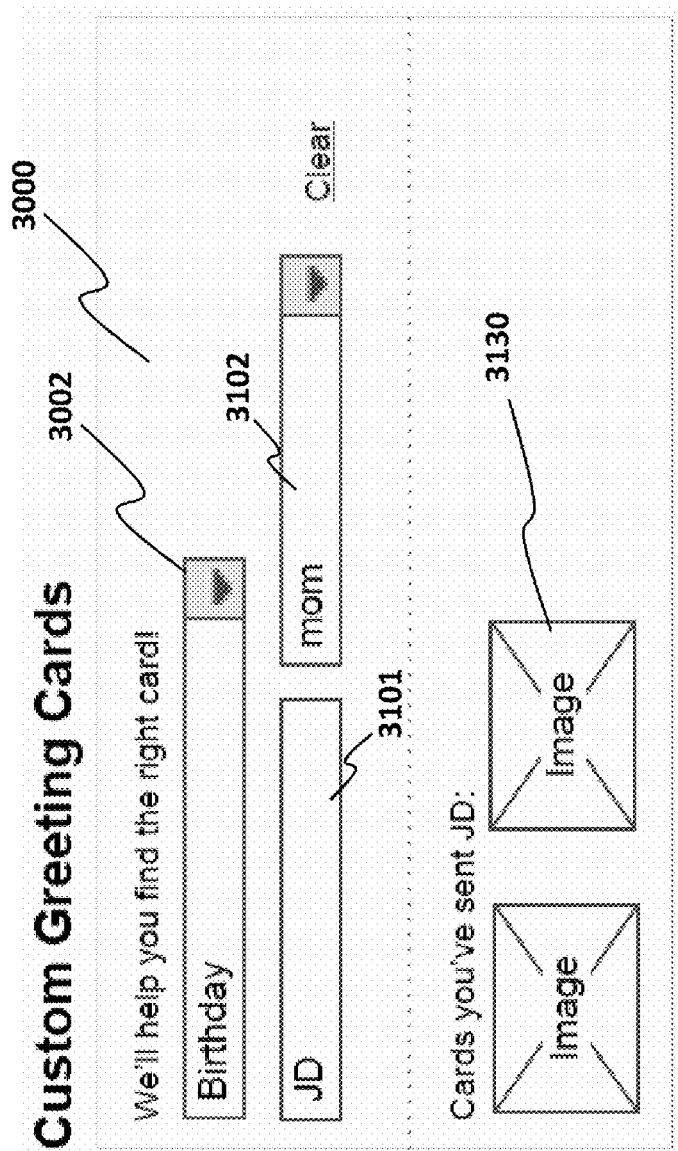

FIG. 31b illustrates one embodiment of region 3000 in which, once a specific recipient has been selected ("JD" in the example), cards which the user has previously sent to the recipient are listed within a region 3130 beneath the recipient data entry field.

Figure 32:
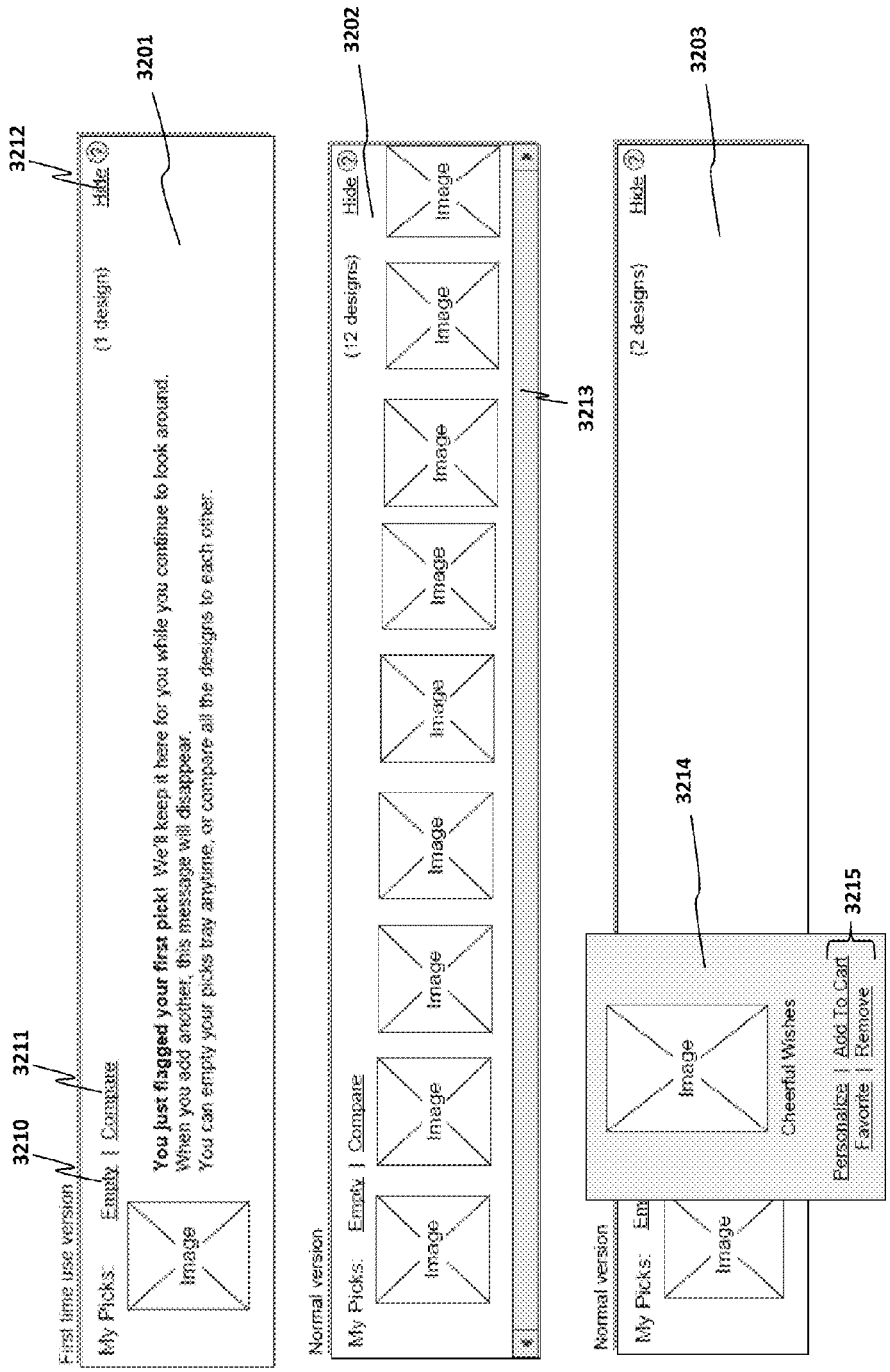
FIG. 32 illustrates a Web-based GUI for selecting greeting card templates for a particular recipient and occasion.
Figure 33:
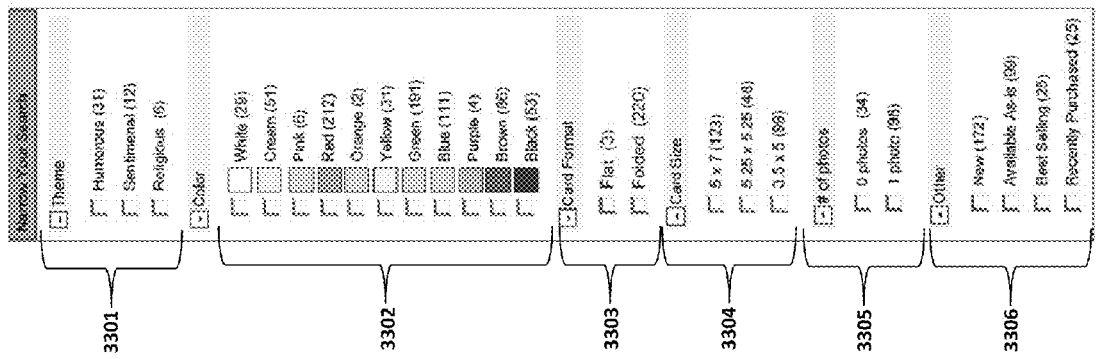
FIG. 33 illustrates a Web-based GUI comprising a plurality of selectable filtering options for selecting a greeting card.

FIG. 32 illustrates details for different embodiments of the "my picks" region 3120. The first time the user adds a card design to the "my picks" region, instructions as to how to use the region are provided as illustrated at 3201. Each "my picks" region includes a link 3210 to empty the picks from the region and a link 3211 to compare designs within the region. A hide link 3212 is also provided to hide the "my picks" region. When more designs are added to the "my picks" region than can fit within the viewable portion of the region, a scroll bar 3213 appears (as shown in the embodiment of 3202) to allow the user to horizontally scroll through the design selections. As illustrated in the embodiment of 3203, mousing over a design automatically generates a pop-up window 3214 containing a larger image of the design and a set of selectable options 3215 including "personalize" which will link the user to the stationery/card personalization Web pages managed by the stationery/card personalization engine 220; "add to cart" which will add the design to the user's shopping cart; "favorite" which will tag the design as the user's favorite; and "remove" which will remove the selected design from the "my picks" region.

Figure 34:
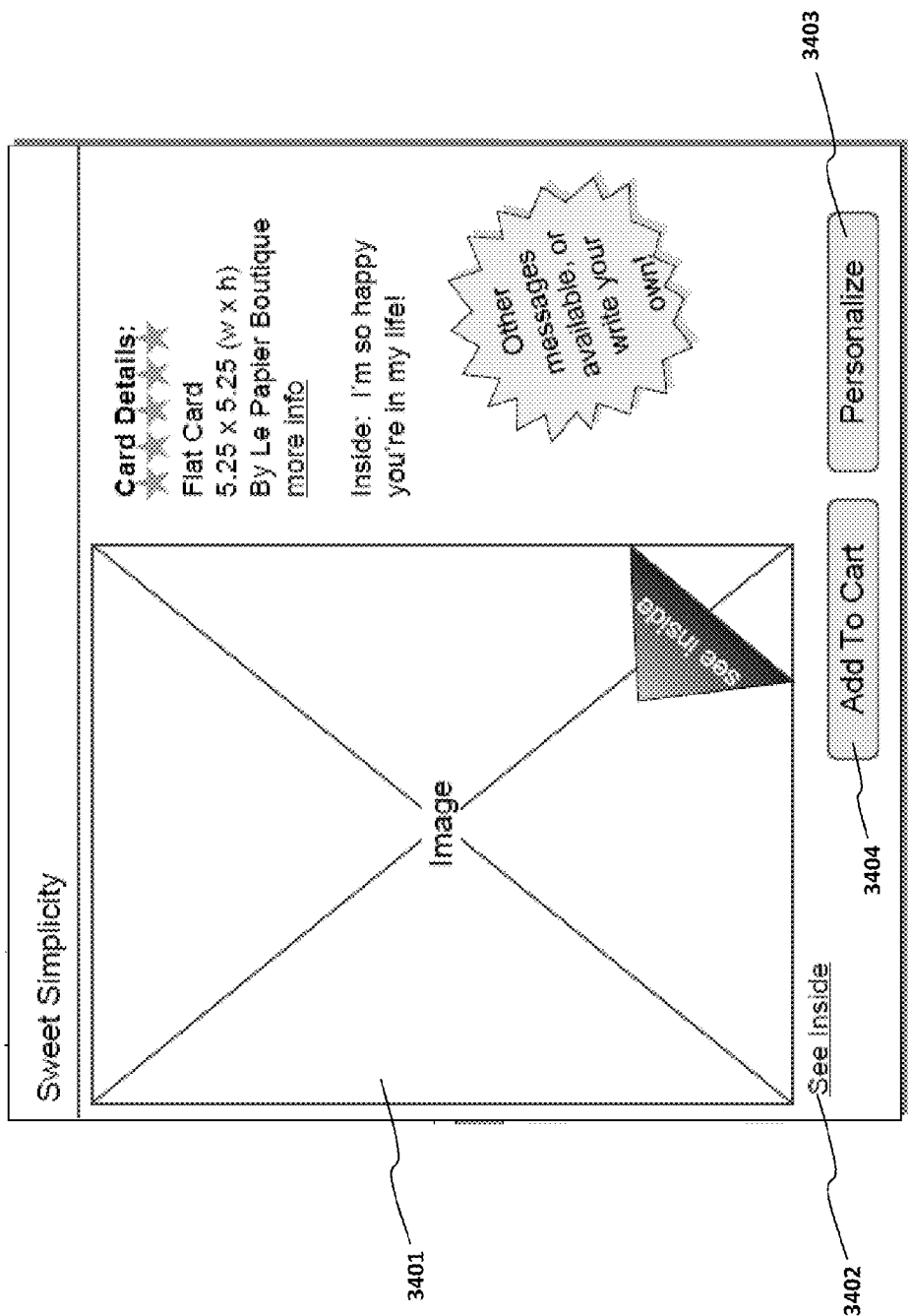
FIGS. 34-35 illustrates a Web-based GUI providing a detailed view of a stationery template.
Figure 35:
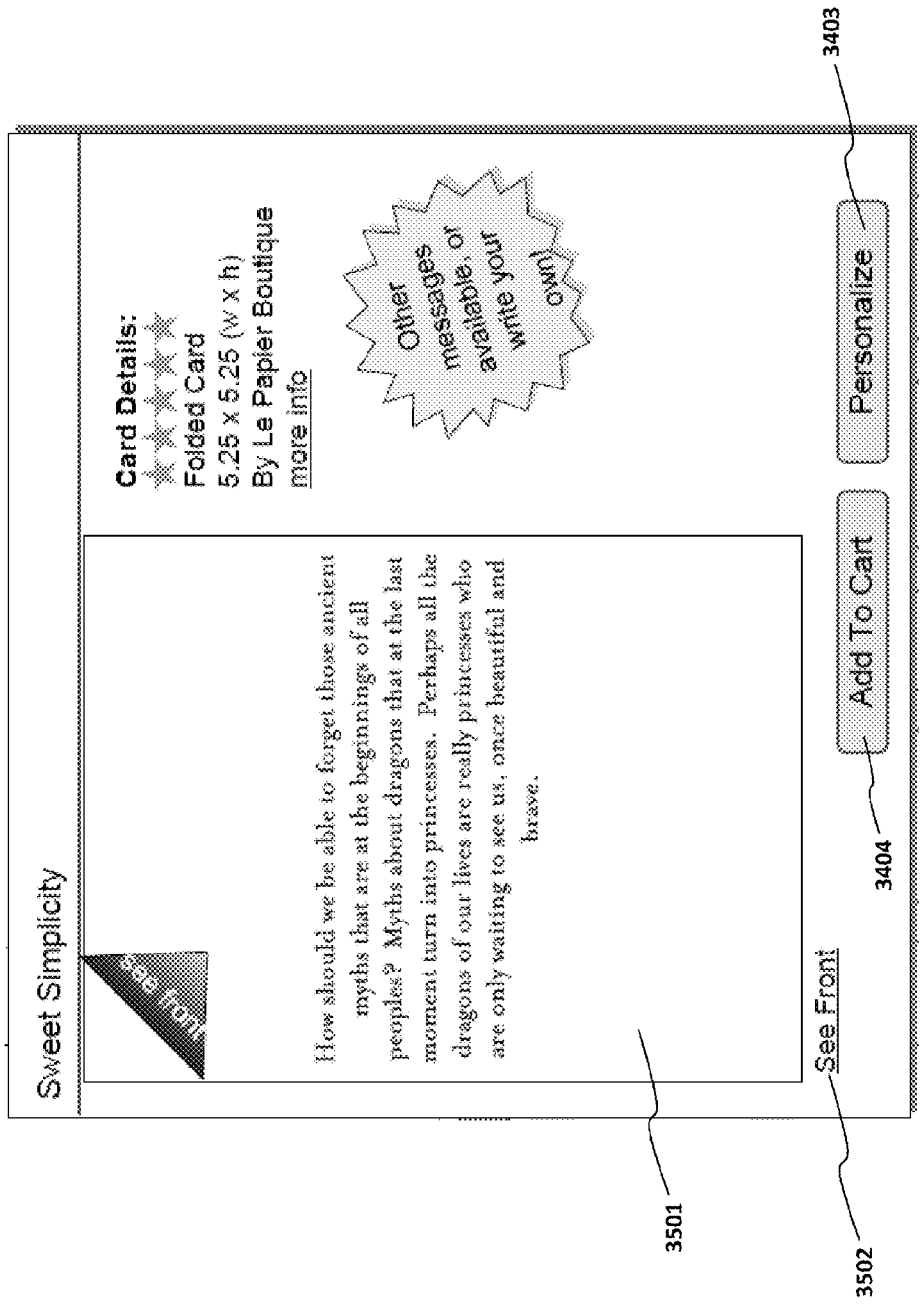

In one embodiment, when the user clicks on any of the designs within the recommendation region, the product Web page for that card is displayed, such as that illustrated in FIGS. 34-35. FIG. 34 provides a detailed view 3401 of the card from the front and FIG. 35 provides a detailed view 3501 of the inside of the card. The front view window includes a "see inside" link 3402 and the inside view window includes a "see front" link 3502 for moving between the two different views. In addition, both views include an "add to cart" button 3404 which will add the design to the user's shopping cart and a "personalize" button 3403 which will take the user to the personalization pages such as those illustrated in FIGS. 36-39.

Figure 36:
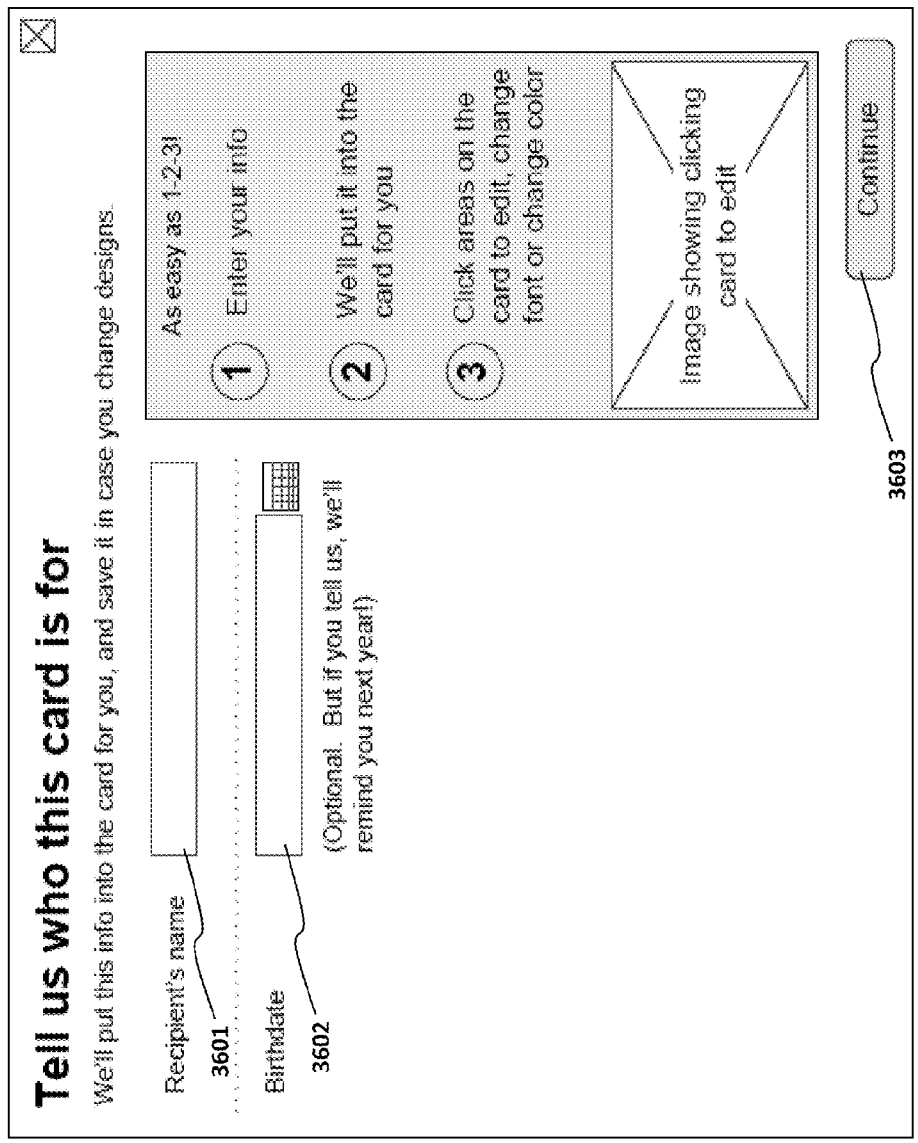
FIG. 36 illustrates a Web-based GUI for collecting information related to a greeting card recipient.

FIG. 36 illustrates a first window displayed when the user selects the "personalize" button 3403. A data entry field 3601 for the recipient's name 3601 and a data entry field 3602 for the recipient's birthdate are provided. Once again, in an embodiment which utilizes the user's contacts database, the recipient's name may be selected from a list generated from the user's contacts database or autofilled as the user enters text. The birthdate may then be automatically filled in using data associated with that contact.

Figure 37:
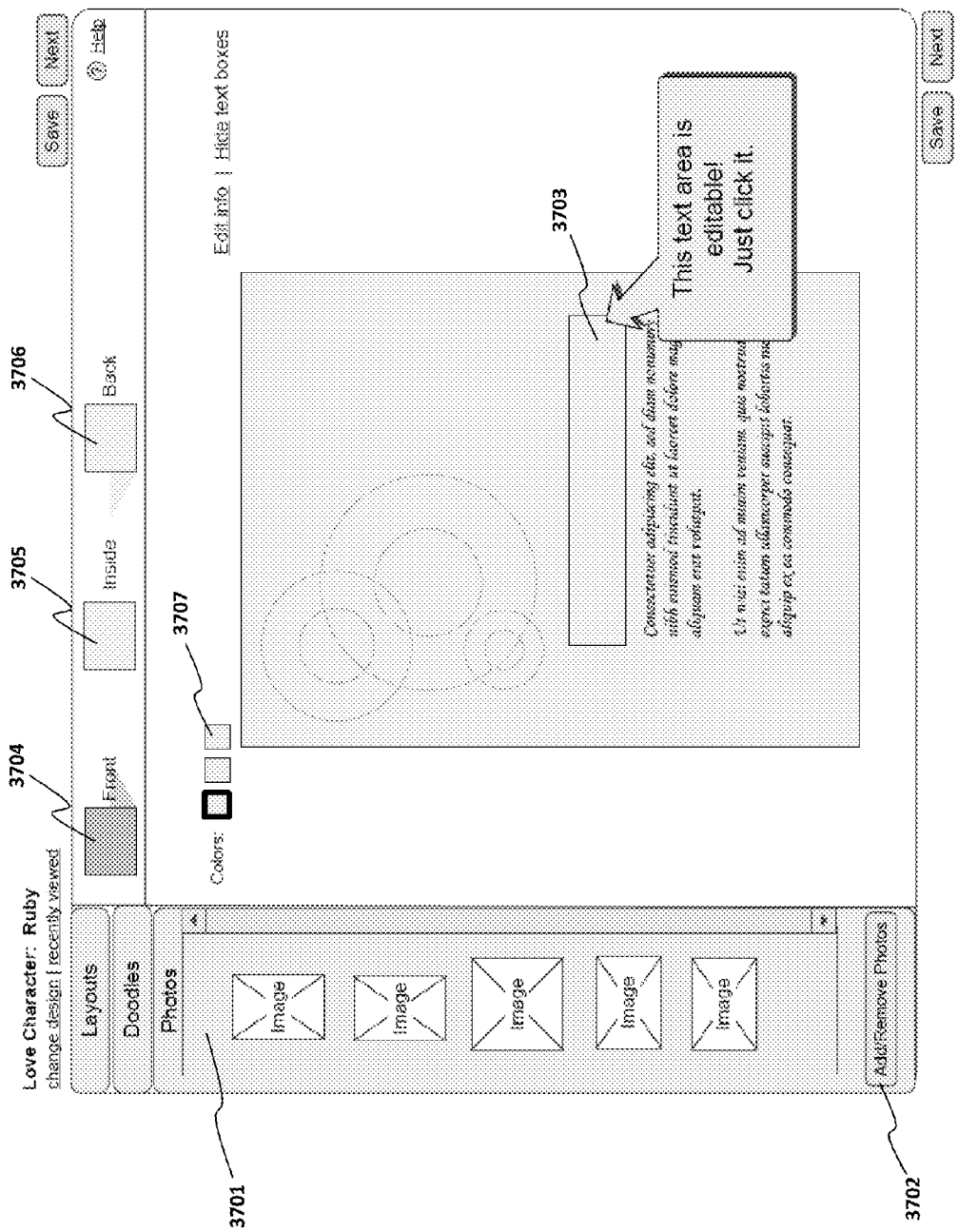
FIGS. 37-39 illustrate a Web-based GUI for personalizing a greeting card template.

Upon selection of a continue button 3603, the user is taken to the GUI shown in FIG. 37, which shows an image of the front of the selected card and an indication of those text regions 3703 which are editable. A set of selectable links 3704, 3705, and 3706 are provided at the top of the GUI to jump between the front, inside and back of the card, respectively. A photos region 3701 provides a set of photos which may be added to the card (e.g., by clicking and dragging into a designated region). The photos may be local to the user (e.g., on the user's hard drive) and/or may have been previously uploaded to the online stationery/card service 200. A selectable button 3702 is provided to add and/or remove photos from the set (e.g., by highlighting a photo and selecting the button to remove).

Figure 38A:
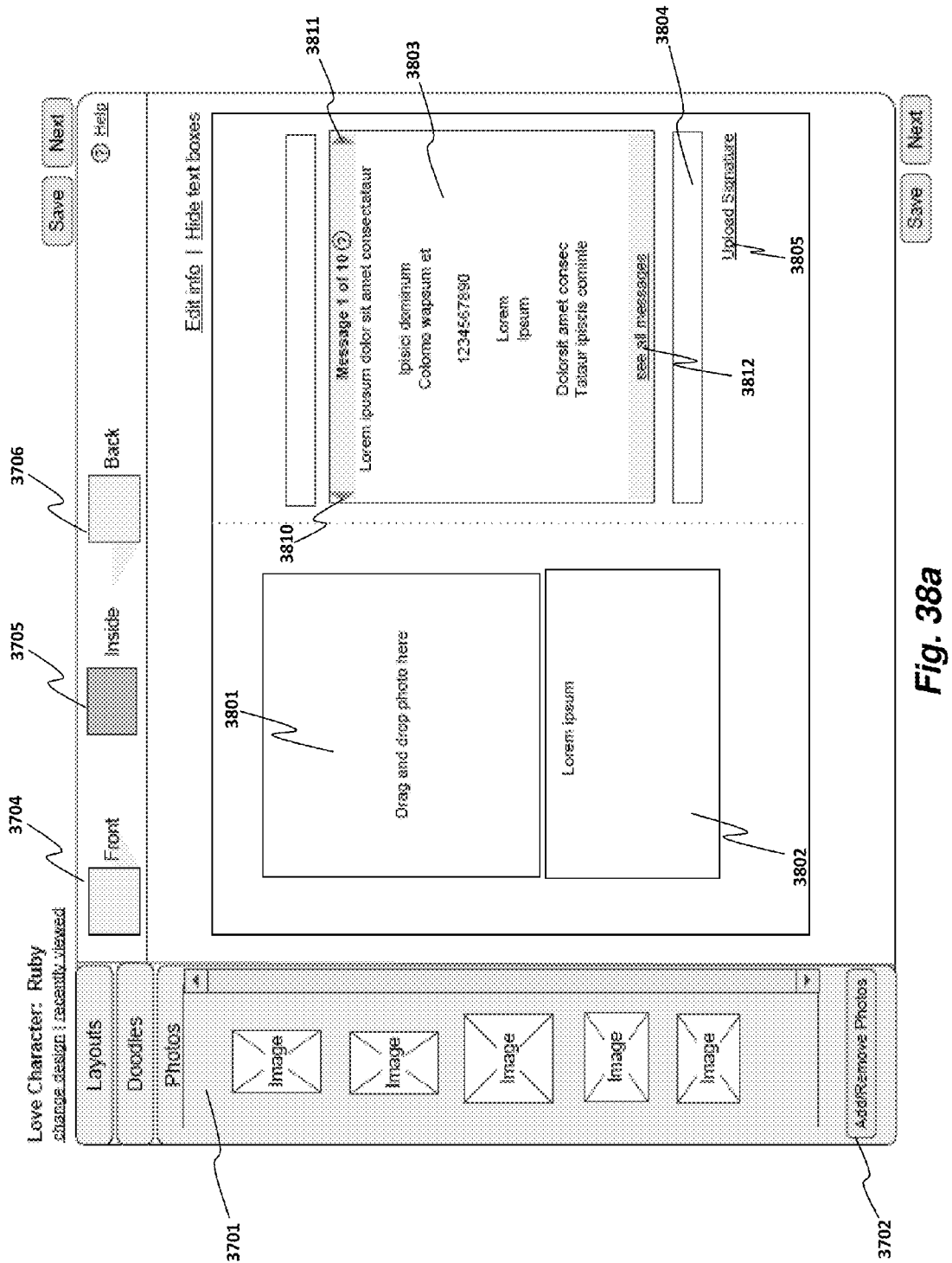

FIG. 38a illustrates the inside of an exemplary card design. Additional regions 3802 and 3803 for personalized text are provided as well as a region 3804 for typing a signature. In one embodiment, the text entry region 3803 is initially opened with a message which the user may edit. Additional message options may be provided and, in one embodiment, a forward arrow 3811 and a backward arrow 3810 are provided for scrolling through the additional message options. A link 3812 is provided to allow the user to visually display all available messages within a single window. FIG. 38b illustrates an exemplary window for displaying a list 3850 of available messages. Each entry in the list comprises the text of the message. A Use This Message button 3851 is generated for selected entries within the list. Selecting the button causes the text for the message to be incorporated into the text window 3803, which may then be edited by the user. FIG. 38b also illustrates a set of filtering options 3852 for filtering the results in the list of available messages 3850.

In addition, a link 3805 is provided for uploading a user's signature. In one embodiment, selecting the link 3805 generates a dialog box which allows the user to move through folders and identify a signature file (e.g., a JPEG, Bitmap, or other signature file type) on the user's computer. The signature is stored in the user account database and retrieved for subsequent card personalization. A photo region 3801 is provided into which photos from region 3701 may be clicked and dragged. The selected photo will then be visually displayed within the photo region 3801.

Figure 39:
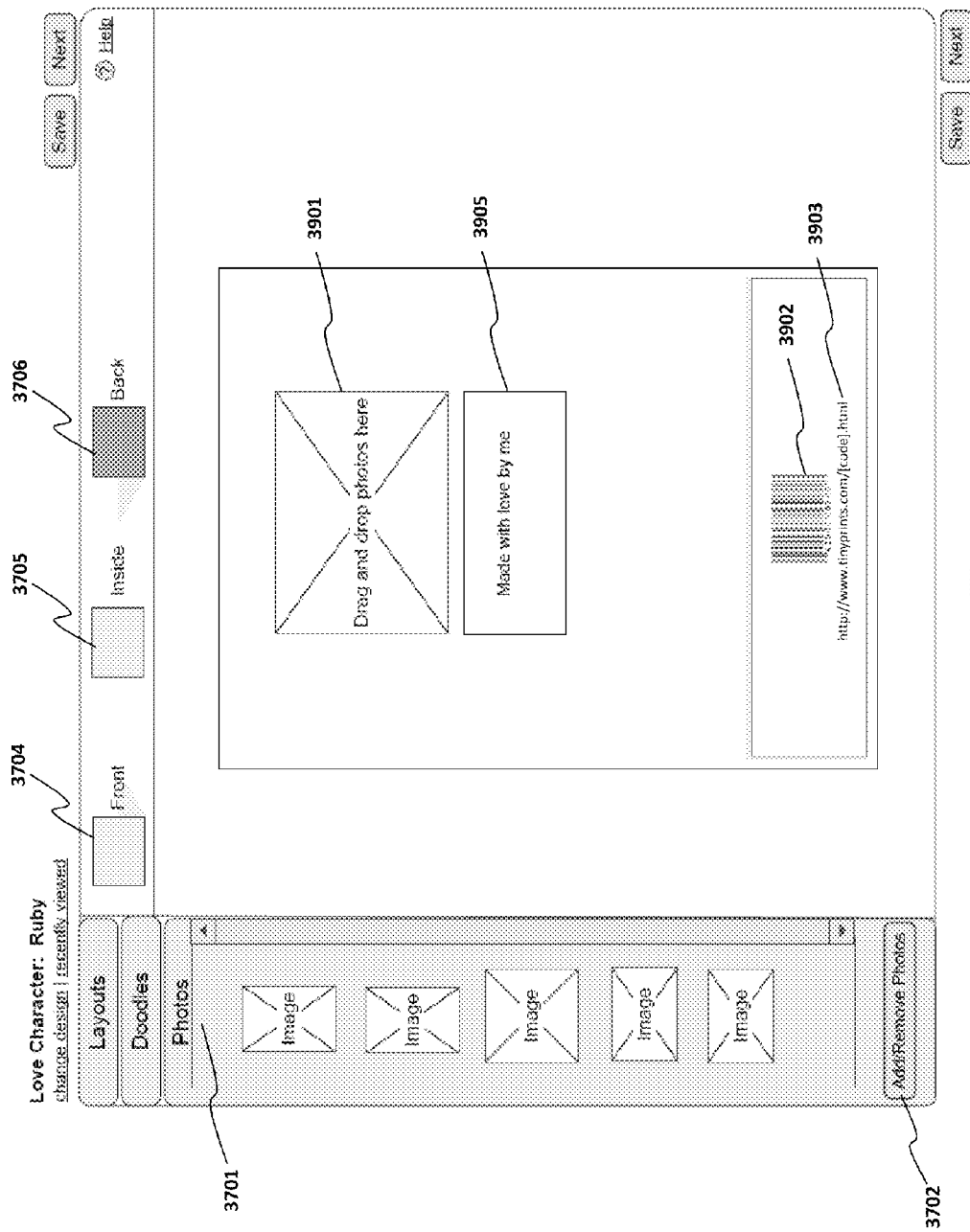

FIG. 39 illustrates the back of the exemplary card design with an additional photo region 3901 and an additional text entry region 3905. These two regions comprise the "Personal Seal" for the user and are stored in the user account database and retrieved for subsequent card personalization. In addition, in one embodiment, bar code 3902 and/or a URL 3903 are provided to allow the recipient to connect to a unique dynamically generated page representing a relationship between the end user and the recipient(s). The Web page may include, for example, pictures, contact data, public address data, personal messages, and other information shared between the user and recipient(s). In one embodiment, the user is permitted to enter a personal URL on the back of the card (e.g., in the place where [code] is indicated in FIG. 39). The online stationery/card service will then confirm that the URL code is available.

Figure 40:
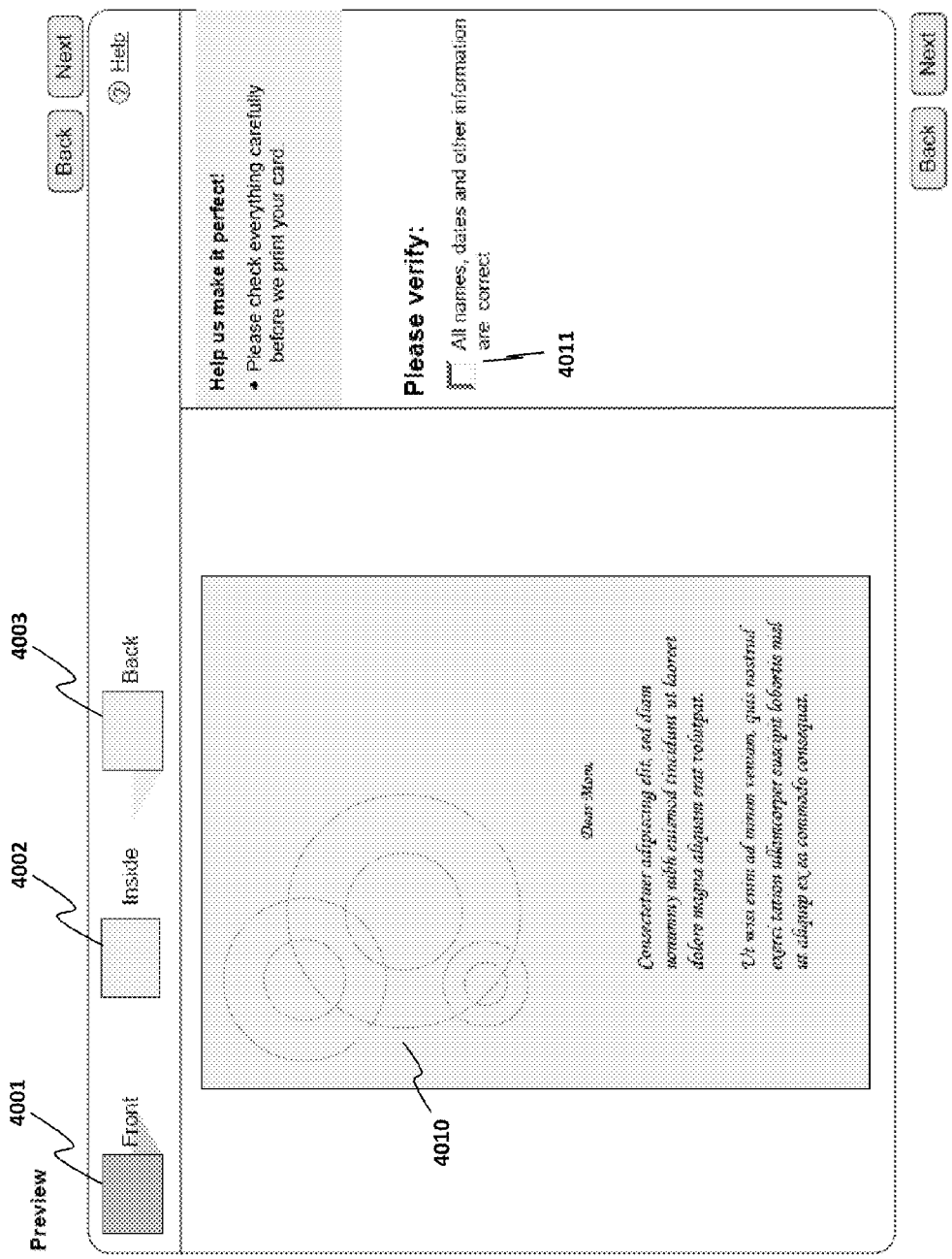
FIGS. 40-42 illustrates a Web-based GUI for previewing a personalized greeting card.
Figure 41:
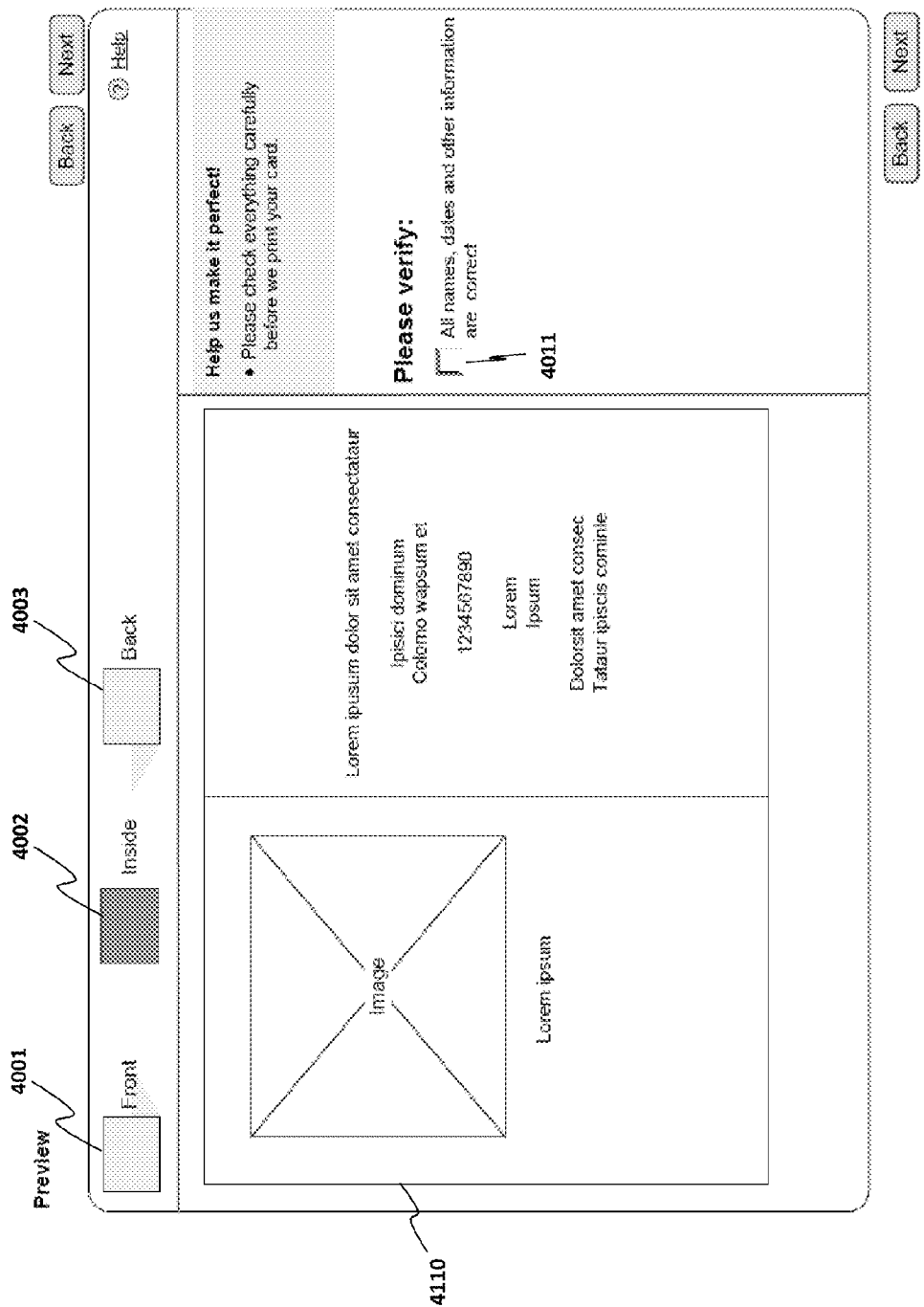
Figure 42:
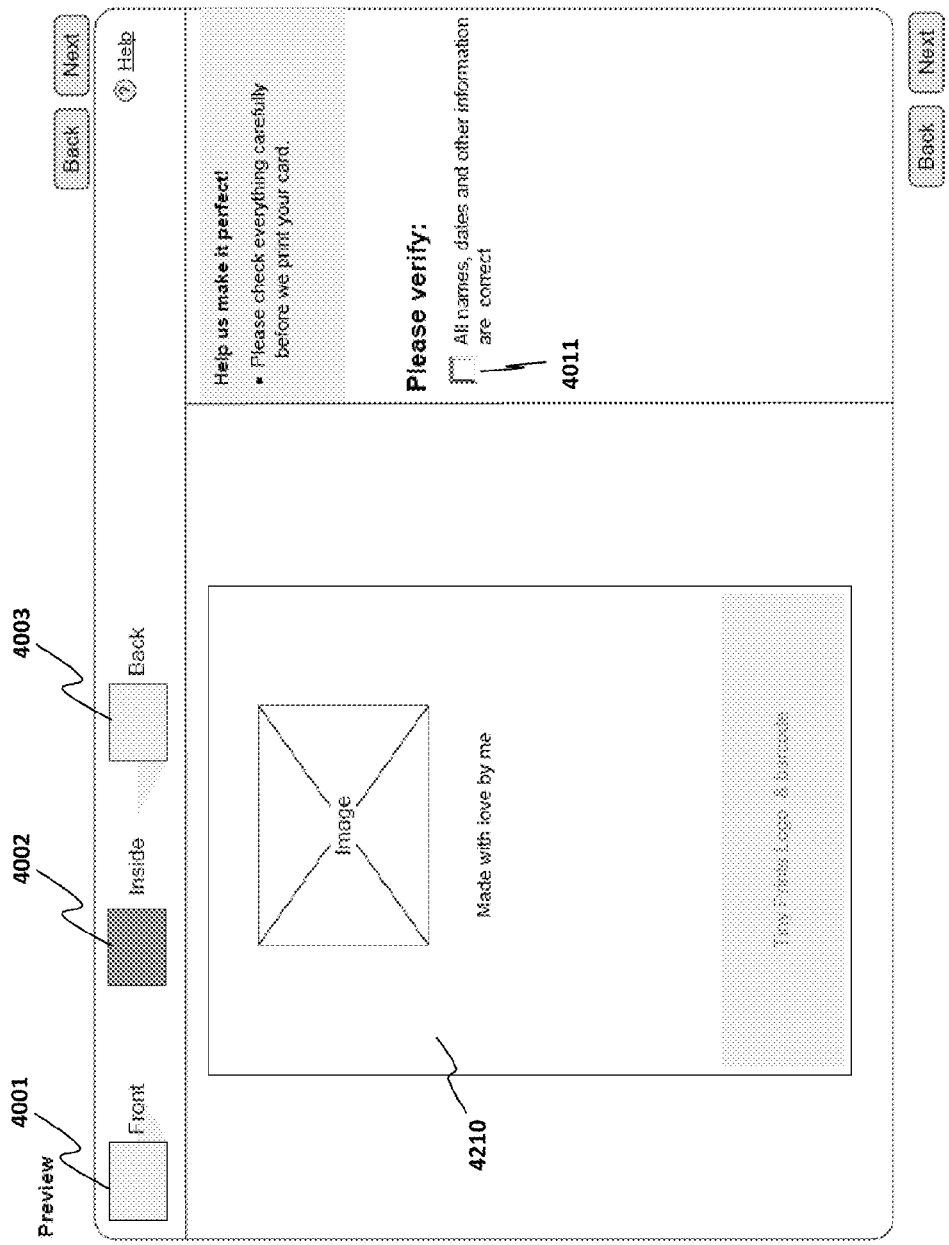

Once the user has completed personalizing the stationery/card design, a series of preview pages are generated such as those shown in FIGS. 40-42. A set of selectable links 4001, 4002, and 4003 are provided at the top of the GUI to jump between a preview of the front, inside and back of the card, respectively. FIG. 40 illustrates a preview of the front of the card 4010, FIG. 41 illustrates a preview of the middle of the card 4110, and FIG. 42 illustrates a preview of the back of the card 4210. In one embodiment, the user is asked to verify the content of each portion of the card prior to completing the purchase. In FIGS. 40-42, this is accomplished by a verification check box 4011 located adjacent to the preview image of each portion of the card. To complete the order, the user must select the verification check box next to each preview image for each card portion.

Figure 43:
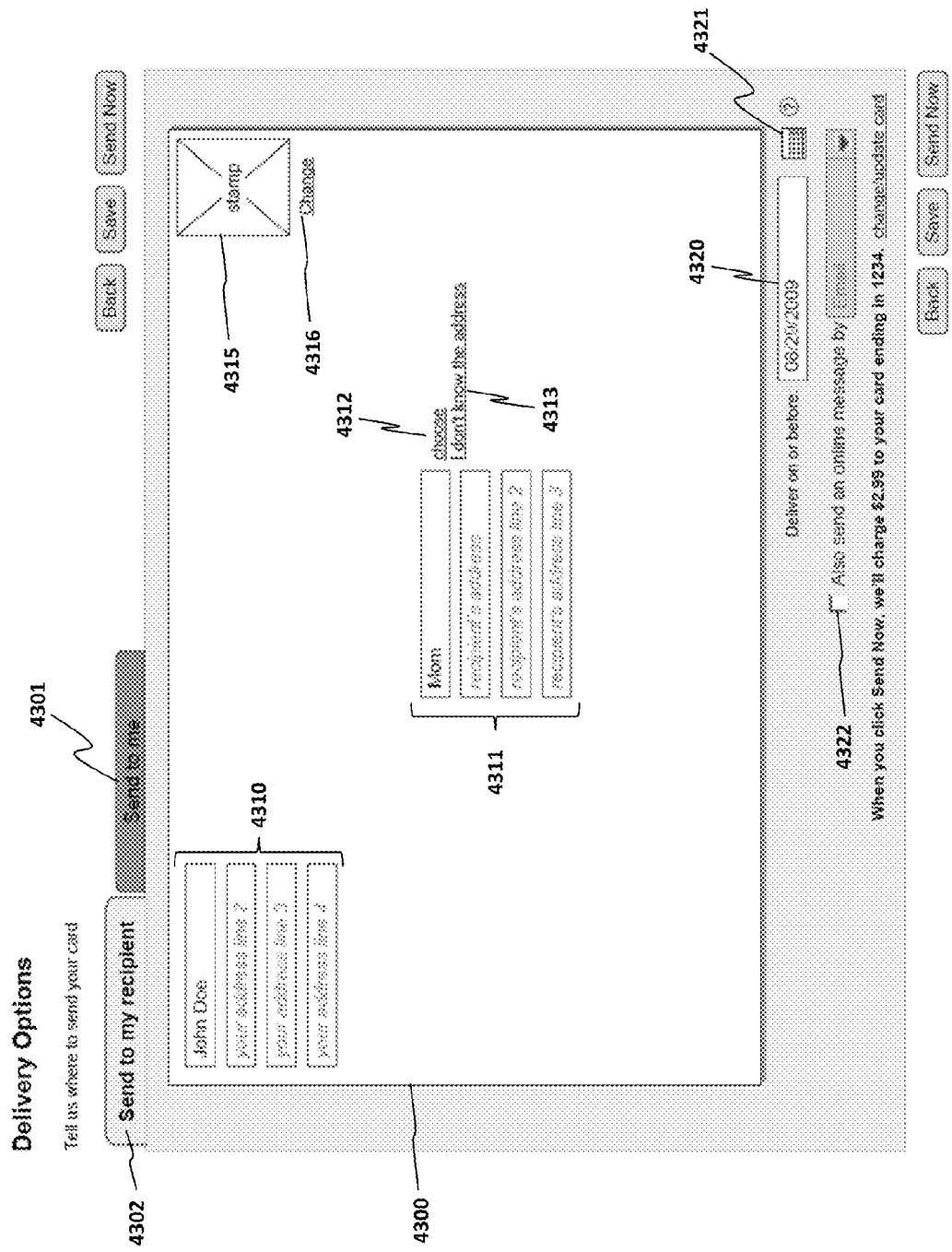
Figure 46:
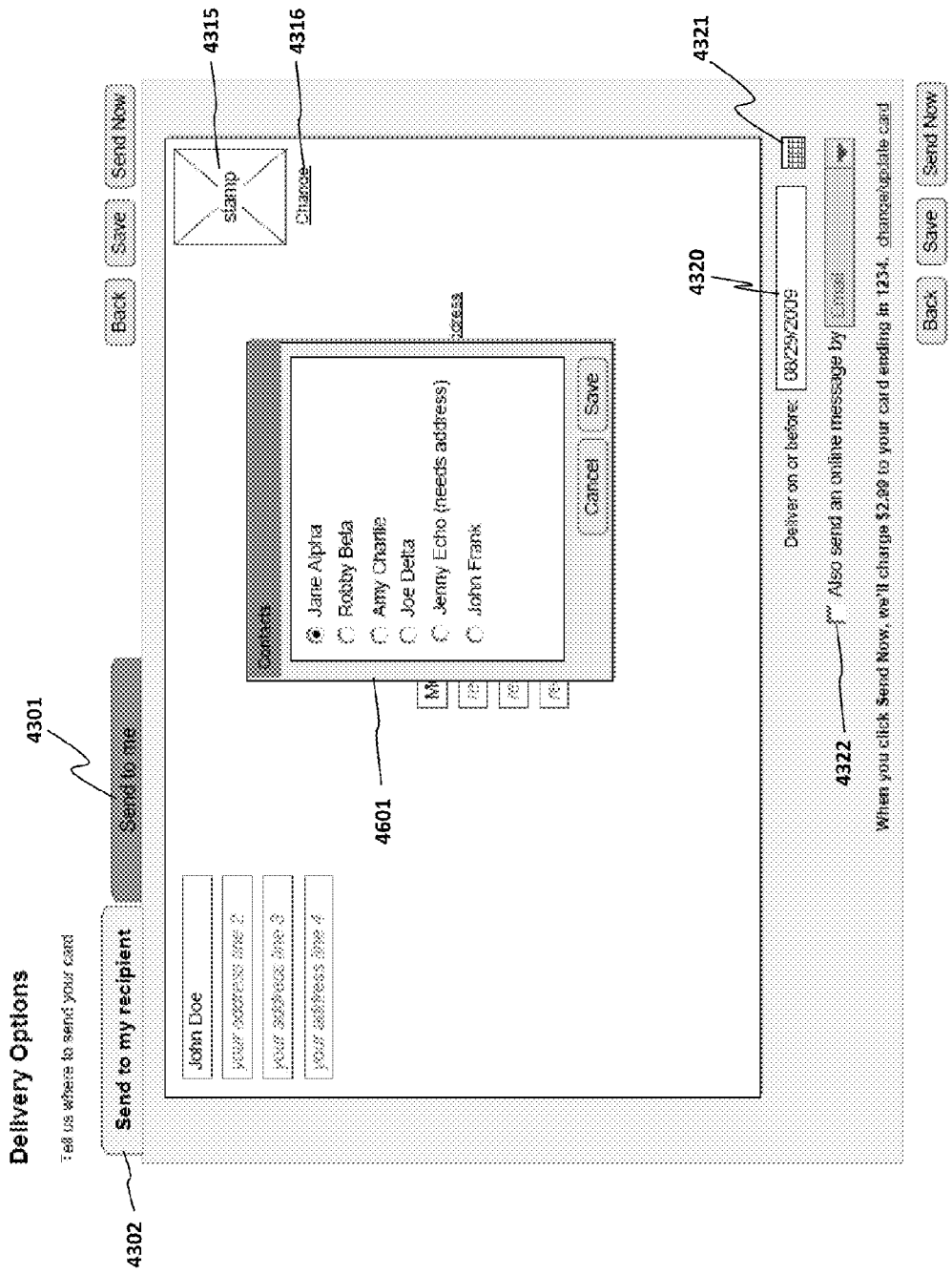
FIG. 46 illustrates a Web-based GUI for selecting among a list of contacts to whom to send a personalized greeting card.

FIG. 43 illustrates one embodiment of a Web-based graphical user interface for designing an envelope to be sent directly to the recipient of the card. In one embodiment, a design template for the envelope is stored within the stationery/card & envelope design templates 230 on the stationery/card service database 215, as indicated in FIG. 22. Two selectable tabs are provided at the top of the Web-based GUI—one for sending the card directly to the recipient 4302 and another for sending the card directly to the end user 4301. In FIG. 43, tab 4302 is selected, thereby producing an image of the envelope 4300 with a first plurality of data fields for entering the user's return address information 4310 and a second plurality of data fields for entering the name and mailing address of the recipient 4311. A contacts hyperlink 4312 is provided adjacent to the second set of data entry fields 4311 to provide the user with access to the user's contacts data. In response to selecting the contacts hyperlink 4312, a contacts list 4601 shown in FIG. 46 appears, from which the user may select a particular contact from the contacts database. In the example shown in FIG. 46, radio buttons are used to select a particular contact from the list. However, various other types of graphical selection elements may be used while still complying with the underlying principles of the invention. For example, in one embodiment, the contact name is autofilled from the contacts database as the user enters text.

Figure 45:
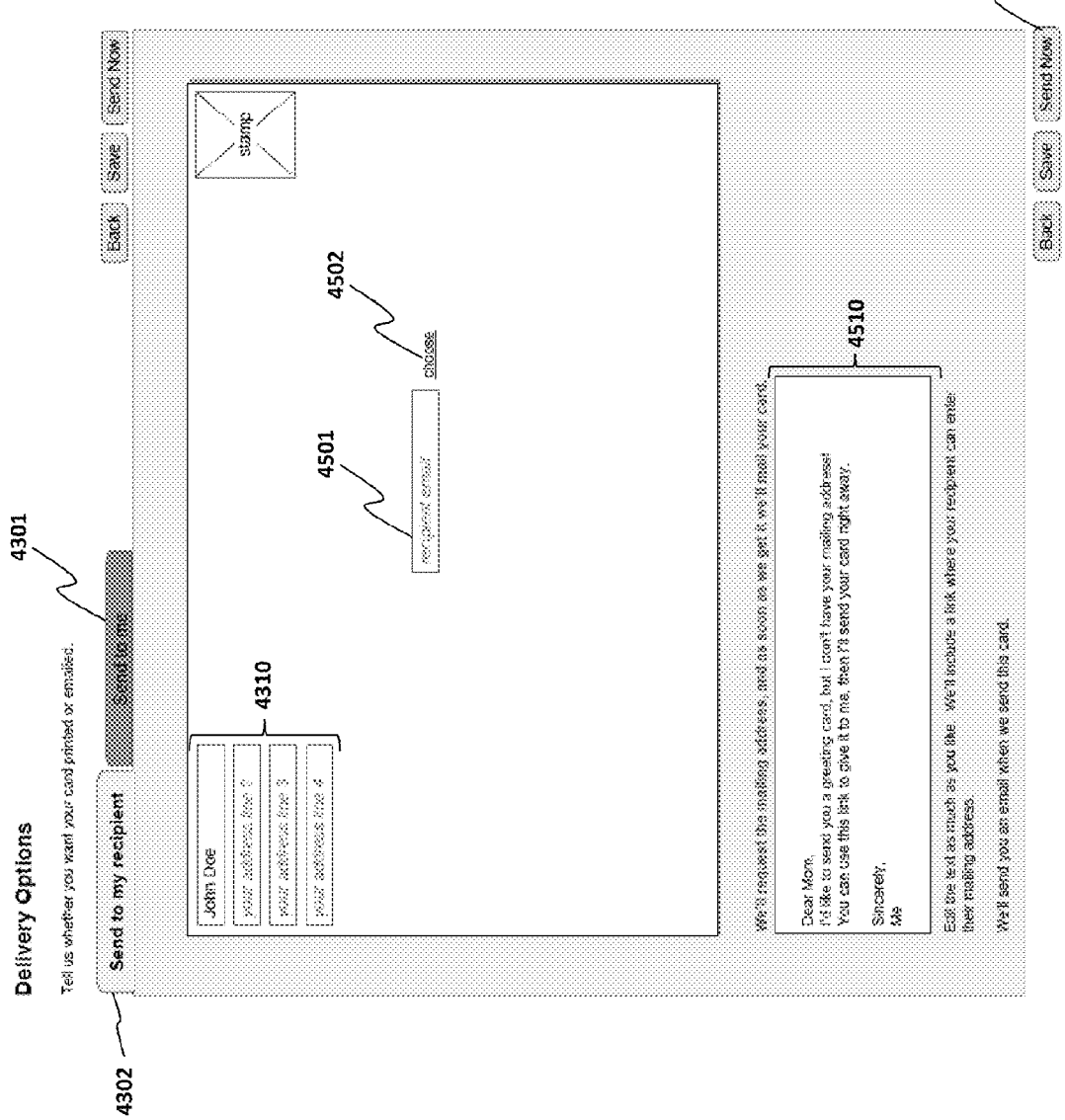

FIG. 43 also illustrates a link 4313 which the user may select if he/she does not know the address of the recipient. Upon selection of this link, a data entry field 4501 is provided, as shown in FIG. 45, in which the user may enter the recipient's email address along with a text entry region 4510 in which the user may compose an email message to the recipient requesting the recipient's email address. A "choose" link 4502 is provided allowing the user to select the email address via the user's contacts database. In response to the user entering an email address and selecting the "send now" button 4503, the online stationery/card service sends an email to the recipient requesting the recipient's address information. As mentioned above with respect to FIGS. 16a-b, in one embodiment, the request email includes a link 1601 which will connect recipient to the online stationery service 200 to enter the address information.

Figure 44:
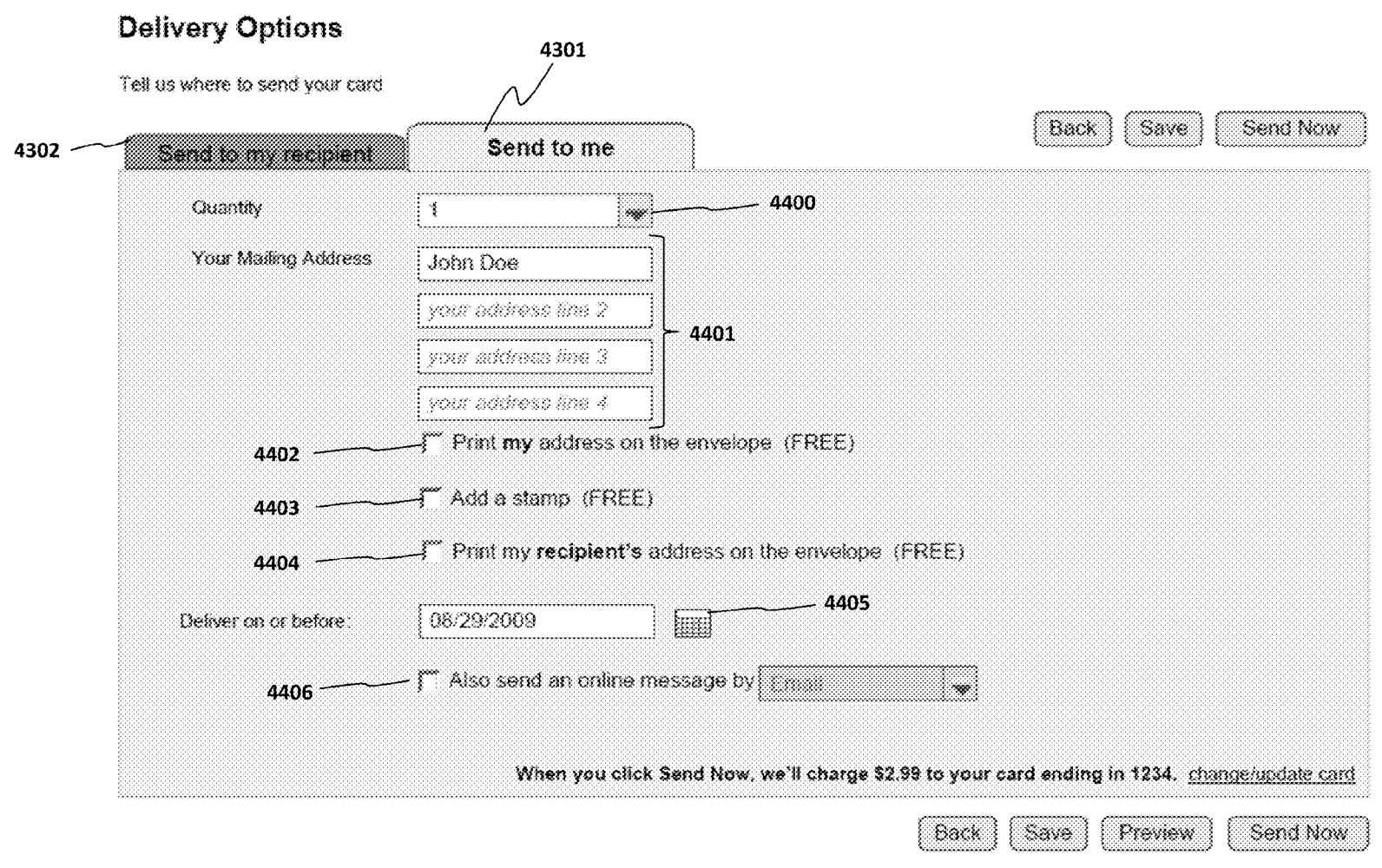

FIG. 44 illustrates the Web-based GUI with the "send to me" tab 4301 selected. This embodiment includes a quantity selector 4400 to indicate the number of cards; the user's name and mailing address 4401 (which is filled in automatically by the online stationery service if the user has an account and is logged in); a selection box 4402 to indicate that the user wants his/her return address printed on the envelopes; a selection box 4403 to indicate that the user wants stamps on the envelopes; a selection box 4404 to indicate that the user wants the recipient's address(es) printed on the envelopes; a delivery date field 4405 to indicate a date on which the card should be delivered (including a calendar widget, such as those discussed above); and a selection box 4406 for specifying an additional electronic message to be sent to the recipient. A drop-down menu is associated with selection box 4406 from which the user may specify different electronic message types (e.g., email, instant message, SMS, etc).

Figure 47:
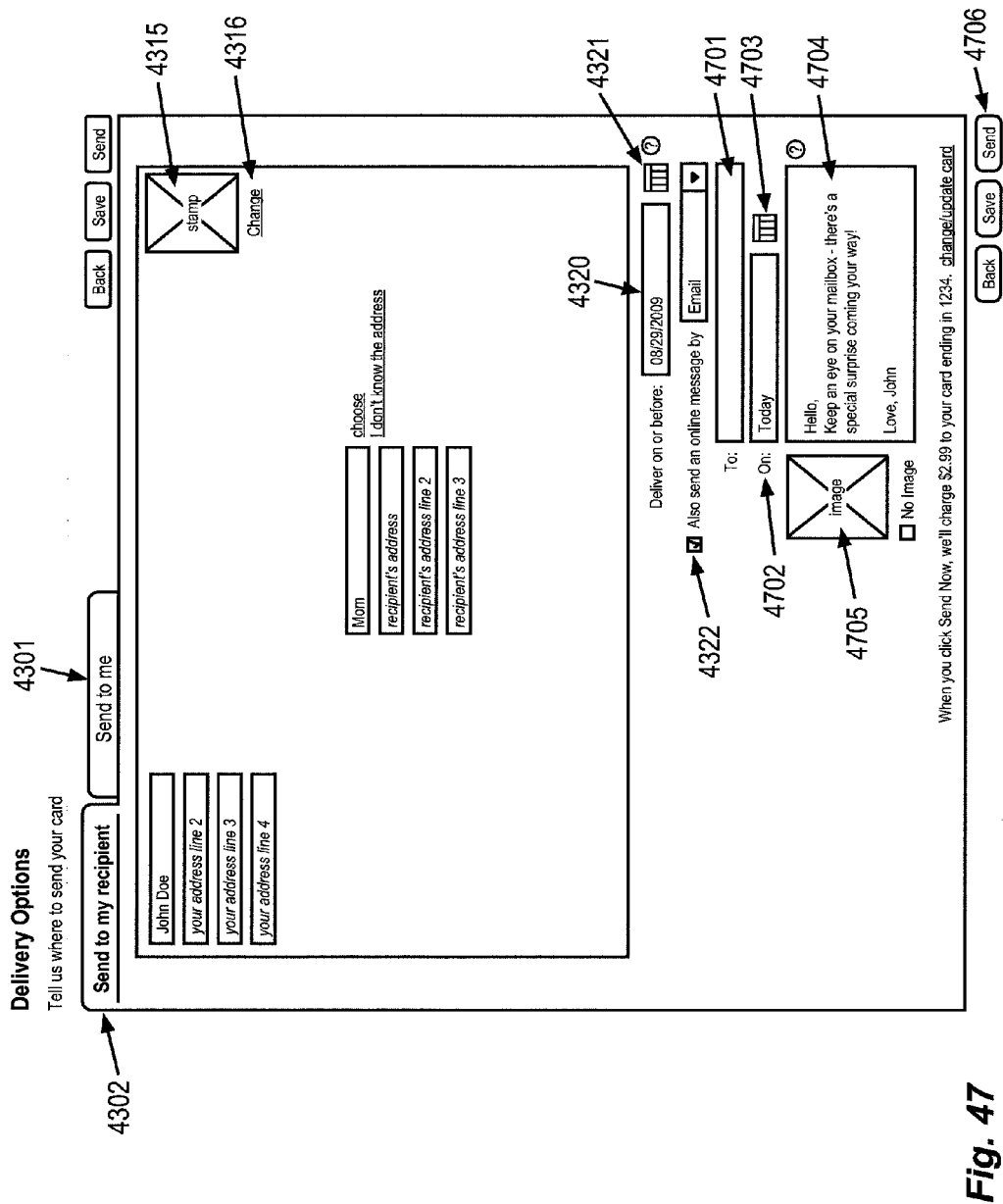
FIG. 47 illustrates a Web-based GUI for selecting an electronic message to be sent in addition to a personalized non-electronic greeting card.

FIG. 47 illustrates a Web-based GUI generated when the user chooses to send the recipient an electronic message (e.g., by selecting boxes 4406 or 4322). As shown, a data entry field 4701 allows the user to specify an email address or other electronic address (dependent on the particular type of electronic message specified by the end user). The user specifies a date on which the electronic message is to be sent in data field 4702. To do so, the user may operate a calendar GUI/widget 4703 such as those described above. The user is also provided with the option to specify an image 4705 and a text message within text entry box 4704. Selecting the "send" button then causes the electronic message to be sent on the specified date and the paper card to be sent for delivery on or before the date entered in field 4320.

Throughout the discussion above, various details have been omitted to avoid obscuring the pertinent aspects of the invention. For example, in an embodiment of the invention in which the user connects to the online stationery service 200 via a Web browser, various well known functional modules associated within the presentation and session management logic 206 shown in FIGS. 2 and 22 are executed to receive input, process the input and dynamically generate Web pages containing the results. The Web pages described herein may be formatted according to the well known HyperText Markup Language ("HTML") or Extensible HTML ("XHTML") formats, and may provide navigation to other Web pages via hypertext links. One embodiment utilizes Dynamic HTML ("DHTML"), a collection of technologies used together to create interactive Web sites by using a combination of a static markup language (e.g., HTML), a client-side scripting language (e.g., JavaScript), a presentation definition language (e.g., CSS), and the Document Object Model ("DOM"). Of course, the underlying principles of the invention are not limited to any particular set of protocols or standards.

In one embodiment, the Web server used to implement the embodiments of the invention is a Ngnix, Apache web server running on Linux with software programmed in PHP using a MySQL database.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic may be implemented as software, hardware or any combination thereof. Accordingly, the scope and spirit of the invention should be judged in terms of the claims which follow.

What is claimed is:

1. A computer-network system implemented by an online stationery/card service for a user to personalize and send non-electronic stationery/cards, the system comprising:
 a computer server configured to enable a graphical user interface for personalizing and sending non-electronic stationery/cards, the graphical user interface comprising:
  a reminder list comprised of a plurality of reminder entries, each of the reminder entries identifying an upcoming event including events generated based on a specified relationship between the user and one or more contacts stored in a contacts database of the user;
  a recommendation region comprising a plurality of stationery/card design recommendations, the recommendation region populated with stationery/card designs associated with a specified one or the one or more entries in the reminder list, including the events generated based on the specified relationship between the user and each of the contacts, wherein the reminder list is organized based on a specified prioritization scheme, with a highest priority event selected within the reminder list, wherein upon the user initially opening the GUI the recommendation region is automatically populated with stationery/card designs associated with the highest priority event in the reminder list; and
  a stationery/card personalization engine executed in response to the user selecting one of the stationery/card design recommendations from the recommendation region, the stationery personalization engine providing the end user with a set of personalization options related to the selected stationery/card design, and generating personalized stationery with the selected stationery/card design based on user input.

2. The computer-network system as in claim 1 further comprising:
 a stationery/card contacts module to manage an end user's contacts data stored within the contacts database, the contacts data including the relationship data specifying a relationship between the end user and one or more of the contacts; and
 a stationery/card calendar module to automatically generate stationery/card calendar events in the user's calendar database based on the contacts data stored within the contacts database, wherein at least some of the calendar events are generated based on the specified relationship between the user and each of the contacts.

3. The computer-network system as in claim 1 wherein the stationery/card calendar events include milestones associated with each of the contacts in the contacts database and wherein the reminder list includes entries associated with the milestones.

4. The computer-network system as in claim 3 wherein one of the milestones associated with each of the contacts comprises a birth date.

5. The computer-network system as in claim 1 wherein one of the milestones associated with each of the contacts comprises a wedding anniversary.

6. The computer-network system as in claim 1 wherein the relationship between the user and one of the contacts comprises a familial relationship and wherein the event generated comprises a day associated with that familial relationship.

7. The computer-network system as in claim 6 wherein the familial relationship comprises the user's mother or father, and wherein the event comprises Mother's Day or Father's Day.

8. The computer-network system as in claim 1 wherein the GUI further comprises a calendar window including a plurality of calendar entries for a particular month, each entry representing a particular day of the month, one or more of the entries having stored therein different graphical elements, wherein a first type of graphical element is displayed to represent a scheduled stationery/card order and a second type of graphical element is displayed to represent a calendar event related to a contact in the user's contacts database for which a stationery/card order has not been scheduled.

9. The computer-network system as in claim 8 wherein, in response to user selection of the first type of graphical element, the user is provided with details of the associated stationery/calendar order and wherein in response to user selection of the second type of graphical element, the user is provided with a Web-based GUI for selecting and personalizing a stationery/card order using the stationery/card personalization engine.

10. The computer-network system as in claim 1 wherein the stationery/card contacts module identifies address information for each of a set of user-selected contacts to receive the personalized stationery.

11. The computer-network system as in claim 1 further comprising:
 a print module to generate and transmit a print job to print the personalized stationery/cards and envelopes containing the address information for the user-selected contacts.

12. The computer-network system as in claim 1 wherein the reminders are generated in the form of a list of upcoming events, and wherein the reminder service comprises prioritization logic for prioritizing the list based at least in part on the specified relationship data.

13. The computer-network system as in claim 12 wherein the recommendations region further comprises of user input elements for specifying characteristics related to a stationery/card order, wherein the results in the recommendation region are filtered based on the user input received in one or more of the user input elements.

14. The computer-network system as in claim 13 wherein some of the user input elements comprise drop-down menus comprised of a set of user-selectable entries, at least one of the drop-down menus including a list of entries corresponding to potential stationery/card recipients retrieved from a contacts database of the user.

15. The computer-network system as in claim 14 wherein upon selection of one of the potential stationery/card recipients, the recommendation region is populated with recommendations based on the identity of the recipient and the known preferences of the user.

16. The computer-network system as in claim 14 wherein at least one of the drop-down menus including a list of entries corresponding to occasions for sending stationery/cards, wherein upon selection of one of the potential stationery/card recipients, the recommendation region is populated with recommendations based on the identity of the occasion.

17. The computer-network system as in claim 13 wherein the user input elements for specifying characteristics related to a stationery/card order include a plurality of selectable filtering elements for filtering the results in the recommendations region, the filtering elements selected from the group consisting of a stationery/card theme, a stationery/card color, a stationery/card format, a stationery/card size, and a number of photos used in the stationery card.

18. The computer-network system as in claim 1 further comprising:
a browse region comprising a set of links identifying different occasions, wherein upon selection of one of the links corresponding to one of the occasions, the recommendations region is populated with stationery/card designs related to the selected occasion.

19. The computer-network system as in claim 1 further comprising:
a scheduled stationery/card orders region visually displaying a set of previously personalized stationery/card orders which have not yet been sent.

20. The computer-network system as in claim 1 further comprising:
a personalization GUI generated in response to the user selecting one of the stationery/card designs from the recommendation region, the personalization GUI displaying a visual representation of the stationery/card design and comprising a plurality of selectable text entry regions and one or more image regions for receiving user-selectable images within the front, middle and/or back of the stationery/card design.

21. The computer-network system as in claim 20 wherein the personalization GUI comprises a listing of images capable of being clicked and dragged by the user into the image regions of the stationery/card design.

22. A computer-network system implemented by an online stationery/card service for a user to personalize and send non-electronic stationery/cards, the system comprising:
a computer server configured to enable a graphical user interface to personalize and send non-electronic stationery/cards, the graphical user interface comprising:
a reminder list comprised of a plurality of reminder entries, each of the reminder entries identifying an upcoming event including events generated based on a specified relationship between the user and one or more contacts stored in a contacts database of the user;
a recommendation region comprising a plurality of stationery/card design recommendations, the recommendation region populated with stationery/card designs associated with a specified one or the one or more entries in the reminder list, including the events generated based on the specified relationship between the user and each of the contacts, wherein the reminders are generated in the form of a list of upcoming events, and wherein the reminder service comprises prioritization logic for prioritizing the list based at least in part on the specified relationship data, wherein the recommendations region further comprises of user input elements for specifying characteristics related to a stationery/card order, wherein the results in the recommendation region are filtered based on the user input received in one or more of the user input elements, wherein some of the user input elements comprise drop-down menus comprised of a set of user-selectable entries, at least one of the drop-down menus including a list of entries corresponding to potential stationery/card recipients retrieved from a contacts database of the user, wherein upon selection of one of the potential stationery/card recipients, the recommendation region is populated with recommendations based on the identity of the recipient and the known preferences of the user; and
a stationery/card personalization engine executed in response to the user selecting one of the stationery/card design recommendations from the recommendation region, the stationery personalization engine providing the end user with a set of personalization options related to the selected stationery/card design, and generating personalized stationery with the selected stationery/card design based on user input.

* * * * *